(12) United States Patent
Kizawa et al.

(10) Patent No.: US 8,596,875 B2
(45) Date of Patent: Dec. 3, 2013

(54) BEARING CONSTITUENT MEMBER AND PROCESS FOR PRODUCING THE SAME, AND ROLLING BEARING HAVING BEARING CONSTITUENT MEMBER

(75) Inventors: Katsuhiko Kizawa, Osaka (JP); Tsuyoshi Mikami, Yamatotakada (JP); Kentarou Ono, Yamatotakada (JP); Chikara Nakajima, Hirakata (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 170 days.

(21) Appl. No.: 12/998,864

(22) PCT Filed: Dec. 11, 2009

(86) PCT No.: PCT/JP2009/070772
§ 371 (c)(1),
(2), (4) Date: Jun. 10, 2011

(87) PCT Pub. No.: WO2010/067872
PCT Pub. Date: Jun. 17, 2010

(65) Prior Publication Data
US 2011/0243488 A1    Oct. 6, 2011

(30) Foreign Application Priority Data

Dec. 12, 2008 (JP) ............................. P2008-317404
Mar. 27, 2009 (JP) ............................. P2009-079700
Oct. 1, 2009 (JP) ............................. P2009-229621
Dec. 1, 2009 (JP) ............................. P2009-273804
Dec. 1, 2009 (JP) ............................. P2009-273826

(51) Int. Cl.
*F16C 33/58* (2006.01)
*F16C 33/62* (2006.01)
*F16C 33/64* (2006.01)
*C23C 8/00* (2006.01)
*B21D 53/10* (2006.01)

(52) U.S. Cl.
USPC ........... 384/569; 384/492; 384/625; 384/912; 148/218; 29/898.06

(58) Field of Classification Search
USPC ......... 384/456, 490, 492, 569, 625, 626, 912; 148/218–219, 318, 333, 469, 546–547, 148/906; 29/898.04, 898.06
See application file for complete search history.

(56) References Cited

U.S. PATENT DOCUMENTS 4,026,727 A * 5/1977 Finkl et al. ..................... 148/546
5,077,003 A * 12/1991 Muraoka et al. .............. 384/492
(Continued)

FOREIGN PATENT DOCUMENTS

JP   06-293939 A    10/1994
JP   2000-087213 A   3/2000
(Continued)

*Primary Examiner* — Marcus Charles
(74) *Attorney, Agent, or Firm* — McGinn IP Law Group, PLLC

(57) ABSTRACT

A bearing constituent member includes a surface layer, at least one of particles composed of vanadium nitride having a particle diameter of 0.2 to 2 μm and particles composed of vanadium carbonitride having a particle diameter of 0.2 to 2 μm are present in the surface layer ranging from the surface to a depth of 10 μm and at least one of the area ratio of the particles composed of vanadium nitride having a particle diameter of 0.2 to 2 μm and the particles composed of vanadium carbonitride having a particle diameter of 0.2 to 2 μm in the surface layer ranging from the surface to a depth of 10 μm is 1 to 10%.

12 Claims, 30 Drawing Sheets

(56) References Cited

U.S. PATENT DOCUMENTS

| | | | |
|---|---|---|---|
| 5,338,377 A * | 8/1994 | Mitamura et al. | 148/318 |
| 5,658,082 A * | 8/1997 | Tsushima et al. | 384/492 |
| 5,858,056 A * | 1/1999 | Fujine et al. | 75/236 |
| 5,997,661 A * | 12/1999 | Matsumoto et al. | 148/906 |
| 6,063,218 A * | 5/2000 | Muraoka et al. | 148/333 |
| 6,071,358 A * | 6/2000 | Okita et al. | 148/906 |
| 6,447,619 B1 * | 9/2002 | Takayama et al. | 148/219 |
| 6,719,854 B2 * | 4/2004 | Komori et al. | 384/625 |
| 7,137,741 B2 * | 11/2006 | Fujita et al. | 384/456 |
| 7,438,477 B2 * | 10/2008 | Ohki | 384/490 |
| 7,690,847 B2 * | 4/2010 | Ohki et al. | 384/626 |
| 2003/0102054 A1 | 6/2003 | Kizawa | |
| 2004/0094238 A1 | 5/2004 | Kinami et al. | |
| 2007/0240791 A1 | 10/2007 | Kizawa | |
| 2008/0006347 A1 | 1/2008 | Kizawa et al. | |
| 2008/0047633 A1 | 2/2008 | Kizawa et al. | |

FOREIGN PATENT DOCUMENTS

| | | |
|---|---|---|
| JP | 2004-052101 A | 2/2004 |
| JP | 2005-154784 A | 6/2005 |
| JP | 2005-273759 A | 10/2005 |
| JP | 2006-176863 A | 7/2006 |
| JP | 2008-001943 A | 1/2008 |
| WO | WO 2006/068205 A1 | 6/2006 |

* cited by examiner

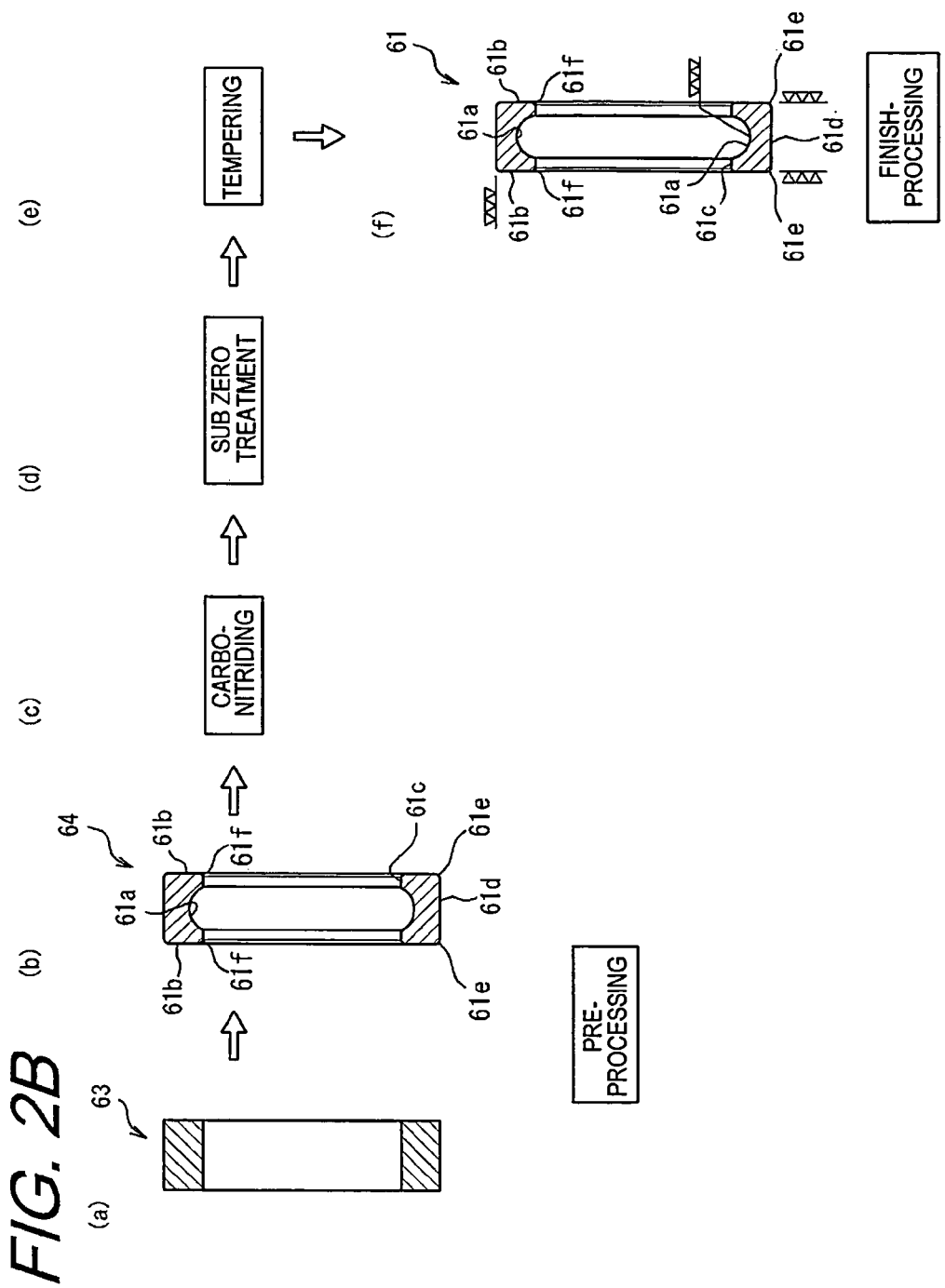

(a) CARBON MAPPING (b) NITRIDE MAPPING (c) V MAPPING

BEARING CONSTITUENT MEMBER AND PROCESS FOR PRODUCING THE SAME, AND ROLLING BEARING HAVING BEARING CONSTITUENT MEMBER

CROSS-REFERENCE TO RELATED APPLICATIONS

This application is based upon and claims the benefit of priority from the prior Japanese Patent Application No. 2008-317404, filed on Dec. 12, 2008, Japanese Patent Application No. 2009-079700, filed on Mar. 27, 2009, Japanese Patent Application No. 2009-229621, filed on Oct. 1, 2009, Japanese Patent Application No. 2009-273804, filed on Dec. 1, 2009, and Japanese Patent Application No. 2009-273826, filed on Dec. 1, 2009, the entire contents of which are incorporated herein by reference.

TECHNICAL FIELD

The present invention relates to a bearing constituent member and a process for producing the same, and a rolling bearing having the bearing constituent member.

BACKGROUND ART

In a rolling bearing, local permanent deformation may be generated in a contact part between each raceway surface of outer and inner rings and rolling elements in the case where an excessive static load is imparted on use or in the case where a large impact load is imparted during rotation at an extremely low number of rotation. The permanent deformation increases with an increase of the load and when the load exceeds a limit load (static rating load), smooth rotation is inhibited. For example, in the case of a ball bearing, maximum contact stress between the rolling elements and the raceway part of the outer and inner rings is regarded as about 4200 MPa. At the design of the ball bearing, the static rating load is determined in consideration of such a stress.

An improvement of the static rating load is one important problem for realizing miniaturization and weight saving of a rolling bearing.

On the other hand, when a rolling bearing rotates with receiving a load, a stress is repeatedly imparted to each raceway surface of outer and inner rings and rolling surfaces of the rolling elements. Therefore, when the rolling bearing is continuously used for a certain period of time, rolling fatigue is generated in the materials of the bearing constituent members constituting the rolling bearing and thus flaking is generated on the raceway surface and the rolling surfaces. The total number of rotation (referred to as a "rolling fatigue life") of the rolling bearing until the flaking is generated on the raceway surface and the rolling surfaces is regarded as an index of changing the rolling bearing. The longer the rolling fatigue life is, the lesser the frequency of changing the rolling bearing can be.

As a rolling bearing having an improved rolling fatigue life, there has been known a rolling bearing provided with outer and inner rings where the total carbon amount in the surface layer ranging from the surface to a depth on which maximum shear stress acts is controlled to 1.0 to 1.6% by mass, the dissolved carbon amount in the matrix in the surface part ranging from the surface to a depth of 0.5 mm is controlled to 0.6 to 1.0% by mass, carbon compounds are precipitated in the surface part, the amount of the precipitated carbon compounds is controlled to 5 to 15% as a area ratio, and the particle diameter of the particles of the carbon compounds is controlled to 3 μm or less by subjecting a workpiece, which has been shaped by subjecting a high carbon chromium bearing steel such as JIS SUJ2 to machining or the like into a prescribed shape, to a carburizing treatment where the workpiece is heated at 840 to 870° C. for 3 hours or longer in a carburizing atmosphere of a carbon potential of 1.2 or more, is then rapidly cooled, and is further subjected to a tempering treatment (see Patent Document 1).

However, from the viewpoint of achieving miniaturization of components, use applications under severe use environments such as an increase of the load on the outer and inner rings and the rolling elements and high temperature on use have increased, so that a rolling bearing exhibiting higher performance has been required.

Moreover, in the case where a rolling bearing is used, for example, under foreign matter contamination conditions, the foreign matter is pressed to the inner and outer rings and the rolling elements that are bearing constituent members to form brinelling on the raceway surface of the inner and outer rings and the surfaces of the rolling elements in some cases. The surface damaged part such as the brinelling formed by the foreign matter becomes a starting point of fatigue flaking by stress concentration, which is one cause of lowering the life of the rolling bearing.

Therefore, it is desired to improve the life of the rolling bearing under the foreign matter contamination conditions and the like.

In order to improve the life of the rolling bearing, it has been proposed to obtain a bearing constituent member by subjecting a workpiece, which has been formed into a prescribed shape from a steel composed of SUJ2 that is a bearing steel, to a carbonitriding treatment.

Moreover, it has been proposed that an average particle diameter of particles composed of carbides in the surface layer part of a bearing constituent member of a rolling bearing is controlled to 0.5 μm or less, the area ratio of the particles composed of the carbides is controlled to 9 to 30%, Rockwell C hardness is controlled to 63 (Vickers hardness of 770) or more, the amount of residual austenite in the surface layer is controlled to 30 to 50% by volume by subjecting a workpiece, which has been formed into a prescribed shape from a steel containing 3.2% by mass or more to less than 5.0% by mass of chromium, less than 1.0% by mass of molybdenum, and less than 0.5% by mass of vanadium, to a carburizing treatment where the workpiece is heated at 850 to 930° C. in a carburizing atmosphere of a carbon potential of 1.2 to 1.5 and is hen rapidly cooled, and subsequently tempering the resultant workpiece (see Patent Document 2).

BACKGROUND ART DOCUMENTS

Patent Documents

Patent Document 1: JP-A-2004-52101
Patent Document 2: JP-A-2006-176863

SUMMARY OF THE INVENTION

Problems that the Invention is to Solve

However, since the bearing constituent member obtained using the steel composed of SUJ2 contain a large amount of internal residual austenite, dimensional change is prone to occur as the residual austenite changes to martensite with time to expand the volume, so that there is a defect that dimensional stability with time is low.

Moreover, since the bearing constituent member described in the above-described Patent Document 2 contains a large amount of internal residual austenite in the surface layer part, a rolling bearing having a long life can be achieved. However, since the amount of martensite in the bearing constituent member decreases by just that much, there are defects that yield stress is low and sufficient static loading capacity cannot be secured.

Therefore, the rolling bearing provided with the bearing constituent member described in the above-described Patent Document 2 has a long life but permanent deformation is generated at a contact part between each raceway surface of the outer and inner rings and the rolling elements in the case where an excessive static load is imparted on use or in the case where a large impact load is imparted during rotation at an extremely low number of rotation. When the static load or the impact load exceeds a limit load, smooth rotation is inhibited.

In addition, since the bearing constituent member described in the above-described Patent Document 2 has a large amount of internal residual austenite like the bearing constituent member obtained using the steel composed of SUJ2, there is a defect that dimensional stability with time is low.

The present invention is devised in consideration of such circumstances and an object thereof is to provide a bearing constituent member capable of achieving a long life of a rolling bearing and capable of securing sufficient static loading capacity and sufficient dimensional stability, and a production process thereof. Also, another object of the invention is to provide a rolling bearing having a long life and exhibiting sufficient static loading capacity and sufficient dimensional stability.

Means for Solving the Problems

The bearing constituent member of the invention is obtained from a steel containing 3.2 to 5.0% by mass of chromium and 0.05% by mass or more to less than 0.5% by mass of vanadium, and is a bearing constituent member having a polish-finished surface, wherein the content of carbon in the surface layer ranging from the surface to 10 μm is 1.1 to 1.6% by mass, Vickers hardness at the position of a depth of 50 μm from the surface is 740 to 900 (Rockwell C hardness is 62 to 67), the amount of residual austenite at the position of a depth of 10 μm from the surface is 20 to 55% by volume, the content of nitrogen in the surface layer ranging from the surface to 10 μm is 0.1 to 1.0% by mass, particles composed of vanadium nitride having a particle diameter of 0.2 to 2 μm and/or particles composed of vanadium carbonitride having a particle diameter of 0.2 to 2 μm are present in the surface layer ranging from the surface to 10 μm, and the area ratio of the particles composed of vanadium nitride having a particle diameter of 0.2 to 2 μm and/or the particles composed of vanadium carbonitride having a particle diameter of 0.2 to 2 μm in the surface layer ranging from the surface to 10 μm is 1 to 10% (sometimes referred to as a "bearing constituent member 1"). Incidentally, the surface layer ranging from the surface to 10 μm is defined as a range between the surface and the depth of 10 μm from the surface.

According to the bearing constituent member 1 constituted as above, since the Vickers hardness at the position of a depth of 50 μm from the surface being 740 to 900 (Rockwell C hardness is 62 to 67) and the amount of residual austenite at the position of a depth of 10 μm from the surface is 20 to 55% by volume, stress concentration to the surface damaged part such as the brinelling can be relaxed. Furthermore, the bearing constituent member 1 has a property that the area ratio of the particles composed of vanadium nitride having a particle diameter of 0.2 to 2 μm and/or the particles composed of vanadium carbonitride having a particle diameter of 0.2 to 2 μm in the surface layer ranging from the surface to 10 μm is 1 to 10%, high yield stress is obtained even when the amount of residual austenite is not reduced.

Therefore, according to the bearing constituent member 1 of the invention, by relaxing the stress concentration to the surface damaged part such as the brinelling, sufficient static loading capacity can be secured owing to high yield stress with securing a long life of the rolling bearing.

The steel is preferably a steel containing 0.7 to 0.9% by mass of carbon, 0.05 to 0.70% by mass of silicon, 0.05 to 0.7% by mass of manganese, 3.2 to 5.0% by mass of chromium, 0.1 to 1.0% by mass of molybdenum, and 0.05% by mass or more to less than 0.5% by mass of vanadium, the remainder being iron and unavoidable impurities.

In this case, an amount of coarse carbides precipitated at steel formation in the bearing constituent member decreases and fatigue failure at bearing is suppressed as well as sufficient hardness is secured after hardening and after carbonitriding and tempering.

In the bearing constituent member of the invention, it is preferred that the bearing constituent member is a raceway member having a polish-finished raceway part, the steel contains 0.7 to 0.9% by mass of carbon, the content of carbon in the surface layer ranging from the surface of a non-polished part present in the part other than the raceway part to 10 μm is 0.7 to 1.0% by mass, Vickers hardness at the position of a depth of 50 μm from the surface is 700 to 800 (which is also referred to as a "bearing constituent member 2").

In this cease, since the content of carbon in the surface layer ranging from the surface of a non-polished part present in the part other than the raceway part to 10 μm is 0.7 to 1.0% by mass and the Vickers hardness at the position of a depth of 50 μm from the surface is 700 to 800, occurrence of over carburized tissue in the non-polished part can be suppressed.

Therefore, the bearing constituent member 2 provided with such constitution can afford the actions and effects of the bearing constituent member 1. In addition, when the bearing constituent member 2 is used as, e.g., an outer ring of a rolling bearing to which a load from the outside is prone to be imparted, rolling fatigue life of the rolling bearing can be improved and sufficient strength can be imparted to the rolling bearing.

The process for producing the bearing constituent member of the invention is, in one aspect, a process for producing the bearing constituent member 1, comprising:

a processing step of processing a steel containing 3.2 to 5.0% by mass of chromium and 0.05% by mass or more to less than 0.5% by mass of vanadium into a prescribed shape to obtain a workpiece, a carbonitriding treatment step of subjecting the workpiece to a carbonitriding treatment where the workpiece is heated at 850 to 900° C. in a carbonitriding atmosphere of a carbon potential of 0.9 to 1.3 and an ammonia gas concentration of 2 to 5% by volume and is then rapidly cooled, to obtain an intermediate material, a tempering treatment step of subjecting the intermediate material after the carbonitriding treatment to a tempering treatment where the intermediate material is heated at 160° C. or higher, and a finish-processing step of subjecting the intermediate material after the tempering treatment to a finish-processing to thereby obtain a bearing constituent member wherein the content of carbon in the surface layer ranging from the surface to 10 μm is 1.1 to 1.6% by mass, Vickers hardness at the position of a depth of 50 μm from the surface is 740 to 900 (Rockwell C hardness is 62 to 67), the amount of residual austenite at the position of a depth of 10 μm from the surface is 20 to 55% by volume, the content of nitrogen in the surface layer ranging from the surface to 10 μm is 0.1 to 1.0% by mass, particles composed of vanadium nitride having a particle diameter of 0.2 to 2 μm and/or particles composed of vanadium carbonitride having a particle diameter of 0.2 to 2 μm are present in the surface layer ranging from the surface to 10 μm, and the area ratio of the particles composed of vanadium nitride having a particle diameter of 0.2 to 2 μm and/or the particles composed of vanadium carbonitride having a particle diameter of 0.2 to 2 μm in the surface layer ranging from the surface to 10 μm is 1 to 10% (also referred to as a "production process 1").

In the production process 1 in which such constitution is adopted, the workpiece obtained from a steel containing 3.2 to 5.0% by mass of chromium and 0.05% by mass or more to less than 0.5% by mass of vanadium is subjected to a carbonitriding treatment step of subjecting the workpiece to a carbonitriding treatment wherein the workpiece is heated at 850 to 900° C. in a carbonitriding atmosphere of a carbon potential of 0.9 to 1.3 and an ammonia gas concentration of 2 to 5% by volume and is then rapidly cooled and the intermediate material is subjected to a tempering treatment step of subjecting the intermediate material after the carbonitriding treatment to a tempering treatment where the intermediate material is heated at 160° C. or higher, the following can be achieved: the content of carbon in the surface layer ranging from the surface to 10 μm is 1.1 to 1.6% by mass, Vickers hardness at the position of a depth of 50 μm from the surface is 740 to 900 (Rockwell C hardness is 62 to 67), the amount of residual austenite at the position of a depth of 10 μm from the surface is 20 to 55% by volume, the content of nitrogen in the surface layer ranging from the surface to 10 μm is 0.1 to 1.0% by mass, particles composed of vanadium nitride having a particle diameter of 0.2 to 2 μm and/or particles composed of vanadium carbonitride having a particle diameter of 0.2 to 2 μm are present in the surface layer ranging from the surface to 10 μm, and the area ratio of the particles composed of vanadium nitride having a particle diameter of 0.2 to 2 μm and/or the particles composed of vanadium carbonitride having a particle diameter of 0.2 to 2 μm in the surface layer ranging from the surface to 10 μm is 1 to 10%. Therefore, according to the production process 1, the bearing constituent member 1 exhibiting the aforementioned excellent actions and effects can be obtained.

Moreover, the process for producing the bearing constituent member of the invention is, in another aspect, a process for producing the bearing constituent member 2, comprising:

a processing step of processing a steel containing 0.7 to 0.9% by mass of carbon, 3.2 to 5.0% by mass of chromium and 0.05% by mass or more to less than 0.5% by mass of vanadium into a prescribed shape to obtain a workpiece of the raceway member having a machining allowance for polishing in at least a part for forming a raceway surface, a heat treatment step of subjecting the workpiece to a heat treatment including a carbonitriding treatment where the workpiece is heated at 850 to 900° C. for 4 hours or longer in a carbonitriding atmosphere of a carbon potential of 0.9 to 1.3 and an ammonia gas concentration of 2 to 5% by volume, to obtain an intermediate material, and a finish-processing step of subjecting the part for forming a raceway surface of the intermediate material after the heat treatment to a polish-finishing to form the raceway part, thereby obtaining a raceway member wherein the content of carbon in the surface layer ranging from the surface to 10 μm is 1.1% by mass or more to less than 1.6% by mass, Vickers hardness at the position of a depth of 50 μm from the surface is 740 to 900, the amount of residual austenite at the position of a depth of 10 μm from the surface is 20 to 55% by volume, the content of nitrogen in the surface layer ranging from the surface to 10 μm is 0.1 to 1.0% by mass, particles composed of vanadium nitride having a particle diameter of 0.2 to 2 μm and/or particles composed of vanadium carbonitride having a particle diameter of 0.2 to 2 μm are present in the surface layer ranging from the surface to 10 μm, the area ratio of the particles composed of vanadium nitride having a particle diameter of 0.2 to 2 μm and/or the particles composed of vanadium carbonitride having a particle diameter of 0.2 to 2 μm in the surface layer ranging from the surface to 10 μm is 1 to 10%, the content of carbon in the surface layer ranging from the surface of a non-polished part present in the part other than the raceway part to 10 μm is 0.7 to 1.0% by mass, and Vickers hardness at the position of a depth of 50 μm from the surface is 700 to 800 (also referred to as a "production process 2").

According to the production process in which such constitution is adopted, since the workpiece obtained by processing the above-described steel into a prescribed shape is subjected to a carbonitriding treatment where the workpiece is heated at 850 to 900° C. for 4 hours or longer in a carbonitriding atmosphere of a carbon potential of 0.9 to 1.3 and an ammonia gas concentration of 2 to 5% by volume, the bearing constituent member 2 exhibiting the aforementioned excellent actions and effects can be obtained.

The rolling bearing of the invention comprises an inner ring having an raceway part on an outer peripheral surface and an outer ring having an raceway part on an inner peripheral surface, and a plurality of rolling elements disposed between both raceway parts of the inner and outer rings, wherein at least one of the inner ring, the outer ring, and rolling elements is composed of the aforementioned bearing constituent member.

Since at least one of the inner ring, the outer ring, and rolling elements is composed of the aforementioned bearing constituent member, the rolling bearing of the invention has a long life and exhibits sufficient static loading capacity and sufficient dimensional stability.

The bearing constituent member of the invention is a bearing constituent member obtained by subjecting a workpiece, which has been obtained by processing a steel containing 3.2 to 5.0% by mass of chromium and 0.05% by mass or more to less than 0.5% by mass of vanadium, to a carbonitriding treatment where the workpiece is heated at 850 to 900° C. in a carbonitriding atmosphere of a carbon potential of 0.9 to 1.3 and an ammonia gas concentration of 2 to 5% by volume and is then rapidly cooled and subsequently by subjecting the resultant intermediate material to a subzero treatment at −50 to −100° C. and to a finish-processing, and having a polish-finished surface, wherein the content of carbon in the surface layer ranging from the polish-finished surface to 10 μm is 1.1 to 1.6% by mass, Vickers hardness at the position of a depth of 50 μm from the surface being 800 to 940, the amount of residual austenite at the position of a depth of 10 μm from the surface is 5 to 30% by volume, the content of nitrogen in the surface layer ranging from the surface to 10 μm is 0.1 to 1.0% by mass, particles composed of vanadium nitride having a particle diameter of 0.2 to 2 μm and/or particles composed of vanadium carbonitride having a particle diameter of 0.2 to 2 μm are present in the surface layer ranging from the surface to 10 μm, and the area ratio of the particles composed of vanadium nitride having a particle diameter of 0.2 to 2 μm and/or the particles composed of vanadium carbonitride having a particle diameter of 0.2 to 2 μm in the surface layer ranging from the surface to 10 μm is 1 to 10%. Incidentally, the surface layer ranging from the surface to 10 μm is defined as a range between the surface and the depth of 10 μm from the surface (also referred to as a "bearing constituent member 3").

The bearing constituent member 3 of the invention is obtained by subjecting the intermediate material, which has been subjected to the carbonitriding treatment, to the above-described subzero treatment. Thereby, in the bearing constituent member of the invention, the Vickers hardness at the position of a depth of 50 μm from the surface is 800 to 940 (Rockwell C hardness is 64 to 68) and the amount of residual austenite at the position of a depth of 10 μm from the surface is 5 to 30% by volume.

Therefore, in the bearing constituent member 3 of the invention, the amount of martensite increases and yield stress is high, so that sufficient loading capacity is secured. Thereby, according to the bearing constituent member of the invention, even when it receives excessive static load on use or even when it receives a large impact load at the rotation at an extremely low number of rotation, local permanent deformation quantity at a contact part between each raceway surface of the outer and inner rings and the rolling elements can be reduced.

In the invention, it is preferred that the bearing constituent member is preferably a raceway member having a polished raceway part, the steel contains 0.7 to 0.9% by mass of carbon, the content of carbon in the surface layer ranging from the surface of a non-polished part present in the part other than the raceway part to 10 μm is 0.7 to 1.0% by mass, and the Vickers hardness at the position of a depth of 50 μm from the surface is 700 to 800.

In this case, since the content of carbon in the surface layer ranging from the surface of the non-polished part present in the part other than the raceway part to 10 μm is 0.7 to 1.0% by mass and the Vickers hardness at the position of a depth of 50 μm from the surface is 700 to 800, occurrence of over carburized tissue in the non-polished part can be suppressed.

Therefore, the bearing constituent member provided with such constitution can afford the above-described actions and effects. In addition, when the bearing constituent member is used as, e.g., an outer ring of a rolling bearing to which a load from the outside is prone to be imparted, rolling fatigue life of the rolling bearing can be improved and sufficient strength can be imparted to the rolling bearing.

The rolling bearing of the invention is a rolling bearing comprising an outer ring having an raceway part on an inner peripheral surface, an inner ring having an raceway part on an outer peripheral surface, and a plurality of rolling elements disposed between the both raceway parts of the inner and outer rings, wherein the outer ring is a fixed ring and is composed of the aforementioned bearing constituent member.

With regard to the rolling bearing of the invention, since the outer ring as a fixed ring is composed of the aforementioned bearing constituent member, in the rolling bearing, the static loading capacity in the fixed ring at which maximum contact stress becomes largest is sufficiently secured. Thereby, according to the rolling bearing of the invention, the permanent deformation quantity at the contact part with the rolling elements in the outer ring as a fixed ring can be reduced and, even when the static load or impact load exceeds the limit load, smooth rotation can be secured.

In the rolling bearing of the invention, it is preferred that the inner ring is a driving ring and is a member which is obtained from a steel containing 3.2 to 5.0% by mass of chromium and 0.05% by mass or more to less than 0.5% by mass of vanadium and where the content of carbon in the surface layer ranging from the surface to 10 μm is 1.1 to 1.6% by mass, Vickers hardness at the position of a depth of 50 μm from the surface is 740 to 900 (Rockwell C hardness is 62 to 67), the amount of residual austenite at the position of a depth of 10 μm from the surface is 20 to 55% by volume, the content of nitrogen in the surface layer ranging from the surface to 10 μm is 0.1 to 1.0% by mass, particles composed of vanadium nitride having a particle diameter of 0.2 to 2 μm and/or particles composed of vanadium carbonitride having a particle diameter of 0.2 to 2 μm are present in the surface layer ranging from the surface to 10 μm, and the area ratio of the particles composed of vanadium nitride having a particle diameter of 0.2 to 2 μm and/or the particles composed of vanadium carbonitride having a particle diameter of 0.2 to 2 μm in the surface layer ranging from the surface to 10 μm is 1 to 10%.

Thus, in the rolling bearing of the invention, since the amount of residual austenite at the position of a depth of 10 μm from the surface is 20 to 55% by volume, even when the rolling bearing is used in a lubricating oil contaminated with foreign matter, the stress concentration in the periphery of brinelling formed when the rolling bearing bites the foreign matter is relaxed and the damage starting from the surface is suppressed. Therefore, in this case, a high life in a foreign matter oil can be secured.

The process for producing a bearing constituent member of the invention comprises:

a pre-processing step of processing a steel containing 3.2 to 5.0% by mass of chromium and 0.05% by mass or more to less than 0.5% by mass of vanadium into a prescribed shape to obtain a workpiece, a carbonitriding treatment step of subjecting the workpiece to a carbonitriding treatment wherein the workpiece is heated at 850 to 900° C. in a carbonitriding atmosphere of a carbon potential of 0.9 to 1.3 and an ammonia gas concentration of 2 to 5% by volume and is then rapidly cooled, to obtain an intermediate material, a subzero treatment step of subjecting the intermediate material after the carbonitriding treatment to a subzero treatment where the intermediate material is cooled at −50 to −100° C., and a finish-processing step of subjecting the intermediate material after the subzero treatment to a finish-processing to thereby obtain a bearing constituent member where Vickers hardness at the position of a depth of 50 μm from the surface is 800 to 940 (Rockwell C hardness is 64 to 68), the amount of residual austenite at the position of a depth of 10 μm from the surface is 5 to 30% by volume, the content of nitrogen in the surface layer ranging from the surface to 10 μm is 0.1 to 1.0% by mass, particles composed of vanadium nitride having a particle diameter of 0.2 to 2 μm and/or particles composed of vanadium carbonitride having a particle diameter of 0.2 to 2 μm are present in the surface layer ranging from the surface to 10 μm, and the area ratio of the particles composed of vanadium nitride having a particle diameter of 0.2 to 2 μm and/or the particles composed of vanadium carbonitride having a particle diameter of 0.2 to 2 μm in the surface layer ranging from the surface to 10 μm is 1 to 10% (also referred to as a "production process 3").

In the production process 3 of the bearing constituent member of the invention, since the workpiece obtained from the above-described steel is subjected to the carbonitriding treatment and further the intermediate material after the carbonitriding treatment is subjected to a subzero treatment, and the intermediate material after the subzero treatment is subjected to a finish-processing, the residual austenite at the surface of the intermediate material after the carbonitriding treatment can be changed into harder martensite.

Therefore, the following can be achieved: Vickers hardness at the position of a depth of 50 μm from the surface is 800 to 940 (Rockwell C hardness is 64 to 68), the amount of residual austenite at the position of a depth of 10 μm from the surface is 5 to 30% by volume, the content of nitrogen in the surface layer ranging from the surface to 10 μm is 0.1 to 1.0% by mass, particles composed of vanadium nitride having a particle diameter of 0.2 to 2 μm and/or particles composed of vanadium carbonitride having a particle diameter of 0.2 to 2 μm are present in the surface layer ranging from the surface to 10 μm, and the area ratio of the particles composed of vanadium nitride having a particle diameter of 0.2 to 2 μm and/or the particles composed of vanadium carbonitride having a particle diameter of 0.2 to 2 μm in the surface layer ranging from the surface to 10 μm is 1 to 10%.

Therefore, the bearing constituent member obtained by the production process in which such constitution is adopted can exhibit actions and effects in the aforementioned bearing constituent member in the case where the member is used as a fixed ring in the rolling bearing.

The process for producing a raceway member of the invention is a process for producing a raceway member as the aforementioned bearing constituent member, comprising:

a processing step of processing a steel containing 0.7 to 0.9% by mass of carbon, 3.2 to 5.0% by mass of chromium and 0.05% by mass or more to less than 0.5% by mass of vanadium into a prescribed shape to obtain a workpiece of the raceway member having a machining allowance for polishing in at least a part for forming a raceway surface, a carbonitriding treatment step of subjecting the workpiece to a carbonitriding treatment where the workpiece is heated at 850 to 900° C. for 4 hours or longer in a carbonitriding atmosphere of a carbon potential of 0.9 to 1.3 and an ammonia gas concentration of 2 to 5% by volume and is then rapidly cooled, to obtain an intermediate material, a subzero treatment step of subjecting the intermediate material after the carbonitriding treatment to a subzero treatment where the intermediate material is cooled at −50 to −100° C., and a finish-processing step of subjecting the part for forming a raceway surface of the intermediate material after the subzero treatment to a polish-finishing to form the raceway part, thereby obtaining a raceway member wherein the content of carbon in the surface layer ranging from the surface to 10 μm is 1.1% by mass or more to less than 1.6% by mass, Vickers hardness at the position of a depth of 50 μm from the surface being 800 to 940, the amount of residual austenite at the position of a depth of 10 μm from the surface is 5 to 30% by volume, the content of nitrogen in the surface layer ranging from the surface to 10 μm is 0.1 to 1.0% by mass, particles composed of vanadium nitride having a particle diameter of 0.2 to 2 μm and/or particles composed of vanadium carbonitride having a particle diameter of 0.2 to 2 μm are present in the surface layer ranging from the surface to 10 μm, the area ratio of the particles composed of vanadium nitride having a particle diameter of 0.2 to 2 μm and/or the particles composed of vanadium carbonitride having a particle diameter of 0.2 to 2 μm in the surface layer ranging from the surface to 10 μm is 1 to 10%, the content of carbon in the surface layer ranging from the surface of a non-polished part present in the part other than the raceway part to 10 μm is 0.7 to 1.0% by mass, and Vickers hardness at the position of a depth of 50 μm from the surface being 700 to 800 (referred to as a "production process 4").

According to the production process 4 of a raceway member in which such constitution is adopted, since a workpiece of the raceway member having a machining allowance for polishing in at least a part for forming a raceway surface obtained by processing the above-described steel into a prescribed shape is subjected to the above-described carbonitriding treatment, the intermediate material after the carbonitriding treatment is subjected to a subzero treatment, and the intermediate material after the subzero treatment is subjected to a finish-processing, the residual austenite at the surface of a part forming the raceway surface of the intermediate material after the carbonitriding treatment can be changed into harder martensite.

Therefore, the following can be achieved: the content of carbon in the surface layer ranging from the surface to 10 μm is 1.1% by mass or more to less than 1.6% by mass, Vickers hardness at the position of a depth of 50 μm from the surface being 800 to 940, the amount of residual austenite at the position of a depth of 10 μm from the surface is 5 to 30% by volume, the content of nitrogen in the surface layer ranging from the surface to 10 μm is 0.1 to 1.0% by mass, particles composed of vanadium nitride having a particle diameter of 0.2 to 2 μm and/or particles composed of vanadium carbonitride having a particle diameter of 0.2 to 2 μm are present in the surface layer ranging from the surface to 10 μm, the area ratio of the particles composed of vanadium nitride having a particle diameter of 0.2 to 2 μm and/or the particles composed of vanadium carbonitride having a particle diameter of 0.2 to 2 μm in the surface layer ranging from the surface to 10 μm is 1 to 10%, the content of carbon in the surface layer ranging from the surface of a non-polished part present in the part other than the raceway part to 10 μm is 0.7 to 1.0% by mass, and Vickers hardness at the position of a depth of 50 μm from the surface being 700 to 800.

Therefore, the bearing constituent member obtained by the production process in which such constitution is adopted can exhibit the aforementioned actions and effects.

Advantage of the Invention

The bearing constituent member of the invention and the process for producing the same exhibit excellent effects that a long life of a rolling bearing can be achieved and sufficient static loading capacity and sufficient dimensional stability can be secured. Also, the rolling bearing of the invention exhibits excellent effects of a long life and also sufficient static loading capacity and sufficient dimensional stability.

BRIEF DESCRIPTION OF THE DRAWINGS

FIG. 2B is a process chart illustrating a process for producing an outer ring, which is one example of the bearing constituent member according to the second embodiment of the invention.

MODE FOR CARRYING OUT THE INVENTION

[Bearing Constituent Member and Rolling Bearing]

First Embodiment

Figure 1:
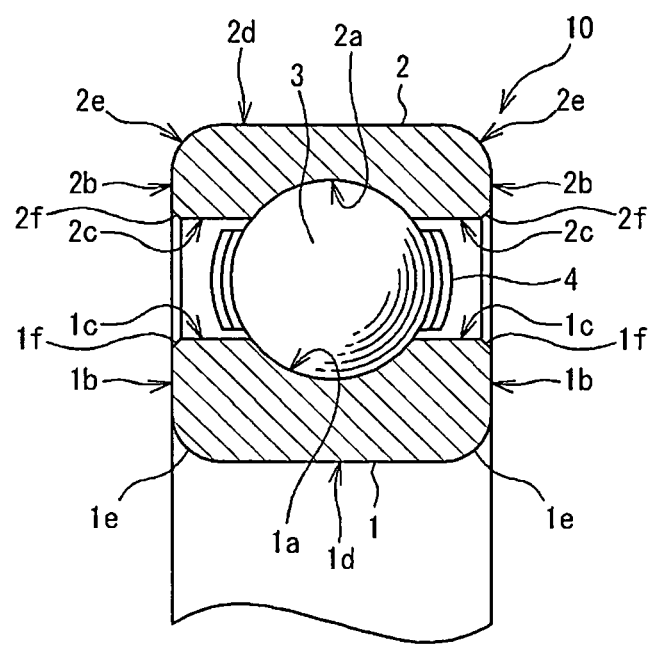
FIG. 1 is a schematic explanatory drawing illustrating a ball bearing as a rolling bearing having an inner ring, an outer ring, and balls, which is one example of the bearing constituent member according to the first embodiment and the second embodiment of the invention.

The following will explain the bearing constituent member according to the first embodiment of the invention with reference to the attached drawings. FIG. 1 is a schematic explanatory drawing illustrating a ball bearing as a rolling bearing having an inner ring, an outer ring, and balls, which is one example of the bearing constituent member according to the first embodiment of the invention.

A ball bearing 10 is provided with an inner ring 1 having a raceway part 1a on an outer peripheral surface, an outer ring 1 having a raceway part 2a on an inner peripheral surface, rings 3 as a plurality of rolling elements disposed between both raceway parts 1a and 2a of the inner and outer rings 1 and 2, and a retainer 4 which holds a plurality of balls 3 at prescribed distances in a circumferential direction.

The surfaces of the raceway part 1a, an end surface 1b, a shoulder surface 1c, and an inner peripheral surface 1d of the inner ring 1 are made polished parts which have been polish-finished. On the other hand, a chamfer 1e having an R-shape cross-section at the inner peripheral side of the inner ring 1, which connects to the end surface 1b and the inner peripheral surface 1d of the inner ring 1, and a chamfer 1f having a linear shape cross-section at the outer peripheral side of the inner ring 1, which connects to the end surface 1b and the shoulder surface 1c, are constituted as non-polished parts which have not polish-finished.

The surfaces of the raceway part 2a, an end surface 2b, a shoulder surface 2c, and an outer peripheral surface 2d are made polished parts which have been polish-finished. On the other hand, a chamfer 2e having an R-shape cross-section at the outer peripheral side of the outer ring 2, which connects to the end surface 2b and the outer peripheral surface 2d of the outer ring 2, and a chamfer 2f having a linear shape cross-section at the inner peripheral side of the outer ring 2, which connects to the end surface 2b and the shoulder surface 2c, are constituted as non-polished parts which have not polish-finished.

The hardness at the position of a depth of 50 μm from the surface of each of the polished parts including the raceway parts 1a and 2a of the inner and outer rings and the balls 3 is a Vickers hardness of 740 (Rockwell hardness C of 62) or more from the viewpoint of reducing the size of brinelling formed at the biting of the foreign matter when the ball bearing 10 is used in a lubricating oil contaminated with the foreign matter, and is a Vickers hardness of 900 (Rockwell hardness C of 67) or less from the viewpoint of preventing embrittlement.

In the present specification, the Vickers hardness means a value measured by cutting the inner ring from the surface in a depth direction and then applying a Vickers indentation to the position of a depth of 50 μm from the surface. Further, in the specification, the Rockwell C hardness means a value determined by converting the measured value of the Vickers hardness.

The amount of residual austenite at the position of a depth of 10 μm from the surface of each of the polished parts including the raceway parts 1a and 2a of the inner and outer rings 1 and 2 and the balls 3 is 20% by volume or more from the viewpoint of relaxing the stress concentration in the periphery of surface damaged parts such as brinelling, and is 55% by volume or less from the viewpoint of obtaining sufficient surface hardness.

Also, the amount of residual austenite (amount of internal residual austenite) at the inside (a region deeper than the carbonitrided layer formed on the surface, as one example, a position of a depth of 1.5 mm or more from the surface in the case of the bearing of Model No. 6206) of each of the polished parts including the raceway parts 1a and 2a of the inner and outer rings 1 and 2 and the balls 3 is 15% by volume or less from the viewpoint of obtaining good dimensional stability. A lower limit of the amount of internal residual austenite can be suitably, for example, 3% by volume or more. Thereby, the dimensional stability can be improved.

Incidentally, in the specification, the "dimensional stability" means stability against dimensional change with time.

In the surface layer ranging from the surface of each of the polished parts including the raceway parts 1a and 2a of the inner and outer rings 1 and 2 and the balls 3 to 10 μm, particles composed of vanadium nitride and/or particles composed of vanadium carbonitride are present. With regard to the particle diameter of the particles, the particles includes those having a particle diameter of 0.2 μm or more from the viewpoint of improving yield stress through dispersion enhancement by Orowan mechanism, and the particle diameter is preferably 2 μm or less from the viewpoint of inducing coarsening of the particles by Ostwald growth. Incidentally, the surface layer ranging from the surface of the polished part to 10 μm contains particles having a particle diameter of less than 0.2 μm.

Also, on the surface of each of the polished parts including the raceway parts 1a and 2a of the inner and outer rings 1 and 2 and the balls 3, cementite and $M_7C_3$ type carbides and $M_{23}C_6$ type carbides are precipitated.

The area ratio of the particles composed of vanadium nitride having a particle diameter of 0.2 to 2 μm and/or the particles composed of vanadium carbonitride having a particle diameter of 0.2 to 2 μm in the surface layer ranging from the surface of each of the polished parts including the raceway parts 1a and 2a of the inner and outer rings 1 and 2 and the balls 3 to 10 μm is 1% or more from the viewpoint of improving yield stress through dispersion enhancement by Orowan mechanism to secure sufficient static loading capacity, and is 10% or less from the viewpoint of obtaining Vickers hardness (Vickers hardness at the position of a depth of 50 μm from the surface) of 740 to 900 (Rockwell hardness C of 62 to 67) as a bearing constituent member by suppressing intrusion of excessive nitrogen into the steel to secure a necessary amount of carbon and thus achieving a long life as well as securing sufficient static loading capacity. In the specification, the area ratio of the particles means an area ratio of the sum of the particles composed of vanadium nitride having a particle diameter of 0.2 to 2 μm and the particles composed of vanadium carbonitride having a particle diameter of 0.2 to 2 μm in the surface layer ranging from the surface to 10 μm.

The content of carbon in the surface layer ranging from the surface of each of the polished parts including the raceway parts 1a and 2a of the inner and outer rings 1 and 2 and the balls 3 to 10 μm is 1.1% by mass or more from the viewpoint of securing the amount of residual austenite which exhibits an effect of relaxing stress concentration to the surface damaged part such as brinelling and also obtaining high surface hardness, and is 1.6% by mass or less from the viewpoint of decreasing the amount of coarse precipitates (e.g., precipitates having a particle diameter exceeding 10 μm) of carbides present in the surface layer to thereby further improve the life.

The content of nitrogen in the surface layer ranging from the surface of each of the polished parts including the raceway parts 1a and 2a of the inner and outer rings 1 and 2 and the balls 3 to 10 μm is 0.1% by mass or more from the viewpoint of improving yield stress through dispersion enhancement by Orowan mechanism to secure sufficient static loading capacity and also obtaining sufficient crushing strength, and is 1.0% by mass or less from the viewpoint of obtaining Vickers hardness (Vickers hardness at the position of a depth of 50 μm from the surface) of 740 to 900 (Rockwell hardness C of 62 to 67) as a bearing constituent member by suppressing intrusion of excessive nitrogen into the steel to secure a necessary amount of carbon and thus achieving a long life as well as preventing embrittlement by over nitriding.

Moreover, in one embodiment of the first embodiment, particles composed of nitrides (nitride particles) having a particle diameter of 500 nm or less may be present in the surface layer ranging from the surface of each of the polished parts including the raceway parts 1a and 2a to 10 μm, and the area ratio of precipitates including the nitrides in the surface layer may be 5 to 20%. In this case, the occurrence of over carburized tissue is suppressed and sufficient crushing strength is obtained.

Also, in one embodiment of the first embodiment, the area ratio of the precipitates including the nitrides in the surface layer ranging from the surface of each of the polished parts including the raceway parts 1a and 2a to 10 μm is preferably 5% or more from the viewpoint of suppressing the occurrence of over carburized tissue at the non-polished part and obtaining sufficient crushing strength, and is preferably 20% or less from the viewpoint of preventing embrittlement by over nitriding.

Also, in one embodiment of the first embodiment, the content of carbon in the surface layer ranging from each surface of the non-polished parts including the chamfer 1e of the inner peripheral surface of the inner ring, the chamfer 1f of the outer peripheral surface of the inner ring, the chamfer 2e of the outer peripheral surface of the outer ring, and the chamfer 2f of the inner peripheral surface of the outer ring to 10 μm is 0.7% by mass or more from the viewpoint of obtaining hardness for securing static strength as a bearing, and is 1.0% by mass or less from the viewpoint of suppressing the occurrence of over carburized tissue in the non-polished parts and obtaining sufficient crushing strength.

Also, in one embodiment of the first embodiment, the Vickers hardness at the position of a depth of 50 μm from each surface of the non-polished parts including the chamfer 1e of the inner peripheral surface of the inner ring, the chamfer 1f of the outer peripheral surface of the inner ring, the chamfer 2e of the outer peripheral surface of the outer ring, and the chamfer 2f of the inner peripheral surface of the outer ring is 700 or more from the viewpoint of obtaining sufficient strength as a ball bearing, and is 800 or less from the viewpoint of securing sufficient toughness.

[Process for Producing Bearing Constituent Member]

Figure 2A:
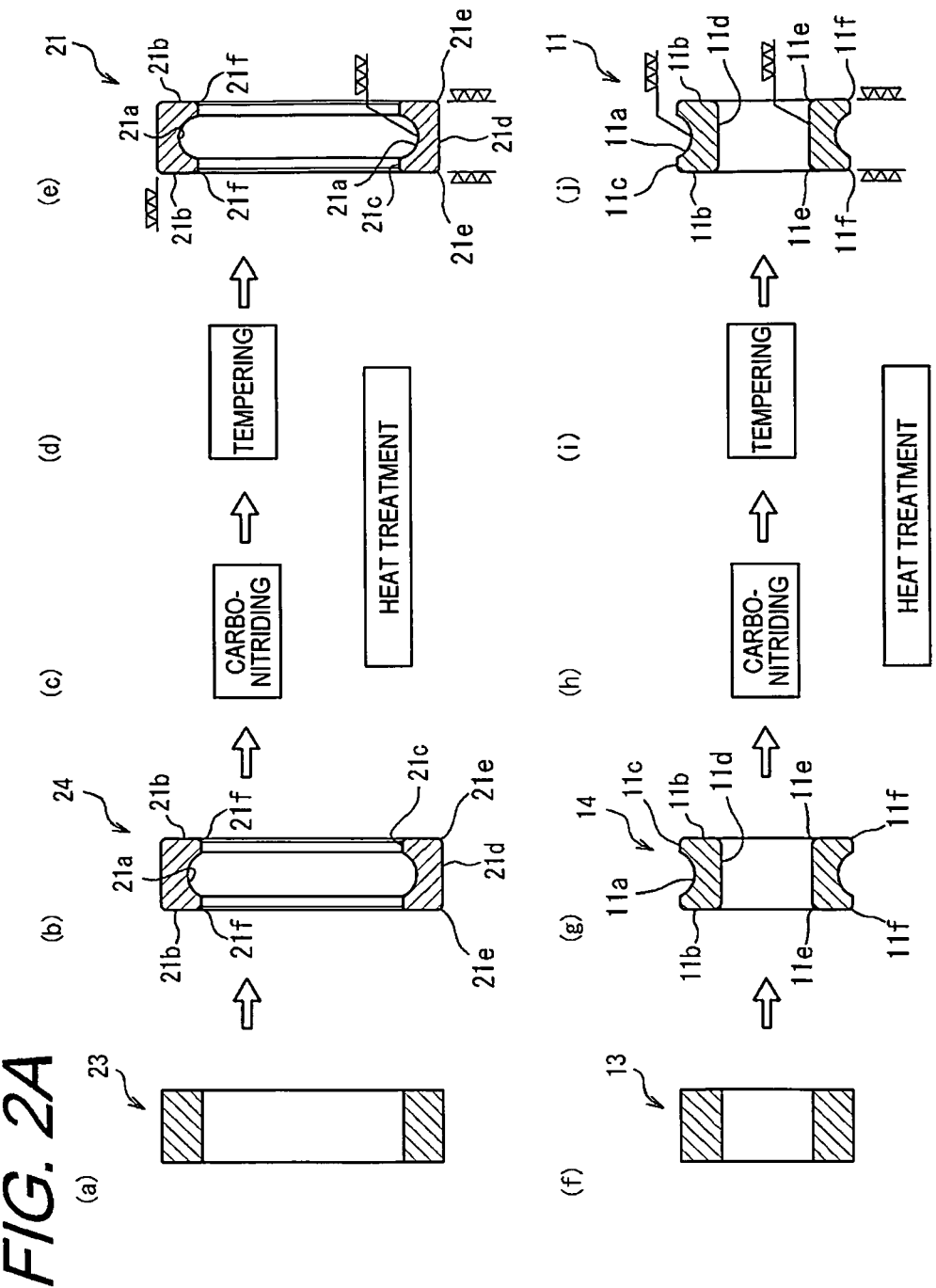
FIG. 2A is a process chart illustrating a process for producing inner and outer rings, which is one example of the bearing constituent member according to the first embodiment of the invention.

Next, a process for producing the bearing constituent member according to the first embodiment of the invention will be explained. FIG. 2A is a process chart illustrating a process for producing inner and outer rings, which is one example of the bearing constituent member according to the first embodiment of the invention.

First, a ringed material 23 [see FIG. 2A (a)] of the outer ring composed of a steel containing 0.7 to 0.9% by mass of carbon, 3.2 to 5.0% by mass of chromium and 0.05% by mass or more to less than 0.5% by mass of vanadium is subjected to cutting or the like into a prescribed shape to obtain a workpiece 24 of the outer ring having a machining allowance for polishing in a part for forming each of the raceway part 21a, the end surface 21b, the shoulder surface 21c, and the outer peripheral surface 21d and having the chamfer 21e having an R-shape cross-section at the outer peripheral side of the outer ring, which connects to the end surface 21b and the outer peripheral surface 21d, and the chamfer 21f having a linear shape cross-section at the inner peripheral side of the outer ring, which connects to the end surface 21b and the shoulder surface 21c (pre-processing step) [see FIG. 2A (b)]. Also, a ringed material 13 [see FIG. 2A (f)] of the inner ring composed of the same steel as in the case of the ringed material 23 of the outer ring is subjected to cutting or the like into a prescribed shape to obtain a workpiece 14 of the inner ring having a machining allowance for polishing in a part for forming each of the raceway part 11a, the end surface 11b, the shoulder surface 11c, and the inner peripheral surface 11d and having the chamfer 11e having an R-shape cross-section at the inner peripheral side of the inner ring, which connects to the end surface 11b and the inner peripheral surface 11d, and the chamfer 11f having a linear shape cross-section at the outer peripheral side of the inner ring, which connects to the end surface 11b and the shoulder surface 11c (pre-processing step) [see FIG. 2A (g)].

As the steel, use can be made of a steel containing 0.7 to 0.9% by weight of carbon, 0.05 to 0.70% by mass of silicon, 0.05 to 0.7% by mass of manganese, 3.2 to 5.0% by mass of chromium, 0.1 to 1.0% by mass of molybdenum, and 0.05% by mass or more to less than 0.5% by mass of vanadium, the remainder being iron and unavoidable impurities.

According to such a steel, the amount of coarse eutectic carbides precipitated at steel making on the surface of each of inner and outer rings decreases, fatigue failure at bearing can be suppressed, and sufficient hardness can be secured after hardening or after carbonitriding and tempering.

In addition, according to the steel, even in the case where the amount of residual austenite at the position of a depth of 10 μm from the surface after polishing each of the inner and outer rings is controlled to 55% by volume in order to improve the life of the rolling bearing, sufficient hardness is secured and also dimensional stability can be improved.

In general, in the case where a steel composed of SUJ2 that is a bearing steel is used as the steel, there is a tendency that the dimensional stability becomes worse when the amount of internal residual austenite exceeds 5% by volume. However, in the case where the steel containing 3.2 to 5.0% by mass of chromium and 0.05% by mass or more to less than 0.5% by mass of vanadium is used, good dimensional stability can be obtained by controlling the amount of residual austenite at the inside (a region deeper than the carbonitrided layer formed on the surface, as one example, a position of a depth of 1.5 mm or more from the surface in the case of the bearing of Model No. 6206) of the raceway part of the inner and outer rings to 15% by volume or less.

In the above-described steel, carbon is an element for increasing the hardness of the steel to obtain inner hardness for securing strength when the carbonitriding treatment is performed at the following step. Also, carbon is an element for enabling the improvement of a rolling fatigue life by letting a large number of non-dissolved carbides remain in the steel before the carbonitriding treatment to be mentioned later and achieving a state that they remain finely and in a large amount even after the carbonitriding treatment.

The content of carbon in the steel is 0.7% by mass or more from the viewpoint of letting the non-dissolved carbides sufficiently remain in the steel, and is 0.9% by mass or less from the viewpoint of sufficiently obtaining processability before the carbonitriding treatment and also suppressing the formation of coarse eutectic carbides that are prone to be starting points of fatigue failure at steel production.

Moreover, in the steel, chromium is an element for improving the rolling fatigue life of the bearing constituent member by forming a large amount of the non-dissolved carbides in the stage before the carbonitriding treatment, which act as precipitation nuclei at the carbonitriding treatment, and precipitating fine carbides ($M_7C_3$ type carbides, $M_{23}C_6$ type carbides), fine carbonitrides [$M_7(C,N)_3$ type carbonitrides, $M_{23}(C,N)_6$ type carbides], and fine nitrides (CrN, VN) in the surface carbonitrided layer after carbonitriding. Furthermore, chromium accelerates the nitriding reaction in the top surface layer of the steel by acceleration of the formation of carbonitrides and nitrides in the steel and also suppresses the carburizing reaction (suppression of occurrence of over carburized tissue).

The content of chromium in the steel is 3.2% by mass or more from the viewpoint of obtaining the above-described effects, and is 5.0% by mass or less from the viewpoint of easily effecting the suppression of formation of the eutectic carbides that become starting points of fatigue failure and from the viewpoint of reducing the costs.

In the above-described steel, vanadium is an element having strong affinity to carbon and an element that forms carbide. Moreover, since vanadium carbide formed from carbon and vanadium has high dissolution temperature as compared with molybdenum carbide, most of vanadium carbide present before the carbonitriding treatment does not dissolve in the temperature range of the carbonitriding treatment at the production of the bearing constituent member of the invention and is present in the steel as non-dissolved vanadium carbide. Such non-dissolved vanadium carbide acts as a precipitation nucleus for carbides (VC), carbonitrides (V(C,N)], nitrides [(Cr,V)N], and the like at the carbonitriding treatment and also contributes fining of the precipitates of the carbides, carbonitrides, nitrides, and the like, so that the hardness of the steel and the rolling fatigue life can be improved. Also, vanadium can accelerate the nitriding reaction and suppress the carburizing reaction (suppression of occurrence of over carburized tissue) in the top surface layer of the steel by acceleration of the formation of carbonitrides and nitrides, to a larger extent than the case of chromium in the steel.

The content of vanadium in the steel is 0.05% by mass or more from the viewpoint of obtaining the above-described effects, and is less than 0.5% by mass from the viewpoint of sufficiently securing the amount of the dissolved carbon and sufficiently securing the amount of residual austenite by suppressing the formation of vanadium carbide.

In the above-described steel, silicon is an element necessary for deacidification at refining of the steel. Also, silicon is an element having an effect of suppressing coarse growth of carbides since silicon has a property of being hardly dissolved in carbides.

The content of silicon in the steel is 0.05% by mass or more from the viewpoint of obtaining the above-described effects, and is 0.7% by mass or less from the viewpoint of sufficiently obtaining the processability before the carbonitriding treatment.

In the above-described steel, manganese is an element which stabilizes austenite in the steel. Also, manganese is an element capable of easily increasing the amount of residual austenite by increasing the amount of manganese contained in the steel.

The content of manganese in the steel is 0.05% by mass or more from the viewpoint of obtaining the above-described effects, and is 0.7% by mass or less, preferably 0.50% by mass or less from the viewpoint of increasing the amount of non-dissolved carbides in the steel and precipitating the carbides to improve the hardness of the steel and improving the rolling fatigue life as well as from the viewpoint of obtaining sufficient hot processability and mechanical processability.

In the above-described steel, molybdenum is an element having affinity to carbon stronger than chromium and is an element involved in the formation of carbides and carbonitrides. Also, molybdenum is an element which elevates the dissolution temperature of carbides and carbonitrides at a temperature of the carbonitriding treatment at the production of the bearing constituent member of the invention and increases non-dissolved carbides and carbonitrides. Therefore, molybdenum is an important element for increasing the amounts of fine carbides and carbonitrides in the surface carbonitrided layer after the carbonitriding treatment and enhancing the hardness of the steel. Moreover, molybdenum improves hardenability of the steel and also increases the amount of residual austenite in the steel. Furthermore, molybdenum is an element which efficiently precipitates carbides ($M_{23}C_6$ type carbides) and carbonitrides [$M_{23}(C,N)_6$ type carbonitrides].

The content of molybdenum in the steel is 0.10% by mass or more from the viewpoint of obtaining the above-described effects, and is 1.0% by mass or less from the viewpoint of reducing the costs and from the viewpoint of suppressing the formation of coarse eutectic carbides that become starting points of fatigue failure.

Then, the resultant workpiece 24 of the outer ring and the workpiece 14 of the inner ring are subjected to a heat treatment to harden them so that the surface hardness of each of the workpiece 24 of the outer ring and the workpiece 14 of the inner ring becomes Vickers hardness (Hv) of 700 or more [see FIG. 2A (c) and (d), FIG. 2A (h) and (i)].

In such a heat treatment step, the workpiece is first heated at 850 to 900° C. in a carbonitriding atmosphere of a carbon potential of 0.9 to 1.3 and an ammonia gas concentration of 2 to 5% by volume, and then rapidly cooled (carbonitriding treatment step) [see FIG. 2A (c) and FIG. 2A (h)].

The carbon potential in the carbonitriding atmosphere is 0.9 or more from the viewpoint of forming a carbonitrided layer having a sufficient carbonitrided depth to afford a sufficient hardened layer, and is 1.3 or less from the viewpoint of controlling the area ratio of the precipitates including the vanadium nitride or vanadium carbonitride in each of the outer ring 2 and the inner ring 1 to the aforementioned range and also suppressing the occurrence of the over carburized tissue.

Moreover, the ammonia gas concentration in the carbonitriding atmosphere is 2% by volume or more from the viewpoint of suppressing the occurrence of the over carburized tissue, and is 5% by volume or less from the viewpoint of preventing the embrittlement by over nitriding.

The heating temperature in the carbonitriding atmosphere is 850° C. or higher from the viewpoint of forming a sufficient hardened layer, and is 900° C. or lower from the viewpoint of suppressing intrusion of excessive carbon into the bearing constituent member to suppress the occurrence of the over carburized tissue and from the viewpoint of suppressing the precipitation of the coarse carbides.

Moreover, the heating time is 4 hour or longer from the viewpoint of obtaining a carburized depth sufficient for strengthening the surface layer.

The rapid cooling is performed by oil cooling in an oil bath of a cooling oil. The oil bath temperature of the cooling oil is sufficiently usually 60 to 180° C.

Then, the intermediate material after the carbonitriding treatment is subjected to a tempering treatment where the intermediate material is heated at 160° C. or higher [see FIG. 2A (d) and FIG. 2A (i)] (tempering treatment step).

The heating temperature in the tempering treatment is 160° C. or higher from the viewpoint of restoring the toughness of martensite after the hardening treatment, and 250° C. or lower from the viewpoint of suppressing the decomposition of residual austenite.

Thereafter, the parts for forming each of the raceway surface 21a, the end surface 21b, the shoulder surface 21c, and the outer peripheral surface 21d of the workpiece 24 of the outer ring after the tempering treatment are subjected to polishing processing and the raceway surface 21a is subjected to ultra finish-processing to finish the surface with prescribed accuracy [see FIG. 2A (e)].

Thus, an objective outer ring 21 can be obtained. Here, the raceway surface 21a, the end surface 21b, the shoulder surface 21c, and the outer peripheral surface 21d are constituted as polished parts and, of the outer ring 21, the chamfer 21e at the outer peripheral side of the outer ring and the chamfer 21f at the inner peripheral side of the outer ring are constituted as non-polished parts where polishing has not been performed.

Also, similarly, the raceway surface 11a, the end surface 11b, the shoulder surface 11c, and the outer peripheral surface 11d of the workpiece 14 (intermediate material) of the inner ring after the heat treatment are subjected to polishing processing and also the raceway surface 11a is subjected to ultra finish-processing to finish the surface with prescribed accuracy [see FIG. 2A (j)].

Thus, an objective inner ring 11 can be obtained. In such an inner ring 11, the raceway surface 11a, the end surface 11b, the shoulder surface 11c, and the outer peripheral surface 11d are constituted as polished parts and, of the inner ring 11, the chamfer 11e at the inner peripheral side of the inner ring and the chamfer 11f at the outer peripheral side of the inner ring are constituted as non-polished parts where polishing has not been performed.

Modification Example

In a ball bearing 10 as a rolling bearing shown in FIG. 1, it is sufficient that at least one of the inner ring, the outer ring, and the ball is composed of the bearing constituent member according to the first embodiment of the invention.

Such a ball bearing 10 may be provided with the outer ring 21 as the bearing constituent member according to the first embodiment of the invention as an outer ring (e.g., see FIG. 2A (e)) but may be provided with an inner ring different from the one of the invention. Alternatively, the ball bearing may be provided with the inner ring 11 as the bearing constituent member according to the first embodiment of the invention as an inner ring (e.g., see FIG. 2A (j)) but may be provided with an outer ring different from the one of the invention.

Second Embodiment

[Bearing Constituent Member and Rolling Bearing Provided Therewith]

The following will explain the outer ring that is the bearing constituent member according to the second embodiment of the invention with reference to the attached drawings. The second embodiment is also explained with reference to FIG. 1 as in the case of the rolling bearing of the first embodiment. That is, the same reference numerals and signs are employed to the similar members and the explanation is conducted below based on FIG. 1. FIG. 1 is a schematic explanatory drawing illustrating a ball bearing as a rolling bearing provided with the bearing constituent member (outer ring) according to the second embodiment of the invention.

Similarly to the first embodiment, the ball bearing 10 in the second embodiment is provided with an outer ring 2 having a raceway part 2a on an inner peripheral surface, an inner ring 1 having a raceway part 1a on an outer peripheral surface, rings 3 as a plurality of rolling elements disposed between both raceway parts 2a and 1a of the outer and inner rings 2 and 1, and a retainer 4 which holds a plurality of the balls 3 at prescribed distances in a circumferential direction.

The surfaces of the raceway part 2a, an end surface 2b, a shoulder surface 2c, and an outer peripheral surface 2d of the outer ring 2 are made polished parts which have been polish-finished.

On the other hand, a chamfer 2e having an R-shape cross-section at the outer peripheral side of the outer ring 2, which connects to the end surface 2b and the outer peripheral surface 2d of the outer ring 2, and a chamfer 2f having a linear shape cross-section at the inner peripheral side of the outer ring 2, which connects to the end surface 2b and the shoulder surface 2c, are constituted as non-polished parts which have not polish-finished.

The surfaces of the raceway part 1a, an end surface 1b, a shoulder surface 1c, and an inner peripheral surface 1d of the inner ring 1 are made polished parts which have been polish-finished. On the other hand, a chamfer 1e having an R-shape cross-section at the inner peripheral side of the inner ring 1, which connects to the end surface 1b and the inner peripheral surface 1d of the inner ring 1, and a chamfer 1f having a linear shape cross-section at the outer peripheral side of the inner ring 1, which connects to the end surface 1b and the shoulder surface 1c, are constituted as non-polished parts which have not polish-finished.

In the ball bearing 10, the outer ring 2 is a fixed ring and the inner ring 1 is a driving ring.

The curvature radius of the rolling contact surface of the raceway 1a in the inner ring 1 is 0.505 Bd when the diameter of the ball 3 is expressed as Bd, and the curvature radius of the rolling contact surface of the raceway 2a in the outer ring 2 is 0.53 Bd. Thus, in the ball bearing 10, since the curvature radius of the outer ring is larger than the curvature radius of the inner ring 1, the maximum contact stress between the outer ring 2 and the ball 3 is larger than the maximum contact stress between the inner ring 1 and the ball 3.

Therefore, in the outer ring 2, the static loading capacity is improved by reducing the amount of residual austenite as compared with the inner ring 1. Thereby, the suppression of occurrence of permanent deformation is achieved in the outer ring 2.

On the other hand, in the inner ring 1, the stress concentration in the periphery of brinelling formed when foreign matter is bitten is relaxed by increasing the amount of residual austenite as compared with the outer ring 2. Thereby, the improvement of the life in a foreign matter oil is achieved in the inner ring 1.

The outer and inner rings 2 and 1 are all composed of a member obtained from a steel containing 3.2 to 5.0% by mass of chromium and 0.05% by mass or more to less than 0.5% by mass of vanadium.

In the outer ring 2 that is a fixed ring, the amount of residual austenite at the position of a depth of 10 μm from the surface of the polished part including the raceway part 2a is 5 to 30% by volume and thus the amount of residual austenite is small as compared with that at the polished part including the raceway part 1a of the inner ring 1. Thereby, since the amount of martensite is large in the outer ring 2, the yield stress is high and sufficient static loading capacity is secured.

Thus, since the amount of residual austenite at the position of a depth of 10 μm from the surface of the polished part including the raceway part 2a is 5% by volume or more, sufficient life performance as an outer ring is secured. Also, since the amount of residual austenite at the position of a depth of 10 μm from the surface of the raceway part 2a is 30% by volume or less, sufficient life performance as an outer ring is secured.

Therefore, even in the case where the load of the maximum contact stress in the ball bearing 10 becomes maximum, since sufficient static loading capacity is secured in the outer ring 2 as a fixed ring, the permanent deformation quantity at the contact part between each raceway surface of the outer and inner rings and the rolling elements can be reduced and thus smooth rotation can be maintained.

In the outer ring 2, the hardness at the position of a depth of 50 μm from the surface of the polished part including the raceway part 2a is a Vickers hardness of 800 (Rockwell C hardness of 64) or more from the viewpoint of securing sufficient life and static loading capacity as an outer ring, and a Vickers hardness of 940 (Rockwell C hardness of 68) or less from the viewpoint of securing sufficient toughness as a bearing.

Moreover, in one embodiment of the second embodiment, particles composed of nitrides having a particle diameter of 500 nm or less (nitride particles) may be present in the surface layer ranging from the surface of each of the polished parts including the raceway part 2a, and the area ratio of precipitates including the nitrides in the surface layer may be 5 to 20%. In this case, the occurrence of the over carburized tissue is suppressed and sufficient crushing strength is obtained.

Also, in one embodiment of the second embodiment, the area ratio of the precipitates including the nitrides in the surface layer ranging from the surface of the polished part including the raceway part 2a to 10 μm is preferably 5% or more from the viewpoint of obtaining sufficient crushing strength, and is preferably 20% or less from the viewpoint of preventing the embrittlement by over nitriding.

Also, in one embodiment of the second embodiment, the content of carbon in the surface layer ranging from the surface of the non-polished parts including the chamfer 2e of the outer peripheral surface of the outer ring and the chamfer 2f of the inner peripheral surface of the outer ring to 10 μm is 0.7% by mass or more from the viewpoint of obtaining hardness for securing static strength as a bearing, and is 1.0% by mass or less from the viewpoint of suppressing the occurrence of the over carburized tissue at the non-polished parts and obtaining sufficient crushing strength.

Also, in one embodiment of the second embodiment, the Vickers hardness at the position of a depth of 50 μm from the surface of the non-polished parts including the chamfer 2e of the outer peripheral surface of the outer ring and the chamfer 2f of the inner peripheral surface of the outer ring is 700 or more from the viewpoint of obtaining sufficient hardness as a ball bearing, and is 800 or less from the viewpoint of securing sufficient toughness.

On the other hand, in the inner ring 1 that is a driving ring, the amount of residual austenite at the position of a depth of 10 μm from the surface of the polished part including the raceway parts 1a thereof is 20% by volume or more from the viewpoint of relaxing the stress concentration in the periphery of brinelling formed at the biting of the foreign matter when the ball bearing 10 is used in a lubricating oil contaminated with the foreign matter, and is 55% by volume or less from the viewpoint of obtaining sufficient surface hardness.

Also, in the inner ring 1, since the Vickers hardness at the position of a depth of 50 μm from the surface of the polished part including the raceway part 1a is 740 (Rockwell hardness C of 62) or more, the size of brinelling formed at the biting of the foreign matter when the ball bearing 10 is used in a lubricating oil contaminated with the foreign matter can be reduced. Furthermore, in the inner ring 1, since the Vickers hardness at the position of a depth of 50 μm from the surface of the polished part including the raceway part 1a is 900 (Rockwell hardness C of 67) or less, the embrittlement can be prevented.

Incidentally, the Vickers hardness at the position of a depth of 50 μm from the surface is a value measured by cutting the outer ring 2 or the inner ring 1 from the surface in a depth direction and then applying a Vickers indentation to the position of a depth of 50 μm from the surface. Also, Rockwell C hardness is a value determined by converting the measured value of the Vickers hardness.

In the surface layer ranging from the surface of each of the polished parts including the raceway parts 2a and 1a of the outer and inner rings 2 and 1 and the balls 3 to 10 μm, particles composed of vanadium nitride and/or particles composed of vanadium carbonitride are present. The particle diameter of the particles is 0.2 μm or more from the viewpoint of improving yield stress through dispersion enhancement by Orowan mechanism, and is preferably 2 μm or less from the viewpoint of inducing coarsening of the particles by Ostwald growth. Incidentally, the surface layer ranging from the surface of the polished part to 10 μm contains particles having a particle diameter of less than 0.2 μm.

Also, on the surface of each of the polished parts including the raceway parts 2a and 1a of the outer and inner rings 2 and 1 and the balls 3, cementite and $M_7C_3$ type carbides and $M_{23}C_6$ type carbides are precipitated.

The area ratio of the particles composed of vanadium nitride having a particle diameter of 0.2 to 2 μm and/or particles composed of vanadium carbonitride having a particle diameter of 0.2 to 2 μm in the surface layer ranging from the surface of each of the polished parts including the raceway parts 2a and 1a of the outer and inner rings 2 and 1 and the balls 3 to 10 μm is 1% or more from the viewpoint of improving yield stress through dispersion enhancement by Orowan mechanism to secure sufficient static loading capacity for each of the fixed ring and the driving ring, and is 10% or less from the viewpoint of controlling Rockwell C hardness (or Vickers hardness) at the position of a depth of 50 μm from the surface to a prescribed value corresponding to each of the fixed ring and the driving ring by suppressing intrusion of excessive nitrogen into the steel to secure sufficient static loading capacity for each of the fixed ring and the driving ring. In the specification, the area ratio of the particles means an area ratio of the sum of the particles composed of vanadium nitride having a particle diameter of 0.2 to 2 μm and particles composed of vanadium carbonitride having a particle diameter of 0.2 to 2 μm in the surface layer ranging from the surface to 10 μm.

The content of carbon in the surface layer ranging from the surface of each of the polished parts including the raceway parts 2a and 1a of the outer and inner rings 2 and 1 and the balls 3 to 10 μm is 1.1% by mass or more from the viewpoint of controlling the amount of residual austenite, which exhibits an effect of relaxing stress concentration to the surface damaged part such as brinelling, to a prescribed value corresponding to each of the fixed ring and the driving ring and also obtaining prescribed surface hardness corresponding to each of the fixed ring and the driving ring, and is 1.6% by mass or less from the viewpoint of decreasing the amount of coarse precipitates of carbides (e.g., precipitates having a particle diameter exceeding 10 μm) present in the surface layer to thereby further improve the life.

The content of nitrogen in the surface layer ranging from the surface of each of the polished parts including the raceway parts 2a and 1a of the outer and inner rings 2 and 1 and the balls 3 to 10 μm is 0.1% by mass or more from the viewpoint of improving yield stress through dispersion enhancement by Orowan mechanism to secure sufficient static loading capacity, and is 1.0% by mass or less from the viewpoint of controlling the Vickers hardness (or Rockwell hardness C) at the position of a depth of 50 μm from the surface to a prescribed value corresponding to each of the fixed ring and the driving ring by suppressing intrusion of excessive nitrogen into the steel to secure a necessary amount of carbon and thus achieving a long life as well as securing sufficient static loading capacity for each of the fixed ring and the driving ring.

The ball 3 that is a rolling element may be a general rolling element composed of a member composed of JIS SUJ2. Also, the ball 3 may be constituted by a bearing constituent member similar to the outer ring 2.

Incidentally, in the bass bearing 10 according to the second embodiment, the outer ring 2 is a fixed ring and the inner ring 1 is a driving ring but, in the invention, the inner ring 1 may be a fixed ring and the outer ring 2 may be a driving ring. In this case, as the inner ring 1 that is a fixed ring, use is made of a bearing constituent member where, at the polished part, the content of carbon in the surface layer ranging from the surface to 10 μm is 1.1 to 1.6% by mass, the Vickers hardness at the position of a depth of 50 μm from the surface is 800 to 940 (Rockwell C hardness is 64 to 68), the amount of residual austenite at the position of a depth of 10 μm from the surface is 5 to 30% by volume, the content of nitrogen in the surface layer ranging from the surface to 10 μm is 0.1 to 1.0% by mass, particles composed of vanadium nitride having a particle diameter of 0.2 to 2 μm and/or particles composed of vanadium carbonitride having a particle diameter of 0.2 to 2 μm are present in the surface layer ranging from the surface to 10 μm, and the area ratio of the particles composed of vanadium nitride having a particle diameter of 0.2 to 2 μm and/or the particles composed of vanadium carbonitride having a particle diameter of 0.2 to 2 μm in the surface layer ranging from the surface to 10 μm is 1 to 10%.

The outer ring 2 can be produced by the process for producing a bearing constituent member according to the second embodiment of the invention to be mentioned later.

The inner ring 1 is obtained by heating the workpiece, which has been obtained by processing a steel containing 3.2 to 5.0% by mass of chromium and 0.05% by mass or more to less than 0.5% by mass of vanadium into a prescribed shape, at 850 to 900° C. in a carbonitriding atmosphere of a carbon potential of 0.9 to 1.3 and an ammonia gas concentration of 2 to 5% by volume, then rapidly cooling the material, subsequently subjecting the resultant intermediate material to a tempering treatment where the material is heated at 160° C. or higher, and subsequently subjecting it to a finish-processing.

[Process for Producing Bearing Constituent Member]

Next, a process for producing an outer ring is explained as an example of a process for producing the bearing constituent member. FIG. 2B is a process chart illustrating a process for producing the bearing constituent member (outer ring) according to the second embodiment of the invention.

First, a ringed material 63 [see FIG. 2B (a)] of the outer ring composed of a steel containing 3.2 to 5.0% by mass of chromium and 0.05% by mass or more to less than 0.5% by mass of vanadium is produced and the resultant ringed material 63 is subjected to cutting or the like into a prescribed shape to obtain a workpiece 64 of the outer ring having a machining allowance for polishing in a part for forming each of the raceway part 61a, the end surface 61b, the shoulder surface 61c, and the outer peripheral surface 61d and having the chamfer 61e having an R-shape cross-section at the outer peripheral side of the outer ring, which connects to the end surface 61b and the outer peripheral surface 61d, and the chamfer 61f having a linear shape cross-section at the inner peripheral side of the outer ring, which connects to the end surface 61b and the shoulder surface 61c ["pre-processing step", see FIG. 2B (b)].

As the steel, use can be made of a steel containing 0.7 to 0.9% by weight of carbon, 0.05 to 0.70% by mass of silicon, 0.05 to 0.7% by mass of manganese, 3.2 to 5.0% by mass of chromium, 0.1 to 1.0% by mass of molybdenum, and 0.05% by mass or more to less than 0.5% by mass of vanadium, the remainder being iron and unavoidable impurities.

According to such a steel, the amount of coarse eutectic carbides precipitated at steel making on the surface of the outer ring 61 decreases, fatigue failure at bearing can be suppressed, and sufficient hardness can be secured after hardening or after carbonitriding and tempering.

In the above-described steel, carbon is an element for increasing the hardness of the steel to obtain inner hardness for securing strength when the carbonitriding treatment is performed at the following step. Also, carbon is an element for enabling the improvement of a rolling fatigue life by letting a large number of non-dissolved carbides remain in the steel before the carbonitriding treatment to be mentioned later and achieving a state that they remain finely and in a large amount even after the carbonitriding treatment.

The content of carbon in the steel is 0.7% by mass or more from the viewpoint of letting the non-dissolved carbides sufficiently remain in the steel, and is 0.9% by mass or less from the viewpoint of sufficiently obtaining processability before the carbonitriding treatment and also suppressing the formation of coarse eutectic carbides that are prone to be starting points of fatigue failure at steel production.

Moreover, in the steel, chromium is an element for improving the rolling fatigue life of the bearing constituent member by forming a large amount of the non-dissolved carbides in the stage before the carbonitriding treatment, which act as precipitation nuclei at the carbonitriding treatment, and precipitating fine carbides ($M_7C_3$ type carbides, $M_{23}C_6$ type carbides), fine carbonitrides [$M_7(C,N)_3$ type carbonitrides, $M_{23}(C,N)_6$ type carbides], and fine nitrides (CrN, VN) in the surface carbonitrided layer after carbonitriding. Furthermore, chromium accelerates the nitriding reaction in the top surface layer of the steel by acceleration of the formation of carbonitrides and nitrides in the steel and also suppresses the carburizing reaction (suppression of occurrence of over carburized tissue).

The content of chromium in the steel is 3.2% by mass or more from the viewpoint of obtaining the above-described effects, and is 5.0% by mass or less from the viewpoint of easily effecting the suppression of formation of the eutectic carbides that become starting points of fatigue failure and from the viewpoint of reducing the costs.

In the above-described steel, vanadium is an element having strong affinity to carbon and an element that forms carbide. Moreover, since vanadium carbide formed from carbon and vanadium has high dissolution temperature as compared with molybdenum carbide, most of vanadium carbide present before the carbonitriding treatment does not dissolve in the temperature range of the carbonitriding treatment at the production of the bearing constituent member of the invention and is present in the steel as non-dissolved vanadium carbide. Such non-dissolved vanadium carbide acts as a precipitation nucleus for carbides (VC), carbonitrides (V(C,N)], nitrides [(Cr,V)N], and the like at the carbonitriding treatment and also contributes fining of the precipitates of the carbides, carbonitrides, nitrides, and the like, so that the hardness of the steel and the rolling fatigue life can be improved. In addition, vanadium can accelerate the nitriding reaction and suppress the carburizing reaction (suppression of occurrence of over carburized tissue) in the top surface layer of the steel by acceleration of the formation of carbonitrides and nitrides, to a larger extent than the case of chromium in the steel. Also, vanadium acts as an element for improving resistance against softening on tempering by the tempering treatment step to be mentioned later. The content of vanadium in the steel is 0.05% by mass or more from the viewpoint of obtaining the above-described effects, and is less than 0.5% by mass from the viewpoint of sufficiently securing the amount of the dissolved carbon and securing the amount of residual austenite sufficient as an outer ring that is a fixed ring by suppressing the formation of vanadium carbide.

In the above-described steel, silicon is an element necessary for deacidification at refining of the steel. Also, silicon is an element having an effect of suppressing coarse growth of carbides since silicon has a property of being hardly dissolved in carbides.

The content of silicon in the steel is 0.05% by mass or more from the viewpoint of obtaining the above-described effects, and is 0.70% by mass or less from the viewpoint of obtaining sufficient processability before the carbonitriding treatment and also reducing the costs required for the steel, processing, and the like.

In the above-described steel, manganese is an element which stabilizes austenite in the steel. Also, manganese is an element capable of easily increasing the amount of residual austenite by increasing the amount of manganese contained in the steel.

The content of manganese in the steel is 0.05% by mass or more from the viewpoint of obtaining the above-described effects, and is 0.7% by mass or less, preferably 0.50% by mass or less from the viewpoint of increasing the amount of non-dissolved carbides in the steel and precipitating the carbides to improve the hardness of the steel and obtaining sufficient hot processability and mechanical processability.

In the above-described steel, molybdenum is an element having affinity to carbon stronger than chromium and is an element involved in the formation of carbides and carbonitrides. Also, molybdenum is an element which elevates the dissolution temperature of carbides and carbonitrides at a temperature of the carbonitriding treatment at the production of the bearing constituent member of the invention and increases non-dissolved carbides and carbonitrides. Therefore, molybdenum is an important element for increasing the amounts of fine carbides and carbonitrides in the surface carbonitrided layer after the carbonitriding treatment and enhancing the hardness of the steel. Moreover, molybdenum improves hardenability of the steel and also increases the amount of residual austenite in the steel. Furthermore, molybdenum is an element which efficiently precipitates carbides ($M_{23}C_6$ type carbides) and carbonitrides [$M_{23}(C,N)_6$ type carbonitrides].

The content of molybdenum in the steel is 0.10% by mass or more from the viewpoint of obtaining the above-described effects, and is 1.0% by mass or less from the viewpoint of reducing the costs and from the viewpoint of suppressing the formation of coarse eutectic carbides that become starting points of fatigue failure.

Then, the resulting workpiece 64 of the outer ring is heated at 850 to 900° C. in a carbonitriding atmosphere of a carbon potential of 0.9 to 1.3 and an ammonia gas concentration of 2 to 5% by volume for a prescribed time, and then rapidly cooled to a prescribed temperature ["carbonitriding treatment step", see FIG. 2B (c)].

The carbon potential in the carbonitriding atmosphere is 0.9 or more from the viewpoint of controlling hardness on the surface to sufficient hardness, and is 1.3 or less from the viewpoint of controlling the area ratio of the precipitates containing the vanadium nitride or vanadium carbonitride to the aforementioned range and also suppressing the occurrence of the over carburized tissue.

Moreover, the ammonia gas concentration in the carbonitriding atmosphere is 2% by volume or more from the viewpoint of suppressing the occurrence of the over carburized tissue, and is 5% by volume or less from the viewpoint of preventing the embrittlement by over nitriding.

The heating temperature in the carbonitriding atmosphere is 850° C. or higher from the viewpoint of forming a sufficient hardened layer, and is 900° C. or lower from the viewpoint of suppressing intrusion of excessive carbon into the bearing constituent member to suppress the occurrence of the over carburized tissue and from the viewpoint of suppressing the precipitation of the coarse carbides.

Moreover, the heating time is 4 hour or longer from the viewpoint of obtaining a carburized depth sufficient for strengthening the surface layer.

The rapid cooling is performed by oil cooling in an oil bath of a cooling oil. The oil bath temperature of the cooling oil is sufficiently usually 60 to 180° C.

Then, the workpiece (intermediate material) 64 of the outer ring after the carbonitriding treatment is subjected to a subzero treatment where the workpiece is cooled to a prescribed temperature of lower than 0° C. ["subzero treatment", see FIG. 2B (d)].

The cooling temperature in the subzero treatment is preferably −100° C. or higher from the viewpoint of reducing the costs, and is preferably −50° C. or lower from the viewpoint of changing the residual austenite to prescribed martensite.

Moreover, the cooling time in the subzero treatment is preferably 1 hour or longer from the viewpoint of securing sufficient static loading capacity for use as a fixed ring.

Thus, by performing the subzero treatment to change the residual austenite to prescribed martensite, sufficient static loading capacity for use as a fixed ring can be secured.

Then, the workpiece 64 (intermediate material) of the outer ring after the subzero treatment is subjected to a tempering treatment where the workpiece is heated at a prescribed temperature ["tempering treatment step", see FIG. 2B (e)].

The heating temperature in the tempering treatment is 150° C. or higher from the viewpoint of securing heat resistance as a bearing, and is 250° C. or lower from the viewpoint of securing prescribed hardness.

Moreover, the heating time in the tempering treatment is 0.5 hours or longer from the viewpoint of performing the treatment evenly.

Thereafter, the parts for forming each of the raceway surface 61a, the end surface 61b, the shoulder surface 61c, and the outer peripheral surface 61d of the workpiece 64 of the outer ring after the tempering treatment are subjected to polish-processing and the raceway surface 61a is subjected to ultra finish-processing to finish the surface with prescribed accuracy [see FIG. 2B (f), "finish-processing step"]. Thus, an objective outer ring 61 can be obtained. In the resultant outer ring 61, the raceway surface 61a, the end surface 61b, the shoulder surface 61c, and the outer peripheral surface 61d are constituted as polished parts and, of the outer ring 61, the chamfer 61e at the outer peripheral side of the outer ring and the chamfer 61f at the inner peripheral side of the outer ring are constituted as non-polished parts where polishing has not been performed.

EXAMPLES

The following will explain the invention in further detail with reference to Examples but the invention is not limited to such Examples.

Examples 1-1 to 1-3 and Comparative Examples 1-1 to 1-7

Each of two kinds of steels A and B having the composition shown in Table 1 was used and processed into a prescribed shape to produce a workpiece of each of inner and outer rings for a ball bearing (Model No. 6206) having a machining allowance for polishing in a part for forming a raceway surface. The steel B in Table 1 is JIS SUJ2 that is a bearing steel. Incidentally, the diameter of the rolling element was 9.525 mm.

TABLE 1

| Steel | Representative ingredients (% by mass) | | | | | |
|---|---|---|---|---|---|---|
| | C | Si | Mn | Cr | Mo | V |
| Steel A | 0.8 | 0.5 | 0.4 | 3.5 | 0.15 | 0.2 |
| Steel B | 1 | 0.2 | 0.35 | 1.45 | — | — |

Then, the resultant workpiece was subjected to a heat treatment under the heat treatment conditions shown in FIG. 3 to FIG. 12 and the part for forming a raceway surface of the resultant intermediate material after the heat treatment was subjected to polish-processing to produce combinations of inner and outer rings of Examples 1-1 to 1-3 and Comparative Examples 1-1 to 1-7. Specifically, in the combination of inner and outer rings of each of Examples 1-1 to 1-3 and Comparative Examples 1-1 to 1-7, as shown in Tables 3 and 5, the combination of inner and outer rings is such a combination thereof that the inner ring and the outer ring were obtained by subjecting the same steel to a heat treatment under the same heat treatment conditions in each Example and each Comparative Example.

Figure 3:
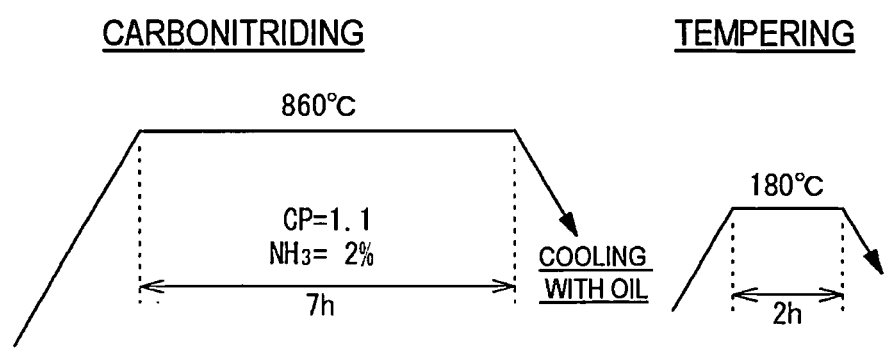
FIG. 3 is a diagram illustrating heat treatment conditions at the production of inner and outer rings of Example 1-1, which is Experimental No. 1-1, and heat treatment conditions in Experimental No. 2-1.

The heat treatment conditions shown in FIG. 3 are conditions that the workpiece is heated at 860° C. for 7 hours in a carbonitriding atmosphere of a carbon potential of 1.1 and an ammonia gas concentration of 2% by volume, subsequently cooled with an oil to 80° C., and then heated at 180° C. for 2 hours [tempering treatment] (Experimental No. 1-1).

Figure 4:
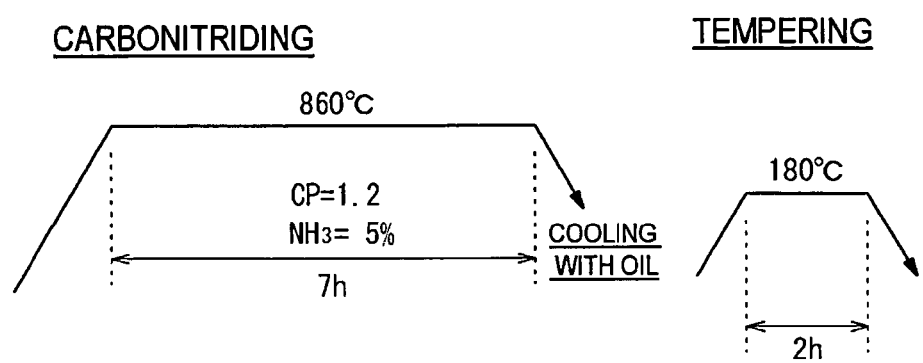
FIG. 4 is a diagram illustrating heat treatment conditions at the production of inner and outer rings of Example 1-2 and Example 1-4, which is Experimental No. 1-2, and heat treatment conditions in Experimental No. 2-12.

The heat treatment conditions shown in FIG. 4 are conditions that the workpiece is heated at 860° C. for 7 hours in a carbonitriding atmosphere of a carbon potential of 1.2 and an ammonia gas concentration of 5% by volume, subsequently cooled with an oil to 80° C., and then heated at 180° C. for 2 hours [tempering treatment] (Experimental No. 1-2).

Figure 5:
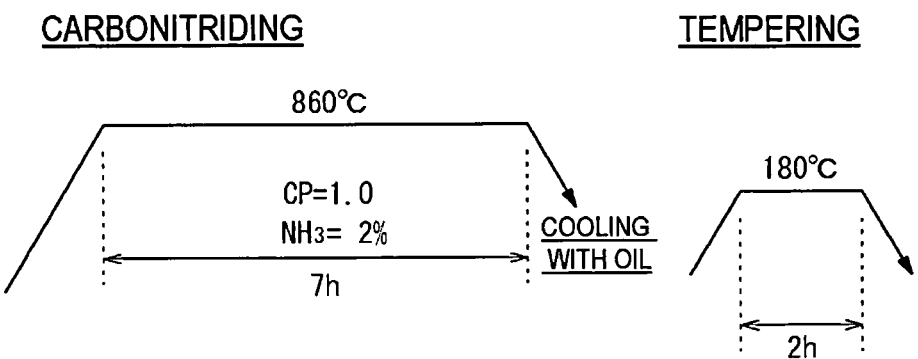
FIG. 5 is a diagram illustrating heat treatment conditions at the production of inner and outer rings of Example 1-3, which is Experimental No. 1-3, and heat treatment conditions in Experimental No. 2-13.

The heat treatment conditions shown in FIG. 5 are conditions that the workpiece is heated at 860° C. for 7 hours in a carbonitriding atmosphere of a carbon potential of 1.0 and an ammonia gas concentration of 2% by volume, subsequently cooled with an oil to 80° C., and then heated at 180° C. for 2 hours [tempering treatment] (Experimental No. 1-3).

Figure 6:
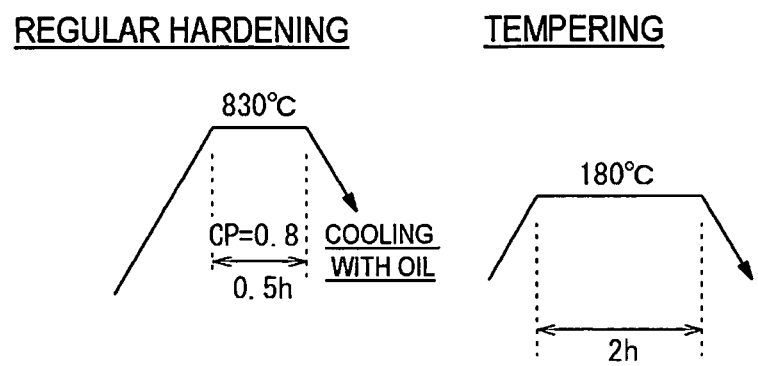
FIG. 6 is a diagram illustrating heat treatment conditions at the production of inner and outer rings of Comparative Example 1-1 and Comparative Example 1-9 and at the production of rolling elements of a ball bearing using the inner and outer rings, which is Experimental No. 1-4, and heat treatment conditions in Experimental No. 2-6 and Comparative Example 2-8.

The heat treatment conditions shown in FIG. 6 are conditions that the workpiece is zubu-hardened by heating at 830° C. for 0.5 hours in an atmosphere of a carbon potential of 1.1, subsequently cooled with an oil to 80° C., and then heated at 180° C. for 2 hours [tempering treatment] (Experimental No. 1-4).

Figure 7:
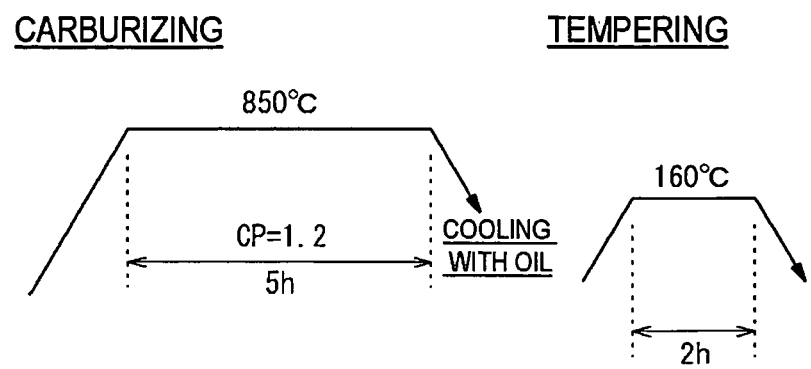
FIG. 7 is a diagram illustrating heat treatment conditions at the production of inner and outer rings of Comparative Example 1-2, which is Experimental No. 1-5, and heat treatment conditions in Experimental No. 2-7.

The heat treatment conditions shown in FIG. 7 are conditions that the workpiece is heated at 850° C. for 5 hours in a carburizing atmosphere of a carbon potential of 1.2, subsequently cooled with an oil to 80° C., and then heated at 160° C. for 2 hours [tempering treatment] (Experimental No. 1-5).

Figure 8:
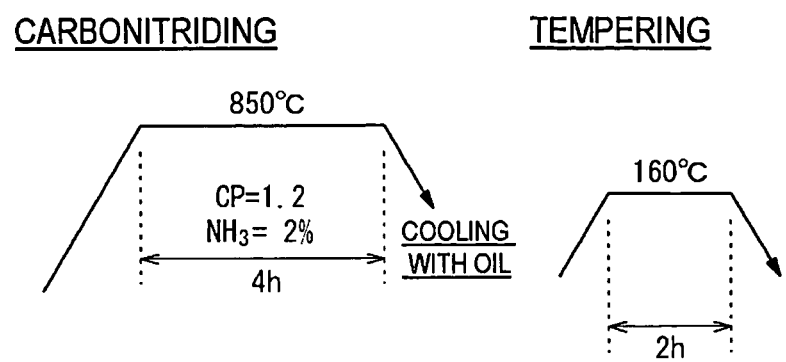
FIG. 8 is a diagram illustrating heat treatment conditions at the production of inner and outer rings of Comparative Example 1-3 and at the production of rolling elements of a ball bearing using the inner and outer rings of Examples 1-1 to 1-3 and Comparative Examples 1-2 to 1-7, which is Experimental No. 1-6, and heat treatment conditions in Experimental No. 2-2.

The heat treatment conditions shown in FIG. 8 are conditions that the workpiece is heated at 850° C. for 4 hours in a carbonitriding atmosphere of a carbon potential of 1.2 and an ammonia gas concentration of 2% by volume, subsequently cooled with an oil to 80° C., and then heated at 160° C. for 2 hours [tempering treatment] (Experimental No. 1-6).

Figure 9:
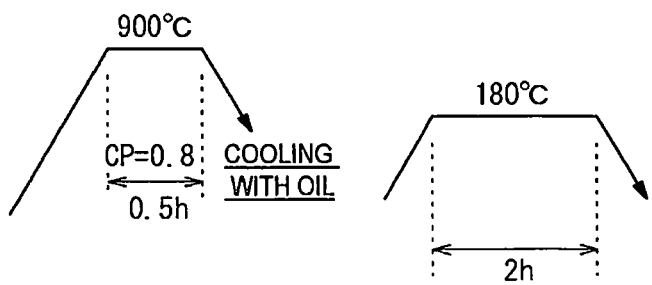
FIG. 9 is a diagram illustrating heat treatment conditions at the production of inner and outer rings of Comparative Example 1-4, which is Experimental No. 1-7, and heat treatment conditions in Experimental No. 2-8.

The heat treatment conditions shown in FIG. 9 are conditions that the workpiece is zubu-hardened by heating at 900° C. for 0.5 hours in an atmosphere of a carbon potential of 0.8, subsequently cooled with an oil to 80° C., and then heated at 180° C. for 2 hours [tempering treatment] (Experimental No. 1-7).

Figure 10:
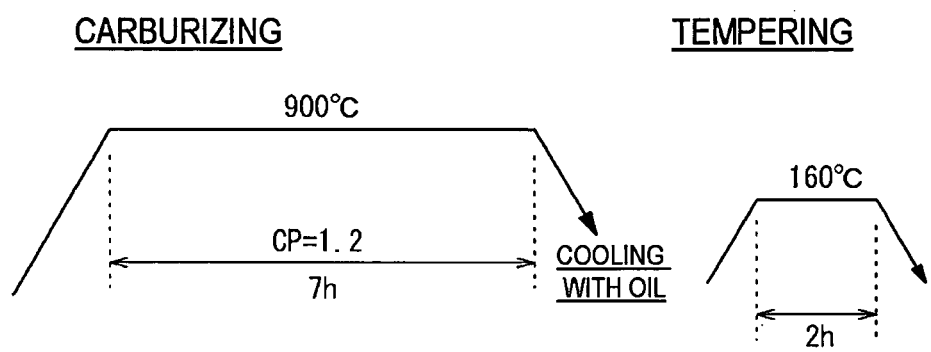
FIG. 10 is a diagram illustrating heat treatment conditions at the production of inner and outer rings of Comparative Example 1-5, which is Experimental No. 1-8, and heat treatment conditions in Experimental No. 2-9.

The heat treatment conditions shown in FIG. 10 are conditions that the workpiece is heated at 900° C. for 7 hours in a carburizing atmosphere of a carbon potential of 1.2, subsequently cooled with an oil to 80° C., and then heated at 160° C. for 2 hours [tempering treatment] (Experimental No. 1-8).

Figure 11:
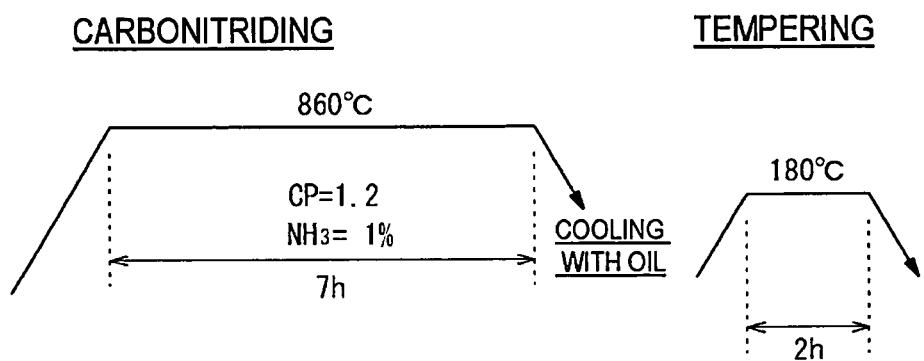
FIG. 11 is a diagram illustrating heat treatment conditions at the production of inner and outer rings of Comparative Example 1-6, which is Experimental No. 1-9, and heat treatment conditions in Experimental No. 2-10.

The heat treatment conditions shown in FIG. 11 are conditions that the workpiece is heated at 860° C. for 7 hours in a carbonitriding atmosphere of a carbon potential of 1.2 and an ammonia gas concentration of 1% by volume, subsequently cooled with an oil to 80° C., and then heated at 180° C. for 2 hours [tempering treatment] (Experimental No. 1-9).

Figure 12:
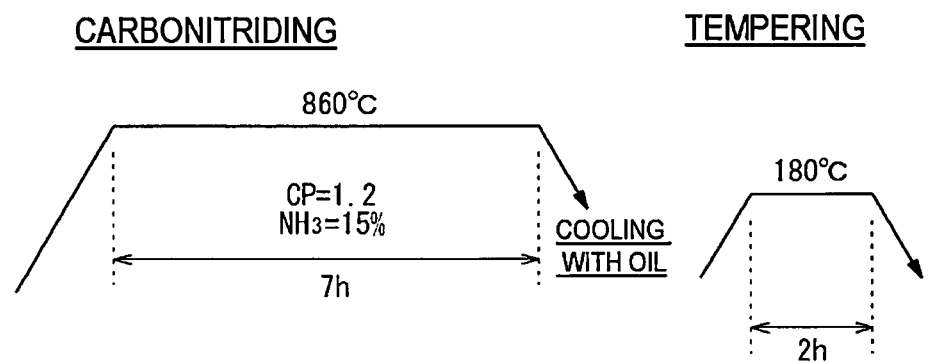
FIG. 12 is a diagram illustrating heat treatment conditions at the production of inner and outer rings of Comparative Example 1-7, which is Experimental No. 1-10, and heat treatment conditions in Experimental No. 2-11.

The heat treatment conditions shown in FIG. 12 are conditions that the workpiece is heated at 860° C. for 7 hours in a carbonitriding atmosphere of a carbon potential of 1.2 and an ammonia gas concentration of 15% by volume, subsequently cooled with an oil to 80° C., and then heated at 180° C. for 2 hours [tempering treatment] (Experimental No. 1-10).

Test Example 1-1

For the inner rings of Examples 1-1 to 1-3 and Comparative Examples 1-1 to 1-7, Vickers hardness (Rockwell C hardness) at the position of a depth of 50 µm from the surface (polished part) of the raceway part, the amount of residual austenite at the position of a depth of 10 µm from the surface, the amount of internal residual austenite at the position of a depth of 2 mm from the surface, the content of carbon in the surface layer ranging from the surface to 10 µm, the content of nitrogen in the surface layer ranging from the surface to 10 µm, the form of precipitates, and the area ratio of vanadium-based precipitates (particles composed of vanadium carbonitride having a particle diameter of 0.2 to 2 µm and particles composed of vanadium nitride having a particle diameter of 0.2 to 2 µm) in the surface layer ranging from the surface to 10 µm were investigated.

In order to measure substantial hardness of the surface layer, Vickers hardness at the position of a depth of 50 µm from the surface was measured by cutting the inner ring from the surface of the raceway part in a depth direction and then applying a Vickers indentation to the position of a depth of 50 µm from the surface. Rockwell C hardness was determined by converting the measured value of the Vickers hardness. The amount of residual austenite in the surface layer part at the position of a depth of 10 µm from the surface was determined by electrolytically polishing the surface of the raceway part of the inner ring into a depth of 10 µm and measuring the amount of residual austenite on the charge polished surface. The amount of internal residual austenite at the position of a depth of 2 mm from the surface was determined by electrolytically polishing the surface of the raceway part of the inner ring into a depth of 2 mm and measuring the amount of residual austenite on the charge polished surface. Each of the content of carbon in the range of from the surface to 10 µm and the content of nitrogen in the range of from the surface to 10 µm was determined by cutting the inner ring from the surface of the raceway part in a depth direction and then measuring each content in the range of from the surface to 10 µm.

The form of the precipitates was evaluated by cutting the inner ring from the surface of the raceway part in a depth direction and then observing the range of from the surface to 10 µm. The area ratio of the vanadium-based precipitates (particles composed of vanadium carbonitride having a particle diameter of 0.2 to 2 µm and particles composed of vanadium nitride having a particle diameter of 0.2 to 2 µm) in the surface layer ranging from the surface to 10 µm was determined by cutting the inner ring from the surface of the raceway part in a depth direction and then measuring the ratio in the range of from the surface to 10 µm.

Figure 13:
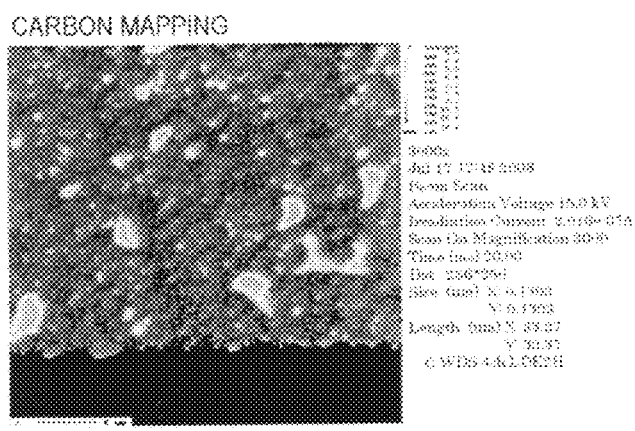
FIG. 13A is a substitute photograph for drawing illustrating carbon mapping on the surface of the inner ring of Example 1-1.
FIG. 13B is a substitute photograph for drawing illustrating nitrogen mapping on the surface of the inner ring of Example 1-1.
FIG. 13C is a substitute photograph for drawing illustrating vanadium mapping on the surface of the inner ring of Example 1-1.
Figure 13:
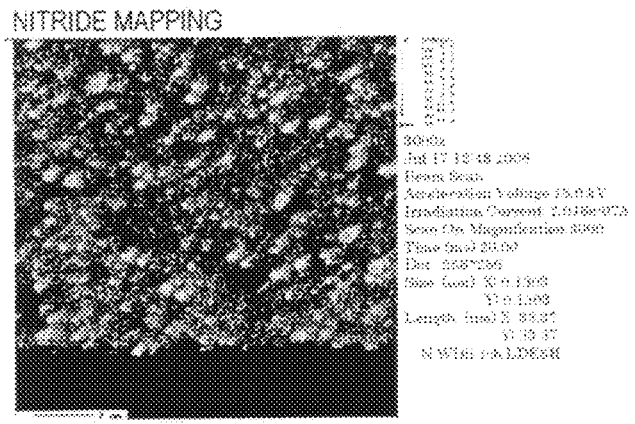
Figure 13:
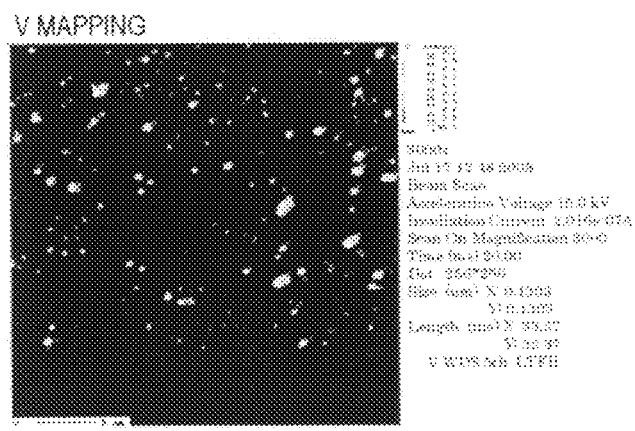

Incidentally, with regard to the form of the precipitates and the area ratio of the vanadium-based precipitates (particles composed of vanadium carbonitride having a particle diameter of 0.2 to 2 µm and particles composed of vanadium nitride having a particle diameter of 0.2 to 2 µm), carbon [FIG. 13(a)], nitrogen [FIG. 13(b)], and vanadium [FIG. 13(c)] were mapped in a measuring field of view of 800 µm$^2$ under conditions of a acceleration voltage of 15.0 kV, an irradiation current of $2.016 \times 10^{-7}$ A, and a scanning magnification of 3000 times using an electrolytic emission type electron probe micro-analyzer, and the area ratio was calculated on an image processing apparatus. The results of mapping carbon, nitrogen, and vanadium in the surface (range of from the surface to 10 µm) of the inner ring of Example 1-1 are shown in FIG. 13(a) to (c). In FIG. 13, the scale bar shows 5 µm.

From the results shown in FIG. 13(a) to (c), it is understood that particles composed of the vanadium-based precipitates (vanadium carbonitride and vanadium nitride) having a particle diameter of 0.2 µm or more capable of improving yield stress through dispersion enhancement by Orowan mechanism and a particle diameter of 2 μm or less capable of inducing coarsening of the particles by Ostwald growth can be confirmed in the range of from the surface of the raceway part of the inner ring of Example 1-1 to 10 μm. Moreover, from the results shown in FIG. 13(a) to (c), it is understood that particles composed of the vanadium-based precipitates having a particle diameter of less than 0.2 μm are also present.

Similarly, as a result of evaluation of the form of the precipitates and the area ratio of the vanadium-based precipitates (particles composed of vanadium carbonitride having a particle diameter of 0.2 to 2 μm and particles composed of vanadium nitride having a particle diameter of 0.2 to 2 μm) in the surface layer ranging from the surface to 10 μm for the inner ring of each of Examples 1-2 to 1-3 and Comparative Examples 1-6 and 1-7, particles composed of the vanadium-based precipitates (vanadium nitride and vanadium carbonitride) having a particle diameter of 0.2 to 2 μm are also present in the surface (range from the surface to 10 μm) of the inner ring of each of Examples 1-2 to 1-3 and Comparative Examples 1-6 and 1-7, and the size of the particles and the shape of the particles composed of the vanadium-based precipitates (vanadium nitride and vanadium carbonitride) in the surface (range from the surface to 10 μm) of the raceway part of the inner ring of each of Examples 1-2 to 1-3 and Comparative Examples 1-6 and 1-7 are much the same as those of the particles composed of the vanadium-based precipitates in the inner ring of Example 1-1. However, the amount (area ratio) of the particles composed of the vanadium-based precipitates (vanadium nitride and vanadium carbonitride) having a particle diameter of 0.2 to 2 μm precipitated in the surface (range from the surface to 10 μm) of the raceway part of the inner ring of each of Examples 1-2 to 1-3 and Comparative Examples 1-6 and 1-7 is different from that in Example 1-1.

Moreover, respective ball bearings of Examples 1-1 to 1-3 and Comparative Examples 1-1 to 1-7 were assembled using combinations of inner and outer rings of Examples 1-1 to 1-3 and Comparative Examples 1-1 to 1-7. In the respective ball bearings of Examples 1-1 to 1-3 and Comparative Examples 1-1 to 1-7, the rolling element obtained by subjecting the steel B to the heat treatment under the heat treatment conditions shown in FIG. 8 was used as a rolling element. On the other hand, in Comparative Example 1-1, the rolling element obtained by subjecting the steel B to the heat treatment under the heat treatment conditions shown in FIG. 6 was used as a rolling element.

A rating volume ratio of each ball bearing of Examples 1-1 to 1-3 and Comparative Examples 1-1 to 1-7 is $1.3C_0$. For each ball bearing of Examples 1-1 to 1-3 and Comparative Examples 1-1 to 1-7, the life in a lubricating oil contaminated with foreign matter (life in a foreign matter oil) that is one index of the life was investigated. Moreover, for each ball bearing of Examples 1-1 to 1-3 and Comparative Examples 1-1 to 1-7, raceway ring brinelling depth that is one index of the static loading capacity and also dimensional stability were investigated.

The life in a foreign matter oil was tested under the conditions shown in Table 2. The life in a foreign matter oil was evaluated according to the following judgment criteria.
[Judgment Criteria]
Good: 8 times or more the L10 life of the ball bearing of Comparative Example 1-1
Bad: less than 8 times the L10 of the ball bearing of Comparative Example 1-1

TABLE 2

| Test Conditions | |
|---|---|
| Sample bearing model No. | 6202 (inner diameter: 30 mm, outer diameter: 62 mm, width: 16 mm) |
| Load | Fr = 9 kN/set (0.46 Cr) |
| Number of rotation | 2500 rpm |
| Lubrication | Turbine oil #68 (oil bath: 90° C.) |
| Foreign matter | Heiss steel (0.02% by mass, particle diameter: 100 to 150 μm, hardness: 730 Hv) |
| Number of sudden death | 2 |

Figure 14:
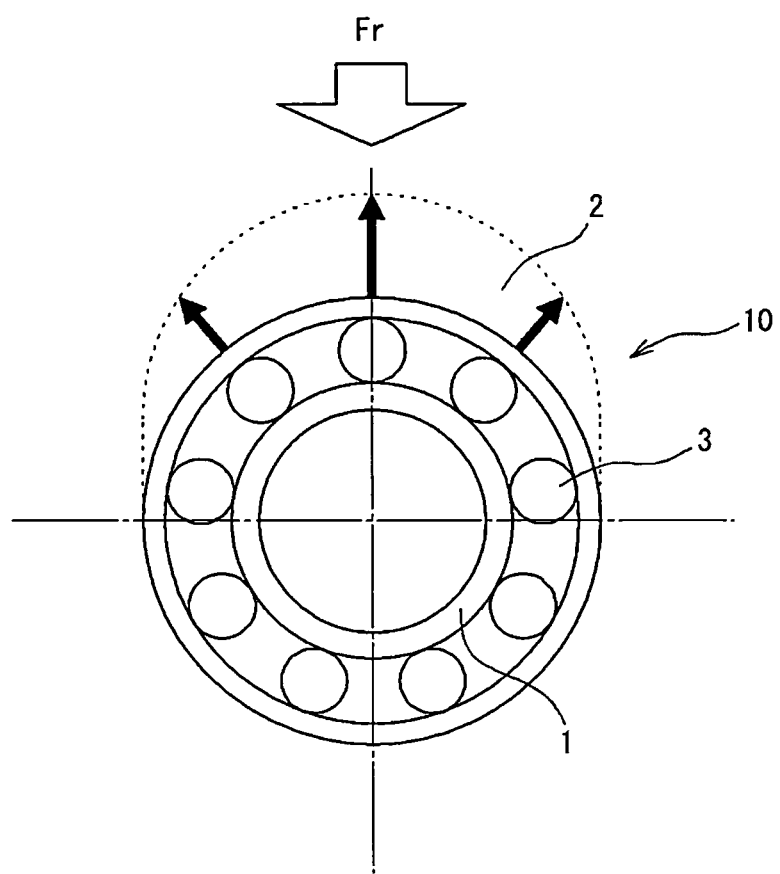
FIG. 14 is a schematic diagram illustrating a measurement method of raceway ring brinelling depth in Test Example 1-1.

Moreover, the raceway ring brinelling depth was evaluated, as shown in FIG. 14, by fitting the inner ring of each ball bearing of Examples 1-1 to 1-3 and Comparative Examples 1-1 to 1-7 into a shaft to make an axis line thereof horizontal, disposing one ball at the top in a vertical direction of the inner ring raceway surface, imparting a load of 14.7 kN to the outer peripheral surface of the top in a vertical direction of the outer ring that is upward in a vertical direction of the one ball, measuring the depth of brinelling at the part where maximum load was induced in the raceway ring of the ball bearing by a three-dimensional shape meter. The raceway ring brinelling depth is a value of the sum of the brinelling depth generated in the inner ring and the brinelling depth generated in the outer ring. The raceway ring brinelling depth was evaluated according to the following judgment criteria.
[Judgment Criteria]
Good: the brinelling depth is 0.635 μm or less
Bad: the brinelling depth is larger than 0.635 μm Incidentally, the above-described "0.635 μm" is a permanent deformation quantity that is a limit which does not inhibit smooth rotation in the ball bearing when the diameter of the rolling element is 9.525 mm. This value is a value determined by regarding two third of the tolerance limit of deformation by brinelling over the whole rolling bearing as a tolerance value since the sum of the brinelling depth of the inner ring and the brinelling depth of the outer ring is two third of the tolerance limit of deformation by brinelling over the whole rolling bearing assuming that the deformation by brinelling generates evenly on the inner ring, the outer ring, and the rolling element (one third each of the total), among the tolerance limit of deformation by brinelling over the whole rolling bearing which is judged by the diameter of the rolling element (9.525 mm)×1/10000.

A shaft (outer diameter: 30 mm, length 50 mm) was pressed into a new inner ring of each of Examples 1-1 to 1-3 and Comparative Examples 1-1 to 1-7 and the whole was held at 150° C. for 1000 hours. Incidentally, the tensile stress at the shaft press-fitting is 100 to 150 MPa. Thereafter, the shaft was removed from each inner ring and the inner diameters were measured at 6 points (2 points each at an interval in an axis direction per 3 points at equal intervals in a circumferential direction) of the inner diameter surface of each inner ring. As a control, the inner diameters at the 6 points before the shaft press-fitting were measured. Thereafter, a change ratio [dimensional change ratio (%)] of the dimension after each passage of time to each dimension at the 6 points of the inner diameter surface of each inner ring before the heating was calculated. Incidentally, the dimensional change ratio is a ratio of (dimension of inner diameter after each passage of time−dimension of inner diameter before shaft press-fitting)/dimension of inner diameter before shaft press-fitting.

The dimensional change ratio was evaluated according to the following judgment criteria.
Good: the dimensional change ratio is less than 0.11%
Bad: the dimensional change ratio is 0.11% or more Table 3 shows the kind of the steel and heat treatment conditions used in the inner and outer rings of Examples 1-1 to 1-3 and the kind of the steel and heat treatment conditions used in the assembling of the ball bearings of Examples 1-1 to 1-3. Also, Table 4 shows the kind of the steel and heat treatment conditions used in the inner and outer rings of Comparative Examples 1-1 to 1-7 and the kind of the steel and heat treatment conditions used in the assembling of the ball bearings of Comparative Examples 1-1 to 1-7. For the combinations of the inner and outer rings of Examples 1-1 to 1-3 and Comparative Examples 1-2 to 1-7, a rolling element obtained by subjecting the steel B to a heat treatment under the heat treatment conditions shown in FIG. 8 was used as a rolling element. For the combination of the inner and outer rings of Comparative Examples 1-1, a rolling element obtained by subjecting the steel B to a heat treatment under the heat treatment conditions shown in FIG. 6 was used as a rolling element.

TABLE 3

| Sample name | Production conditions | | Rolling element used for assembling ball bearing | |
|---|---|---|---|---|
| | Steel | Heat treatment | Steel | Heat treatment |
| Example 1-1 | Steel A | Carbonitriding FIG. 3 | Steel B | Carbonitriding FIG. 8 |
| Example 1-2 | Steel A | Carbonitriding FIG. 4 | Steel B | Carbonitriding FIG. 8 |
| Example 1-3 | Steel A | Carbonitriding FIG. 5 | Steel B | Carbonitriding FIG. 8 |

TABLE 4

| Sample name | Production conditions | | Rolling element used for assembling ball bearing | |
|---|---|---|---|---|
| | Steel | Heat treatment | Steel | Heat treatment |
| Comparative Example 1-1 | Steel B | Regular hardening FIG. 6 | Steel B | Regular hardening FIG. 6 |
| Comparative Example 1-2 | Steel B | Carburizing FIG. 7 | Steel B | Carbonitriding FIG. 8 |
| Comparative Example 1-3 | Steel B | Carbonitriding FIG. 8 | Steel B | Carbonitriding FIG. 8 |
| Comparative Example 1-4 | Steel A | Regular hardening FIG. 9 | Steel B | Carbonitriding FIG. 8 |
| Comparative Example 1-5 | Steel A | Carburizing FIG. 10 | Steel B | Carbonitriding FIG. 8 |
| Comparative Example 1-6 | Steel A | Carbonitriding FIG. 11 | Steel B | Carbonitriding FIG. 8 |
| Comparative Example 1-7 | Steel A | Carbonitriding FIG. 12 | Steel B | Carbonitriding FIG. 8 |

Table 5 (Examples 1-1 to 1-3) and Table 6 (Comparative Examples 1-1 to 1-7) show results of investigation on Vickers hardness (Rockwell C hardness) at the position of a depth of 50 µm from the surface of the raceway part of the inner ring of each of Examples 1-1 to 1-3 and Comparative Examples 1-1 to 1-7, the amount of residual austenite in the surface layer part at the position of a depth of 10 µm from the surface, the amount of internal residual austenite at the position of a depth of 2 mm from the surface, the content of carbon in the surface layer ranging from the surface to 10 µm, the content of nitrogen in the surface layer ranging from the surface to 10 µm, the form of the precipitates, the area ratio of the vanadium-based precipitates in the surface layer ranging from the surface to 10 µm, the life in the foreign matter oil of each ball bearing of Examples 1-1 to 1-3 and Comparative Examples 1-1 to 1-7, the raceway ring brinelling depth of each ball bearing of Examples 1-1 to 1-3 and Comparative Examples 1-1 to 1-7, and the dimensional stability of each inner ring of Examples 1-1 to 1-3 and Comparative Examples 1-1 to 1-7. In the tables, the "Vickers hardness (Rockwell C hardness)" indicates Vickers hardness (Rockwell C hardness) at the position of a depth of 50 µm from the surface of the raceway part, the "amount (% by volume) of residual austenite in the surface layer part" indicates an amount of residual austenite in the surface layer part at the position of a depth of 10 µm from the surface, the "content of carbon (% by mass)" and the "content of nitrogen (% by mass)" indicate the content of carbon and the content of nitrogen in the surface layer ranging from the surface of the raceway part to 10 µm, respectively, and the "area ratio of the vanadium-based precipitates" indicates an area ratio of the sum of the particles composed of vanadium nitride having a particle diameter of 0.2 to 2 µm and particles composed of vanadium carbonitride having a particle diameter of 0.2 to 2 µm in the surface layer ranging from the surface of the raceway part to 10 µm. Also, the "amount (% by volume) of internal residual austenite" indicates an amount of internal residual austenite at the position of a depth of 2 mm from the surface of the raceway part, which is an amount of internal residual austenite at the region deeper than 1.5 mm from the surface of the raceway part that is a region deeper than the carbonitrided layer formed from the surface of the inner and outer rings of each of Examples 1-1 to 1-3 and Comparative Examples 1-3, 1-6, and 1-7.

The "amount (% by volume) of internal residual austenite" also indicates an amount of internal residual austenite at the position of a depth of 2 mm from the surface of the raceway part of each inner ring in Comparative Examples 1-1, 1-2, 1-4, and 1-5. The depth of 2 mm from the surface is a region deeper than the carbonitrided layer formed from the surface of the inner ring of each of Comparative Examples 1-2 and 1-5.

TABLE 5

| Sample name | Vickers hardness (Rockwell C hardness) | Amount of residual austenite in surface layer part (% by volume) | Amount of internal residual austenite (% by volume) | Content of carbon (% by mass) | Content of nitrogen (% by mass) | Form of precipitates | Area ratio of vanadium-based precipitates (%) |
|---|---|---|---|---|---|---|---|
| Example 1-1 | 800 (64) | 43 | 12 | 1.4 | 0.2 | $M_7C_3$ type carbides, $M_{23}C_6$ type carbides, Cementite Vanadium nitrides Vanadium carbonitrides | 3 |
| Example 1-2 | 770 (63) | 55 | 13 | 1.3 | 1 | $M_7C_3$ type carbides, $M_{23}C_6$ type carbides, Cementite | 7 |

TABLE 5-continued

| | | | | | | | |
|---|---|---|---|---|---|---|---|
| Example 1-3 | 865 (66) | 22 | 14 | 1.2 | 0.1 | Vanadium nitrides Vanadium carbonitrides $M_7C_3$ type carbides, $M_{23}C_6$ type carbides, Cementite Vanadium nitrides Vanadium carbonitrides | 4 |

| | Life in foreign matter oil | | Raceway ring brinelling depth Raceway ring brinelling | | Dimensional stability Dimensional | |
|---|---|---|---|---|---|---|
| Sample name | Evaluation | Life magnification | Evaluation | depth (μm) | Evaluation | change ratio (%) |
| Example 1-1 | good | 17 | good | 0.58 | good | 0.05 |
| Example 1-2 | good | 20 | good | 0.63 | good | 0.06 |
| Example 1-3 | good | 8 | good | 0.50 | good | 0.06 |

TABLE 6

| Sample name | Vickers hardness (Rockwell C hardness) | Amount of residual austenite in surface layer part (% by volume) | Amount of internal residual austenite (% by volume) | Content of carbon (% by mass) | Content of nitrogen (% by mass) | Form of precipitates | Area ratio of vanadium-based precipitates (%) |
|---|---|---|---|---|---|---|---|
| Comparative Example 1-1 | 720 (61) | 10 | 9 | 1 | 0 | Cementite | 0 |
| Comparative Example 1-2 | 830 (65) | 31 | 17 | 1.3 | 0 | Cementite | 0 |
| Comparative Example 1-3 | 800 (64) | 34 | 16 | 1.3 | 0.2 | Cementite | 0 |
| Comparative Example 1-4 | 720 (61) | 12 | 11 | 0.8 | 0 | $M_7C_3$ type carbides, $M_{23}C_6$ type carbides, Cementite | 0 |
| Comparative Example 1-5 | 800 (64) | 45 | 15 | 1.3 | 0 | $M_7C_3$ type carbides, $M_{23}C_6$ type carbides, Cementite | 0 |
| Comparative Example 1-6 | 800 (64) | 50 | 12 | 1.5 | 0.05 | $M_7C_3$ type carbides, $M_{23}C_6$ type carbides, Cementite Vanadium nitrides Vanadium carbonitrides | Less than 1% |
| Comparative Example 1-7 | 730 (61.5) | 60 | 13 | 1 | 1.5 | $M_7C_3$ type carbides, $M_{23}C_6$ type carbides, Cementite Vanadium nitrides Vanadium carbonitrides | 12 |

| | Life in foreign matter oil | | Raceway ring brinelling depth Raceway ring brinelling | | Dimensional stability Dimensional | |
|---|---|---|---|---|---|---|
| Sample name | Evaluation | Life magnification | Evaluation | depth (μm) | Evaluation | change ratio (%) |
| Comparative Example 1-1 | bad | 1 | bad | 0.82 | bad | 0.11 |
| Comparative Example 1-2 | bad | 3 | bad | 1.0 | bad | 0.14 |
| Comparative Example 1-3 | bad | 3 | bad | 1.0 | bad | 0.11 |
| Comparative Example 1-4 | bad | 1 | bad | 0.85 | bad | 0.20 |

TABLE 6-continued

| | | | | | | |
|---|---|---|---|---|---|---|
| Comparative Example 1-5 | good | 10 | bad | 1.4 | bad | 0.15 |
| Comparative Example 1-6 | good | 12 | bad | 1.6 | good | 0.06 |
| Comparative Example 1-7 | bad | 3 | bad | 2.0 | good | 0.05 |

From the results shown in Table 5, the life in the foreign matter oil of each ball bearing of Examples 1-1 to 1-3 is 8 times or more the L10 life of the ball bearing of Comparative Example 1-1. Therefore, according to the inner and outer rings of Examples 1-1 to 1-3, a long life of the rolling bearing can be achieved.

Also, from the results shown in Table 5, the raceway ring brinelling depth of each ball bearing of Examples 1-1 to 1-3 is 0.635 μm or less that is a permanent deformation quantity that is a limit which does not inhibit smooth rotation in the ball bearing when the diameter of the rolling element is 9.525 mm. Therefore, according to the inner and outer rings and the rolling elements of Examples 1-1 to 1-3, sufficient loading capacity can be secured.

Furthermore, from the results shown in Table 5, the dimensional change ratio of each inner ring of Examples 1-1 to 1-3 after 1000 hours from the shaft press-fitting is less than 0.11% (0.05 to 0.06%) and it is understood that the inner rings of Examples 1-1 to 1-3 are more excellent in dimensional stability than the inner ring of Comparative Example 1-1.

To the contrary, from the results shown in Table 6, the life in the foreign matter oil of each ball bearing of Comparative Examples 1-2 to 1-4 is less than 8 times (1 to 3 times) the L10 life of the ball bearing of Comparative Example 1-1 and thus the life in the foreign matter oil is shorter than that of each ball bearing of Examples 1-1 to 1-3. Moreover, the raceway ring brinelling depth of each ball bearing of Comparative Examples 1-1 to 1-4 is larger than 0.635 μm (0.82 to 1.0 μm) and it is understood that the depth is more than the permanent deformation quantity that is a limit which does not inhibit smooth rotation in the ball bearing. Furthermore, the dimensional change ratio of each inner ring of Comparative Examples 1-1 to 1-4 is 0.11 to 0.20% and thus it is understood that the dimensional stability is low.

Furthermore, from the results shown in Table 6, the life in the foreign matter oil of each ball bearing of Comparative Examples 1-5 and 1-6 is more than 8 times the L10 life of the ball bearing of Comparative Example 1-1 and thus the life in the foreign matter oil is almost equal to that of each ball bearing of Examples 1-1 to 1-3.

However, the raceway ring brinelling depth of each ball bearing of Comparative Examples 1-5 and 1-6 is larger than 0.635 μm [1.4 μm (Comparative Example 1-5) and 1.6 μm (Comparative Example 1-6), respectively] and it is understood that the depth is more than the permanent deformation quantity that is a limit which does not inhibit smooth rotation in the ball bearing. Furthermore, the dimensional change ratio of the inner ring of Comparative Examples 1-5 is 0.15% and thus it is understood that the dimensional stability is low.

Incidentally, the dimensional change ratio of the inner ring of Comparative Examples 1-6 is 0.06% and thus it is understood that the dimensional stability is almost equal to that of each inner ring of Examples 1-1 to 1-3.

Furthermore, from the results shown in Table 6, the dimensional change ratio of the inner ring of Comparative Example 1-7 is 0.05% and it is understood that the ratio is almost equal to that of each inner ring of Examples 1-1 to 1-3.

However, the life in the foreign matter oil of the ball bearing of Comparative Example 1-7 is less than 8 times (3 times) the L10 life of the ball bearing of Comparative Example 1-1 and thus the life in the foreign matter oil is shorter than that of each ball bearing of Examples 1-1 to 1-3. Moreover, the raceway ring brinelling depth of the ball bearing of Comparative Example 1-7 is larger than 0.635 μm (2.0 μm) and is more than the permanent deformation quantity that is a limit which does not inhibit smooth rotation in the ball bearing.

Therefore, from these results, in the case where the Vickers hardness at the position of a depth of 50 μm from the surface falls within the range of 740 to 900 (Rockwell C hardness of 62 to 67), the amount of residual austenite at the position of a depth of 10 μm from the surface falls within the range of 20 to 55% by volume, the content of carbon in the surface layer ranging from the surface to 10 μm falls within the range of 0.1 to 1.0% by mass, the content of nitrogen in the surface layer ranging from the surface to 10 μm falls within the range of 0.1 to 1.0% by mass, and the area ratio of the particles composed of vanadium-based precipitates having a particle diameter of 0.2 to 2 μm in the surface layer ranging from the surface to 10 μm falls within the range of 1 to 10% in the inner and outer rings using the steel A (Examples 1-1 to 1-3), it is understood that a long life of the rolling bearing can be achieved and sufficient static loading capacity and sufficient dimensional stability can be secured.

To the contrary, in the case where any of the Vickers hardness (Rockwell C hardness) at the position of a depth of 50 μm from the surface, the amount of residual austenite at the position of a depth of 10 μm from the surface, the content of carbon in the surface layer ranging from the surface to 10 μm falls, the content of nitrogen in the surface layer ranging from the surface to 10 μm, and the area ratio of the particles composed of vanadium-based precipitates having a particle diameter of 0.2 to 2 μm in the surface layer ranging from the surface to 10 μm in the inner and outer rings fall out of the above-described ranges, it is understood that any of the life of the rolling bearing, the static loading capacity, and the dimensional stability are insufficient.

Test Example 1-2

Figure 15:
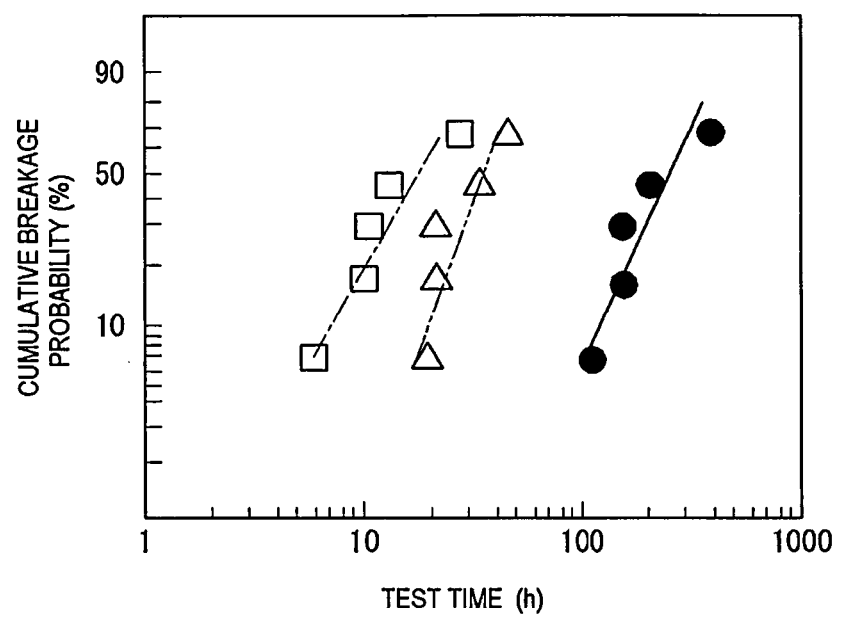
FIG. 15 is a graph illustrating a relation between test time and cumulative breakage probability in Test Example 1-2.

Using a new ball bearing of Example 1-1, time (test time) until surface damage is generated on constituent components is measured under the conditions shown in Table 2 and a relation between the test time and the cumulative breakage probability was investigated. FIG. 15 shows a graph illustrating the relation between the test time and the cumulative breakage probability. In the figure, a full line (black circle) indicates the ball bearing of Example 1-1, a dashed line (white square) indicates the ball bearing of Comparative Example 1-1, a chain double-dashed line (white triangle) indicates the ball bearing of Comparative Example 1-3.

From the results shown in FIG. 15, it is understood that the ball bearing of Example 1-1 has a life almost 7 to 10 times longer than that of each ball bearing of Comparative Examples 1-1 and 1-3.

Test Example 1-3

Figure 16:
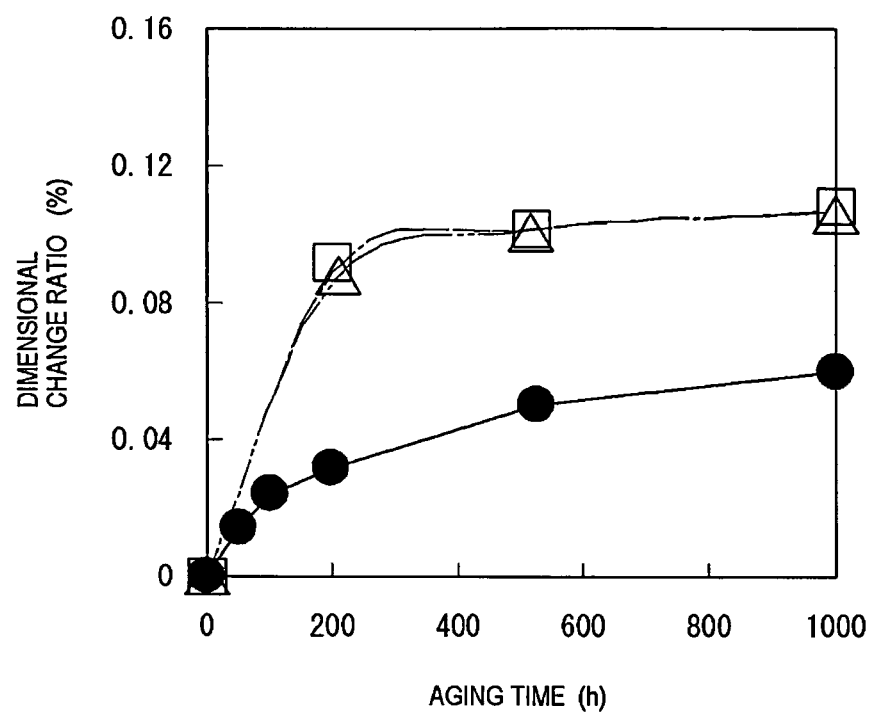
FIG. 16 is a graph illustrating a relation between aging time and dimensional change ratio in Test Example 1-3.

A shaft (outer diameter: 30 mm, length 50 mm) was pressed into an inner ring of the component of Example 1-1 and the whole was held at 150° C. for a prescribed aging time. Incidentally, the tensile stress at the shaft press-fitting is 100 to 150 MPa. After the passage of 50 hours, 200 hours, 500 hours, 1000 hours, and 2000 hours, the inner diameters were measured at 6 points (2 points each at an interval in an axis direction per 3 points at equal intervals in a circumferential direction) of the inner diameter surface of each inner ring. As a control, the inner diameters at the 6 points before the shaft press-fitting were measured. Thereafter, a change ratio [dimensional change ratio (%)] of the dimension after each passage of time to each dimension of the 6 points of the inner diameter surface of each inner ring before the heating was calculated in a similar manner to Test Example 1-1. Also, for the inner rings of Comparative Examples 1-1 and 1-3, the dimensional change ratio was calculated in a similar manner to the above. FIG. 16 shows a graph illustrating the relation between the aging time and the dimensional change ratio. In the figure, a full line (black circle) indicates the inner ring of Example 1-1, a dashed line (white square) indicates the inner ring of Comparative Example 1-1, a chain double-dashed line (white triangle) indicates the inner ring of Comparative Example 1-3.

From the results shown in FIG. 16, it is understood that a dimensional change with time is suppressed, the dimensional change ratio is low for a long period of time, and sufficient dimensional stability is exhibited in the inner ring of Example 1-1 as compared with the inner rings of Comparative Examples 1-1 and 1-3.

Examples 1-4 to 1-7 and Comparative Examples 1-8 to 1-12

Each of two kinds of steels C and D having the composition shown in Table 7 was used and processed into a prescribed shape to produce 9 kinds of workpieces for producing inner and outer rings for a ball bearing of Model No. 6206. The steel D in Table 7 is JIS SUJ2 that is a bearing steel.

TABLE 7

| Kind of steel | Representative ingredients (% by mass) | | | | | |
|---|---|---|---|---|---|---|
| | C | Si | Mn | Cr | Mo | V |
| Steel C | 0.80 | 0.49 | 0.40 | 3.50 | 0.15 | 0.20 |
| Steel D | 1.0 | 0.18 | 0.34 | 1.42 | 0.03 | — |

Then, the resultant workpiece was subjected to a heat treatment under the heat treatment conditions shown in FIG. 4, FIG. 17 to FIG. 20, FIG. 6, and FIG. 21 to FIG. 23 and the parts for forming the raceway surface, the end surface, the shoulder surface, the inner peripheral surface (in the case of the inner ring), and the outer peripheral surface (in the case of the outer ring) of the resultant intermediate material after the heat treatment was subjected to polish-processing to produce inner and outer rings of Examples 1-4 to 1-7 and Comparative Examples 1-8 to 1-12 which are raceway members having an unpolished chamfer having an R-shape cross-section, which connects to the end surface and the inner peripheral surface (in the case of the inner ring), an unpolished chamfer having an R-shape cross-section, which connects to the end surface and the outer peripheral surface (in the case of the outer ring), and an unpolished chamfer having a linear shape cross-section, which connects to the end surface and the shoulder surface.

Figure 17:
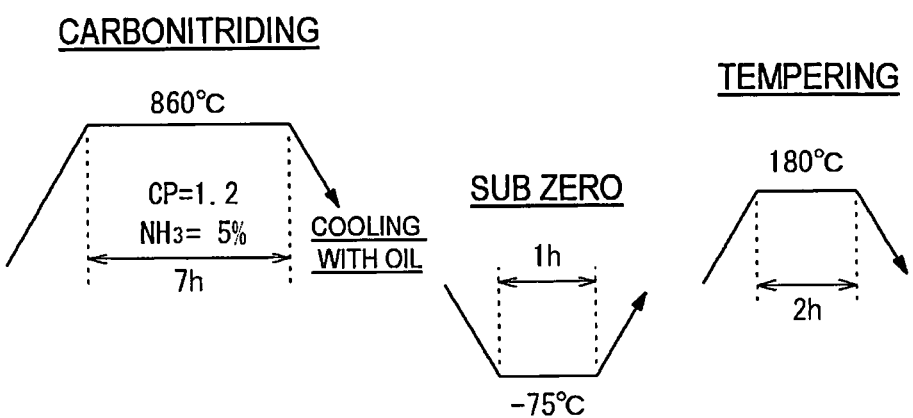
FIG. 17 is a diagram illustrating heat treatment conditions in Example 1-5, which is Experimental No. 1-11, and heat treatment conditions in Example 2-3.

The heat treatment conditions shown in FIG. 17 are conditions that the workpiece is heated at 860° C. for 7 hours in a carbonitriding atmosphere of a carbon potential of 1.2 and an ammonia gas concentration of 5% by volume, subsequently cooled with an oil to 80° C., then maintained at −75° C. for 1 hour [subzero treatment], and subsequently heated at 180° C. for 2 hours [tempering treatment] (Experimental No. 1-11).

Figure 18:
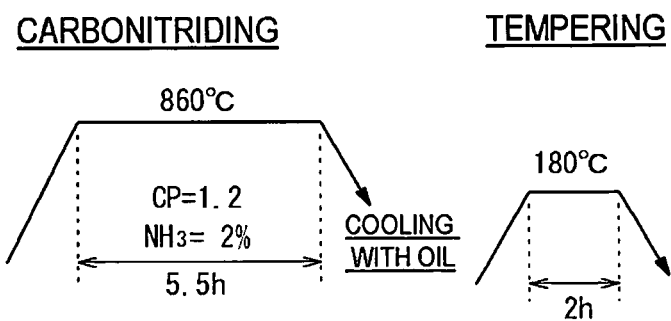
FIG. 18 is a diagram illustrating heat treatment conditions in Example 1-6, which is Experimental No. 1-12.

The heat treatment conditions shown in FIG. 18 are conditions that the workpiece is heated at 860° C. for 5.5 hours in a carbonitriding atmosphere of a carbon potential of 1.2 and an ammonia gas concentration of 2% by volume, subsequently cooled with an oil to 80° C., and then heated at 180° C. for 2 hours [tempering treatment] (Experimental No. 1-12).

Figure 19:
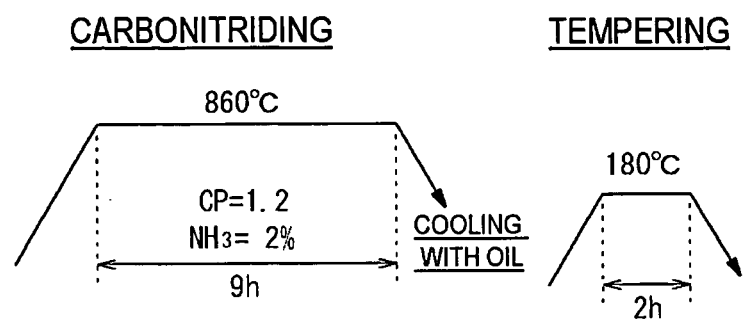
FIG. 19 is a diagram illustrating heat treatment conditions in Example 1-6, which is Experimental No. 1-13.

The heat treatment conditions shown in FIG. 19 are conditions that the workpiece is heated at 860° C. for 9 hours in a carbonitriding atmosphere of a carbon potential of 1.2 and an ammonia gas concentration of 2% by volume, subsequently cooled with an oil to 80° C., and then heated at 180° C. for 2 hours [tempering treatment] (Experimental No. 1-13).

Figure 20:
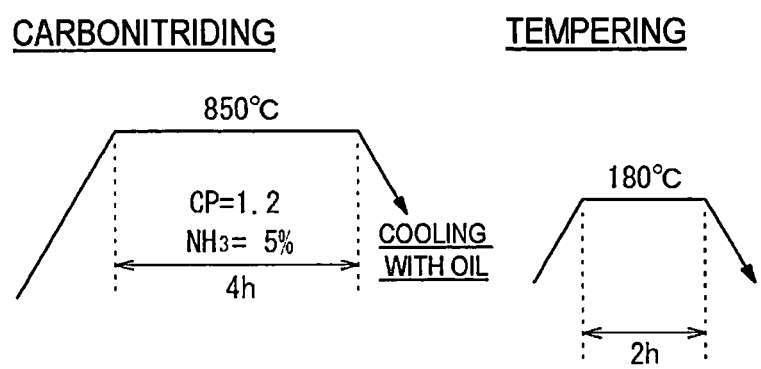
FIG. 20 is a diagram illustrating heat treatment conditions in Comparative Example 1-8, which is Experimental No. 1-14, and heat treatment conditions in Comparative Example 2-10.

The heat treatment conditions shown in FIG. 20 are conditions that the workpiece is heated at 850° C. for 4 hours in a carbonitriding atmosphere of a carbon potential of 1.2 and an ammonia gas concentration of 5% by volume, subsequently cooled with an oil to 80° C., and then heated at 180° C. for 2 hours [tempering treatment] (Experimental No. 1-14).

Figure 21:
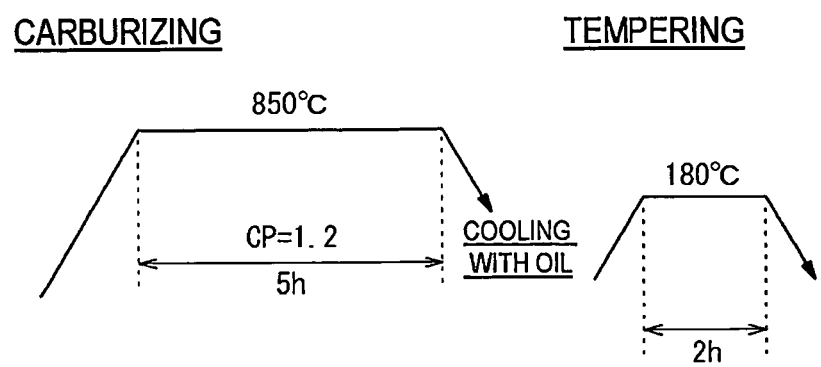
FIG. 21 is a diagram illustrating heat treatment conditions in Comparative Example 1-10, which is Experimental No. 1-15, and heat treatment conditions in Comparative Example 2-9.

The heat treatment conditions shown in FIG. 21 are conditions that the workpiece is heated at 850° C. for 5 hours in a carburizing atmosphere of a carbon potential of 1.2, subsequently cooled with an oil to 80° C., and then heated at 180° C. for 2 hours [tempering treatment] (Experimental No. 1-15).

Figure 22:
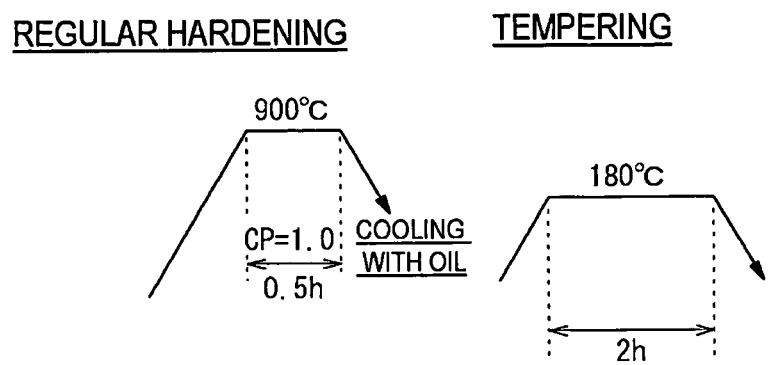
FIG. 22 is a diagram illustrating heat treatment conditions in Comparative Example 1-11, which is Experimental No. 1-16, and heat treatment conditions in Comparative Example 2-11.

The heat treatment conditions shown in FIG. 22 are conditions that the workpiece is zubu-hardened by heating at 900° C. for 0.5 hours in an atmosphere of a carbon potential of 1.0, subsequently cooled with an oil to 80° C., and then heated at 180° C. for 2 hours [tempering treatment] (Experimental No. 1-16).

Figure 23:
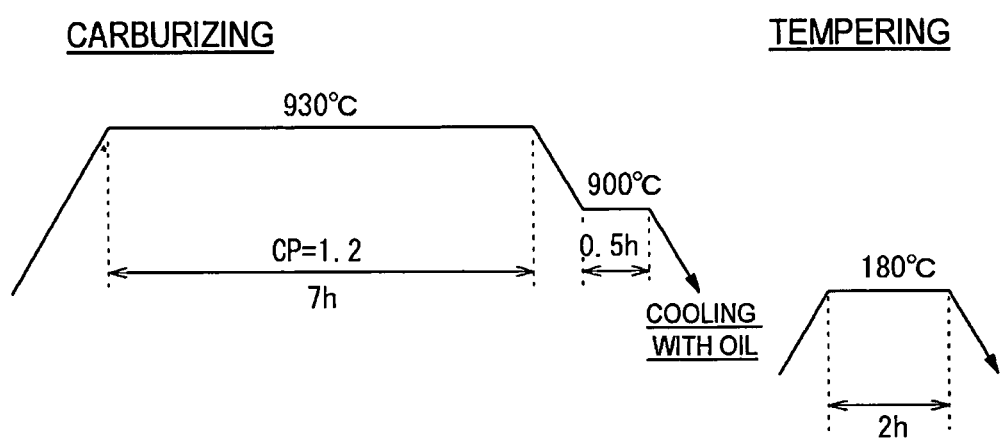
FIG. 23 is a diagram illustrating heat treatment conditions in Comparative Example 1-12, which is Experimental No. 1-17, and heat treatment conditions in Comparative Example 2-12.

The heat treatment conditions shown in FIG. 23 are conditions that the workpiece is heated at 930° C. for 7 hours in a carburizing atmosphere of a carbon potential of 1.2, subsequently heated at 900° C. for 0.5 hours, then cooled with an oil to 80° C., and subsequently heated at 180° C. for 2 hours [tempering treatment] (Experimental No. 1-17).

Table 8 shows the kind of the steel and heat treatment conditions used in the inner and outer rings of Examples 1-4 to 1-7 and Comparative Examples 1-8 to 1-12.

TABLE 8

| | Production conditions | |
|---|---|---|
| Sample name | Steel | Heat treatment |
| Example 1-4 | Steel C | FIG. 4 |
| Example 1-5 | Steel C | FIG. 17 |
| Example 1-6 | Steel C | FIG. 18 |
| Example 1-7 | Steel C | FIG. 19 |
| Comparative Example 1-8 | Steel D | FIG. 20 |
| Comparative Example 1-9 | Steel D | FIG. 6 |

TABLE 8-continued

| Sample name | Production conditions | |
|---|---|---|
| | Steel | Heat treatment |
| Comparative Example 1-10 | Steel D | FIG. 21 |
| Comparative Example 1-11 | Steel C | FIG. 22 |
| Comparative Example 1-12 | Steel C | FIG. 23 |

Moreover, Table 9 shows heat treatment qualities of the surface (polished part) of the raceway part of each outer ring of Examples 1-4 to 1-7 and Table 10 shows heat treatment qualities of the non-polished part of each outer ring of Examples 1-4 to 1-7. Furthermore, Table 11 shows heat treatment qualities of the surface (polished part) of the raceway part of each outer ring of Comparative Examples 1-8 to 1-12 and Table 12 shows heat treatment qualities of the non-polished part of each outer ring of Comparative Examples 1-8 to 1-12.

As the heat treatment qualities of the surface (polished part) of the raceway part in Table 9 and Table 11, the Vickers hardness at the position of a depth of 50 μm from the surface (polished part) of the raceway part (in the table, "Vickers hardness"), the amount of residual austenite in the surface layer part at the position of a depth of 10 μm from the surface (in the table, "amount of residual austenite in surface layer part"), the amount of internal residual austenite at the position of a depth of 2 mm from the surface (in the table, "amount of internal residual austenite"), the content of carbon in the surface layer ranging from the surface to 10 μm (in the table, "content of carbon"), the content of nitrogen in the surface layer ranging from the surface to 10 μm (in the table, "content of nitrogen"), the form of the precipitates, the area ratio of the vanadium-based precipitates (particles composed of vanadium carbonitride having a particle diameter of 0.2 to 2 μm and particles composed of vanadium nitride having a particle diameter of 0.2 to 2 μm) in the surface layer ranging from the surface to 10 μm (in the table, "area ratio of vanadium-based precipitates"), and the area ratio of the precipitates containing nitrides in the surface layer ranging from the surface to 10 μm (in the table, "area ratio of precipitates containing nitrides") are shown.

Moreover, as the heat treatment qualities of the non-polished part in Table 10 and Table 12, the Vickers hardness at the position of a depth of 50 μm from the surface of the non-polished part (in the table, "Vickers hardness"), the content of carbon in the surface layer ranging from the surface to 10 μm (in the table, "content of carbon"), the content of nitrogen in the surface layer ranging from the surface to 10 μm (in the table, "content of nitrogen"), and presence or absence of the coarse carbon compound particles having a particle diameter of 10 μm or more in the surface layer ranging from the surface to 10 μm (in the table, "particles of coarse carbon compounds having particle diameter of 10 μm or more") are shown.

TABLE 9

Figure 24:
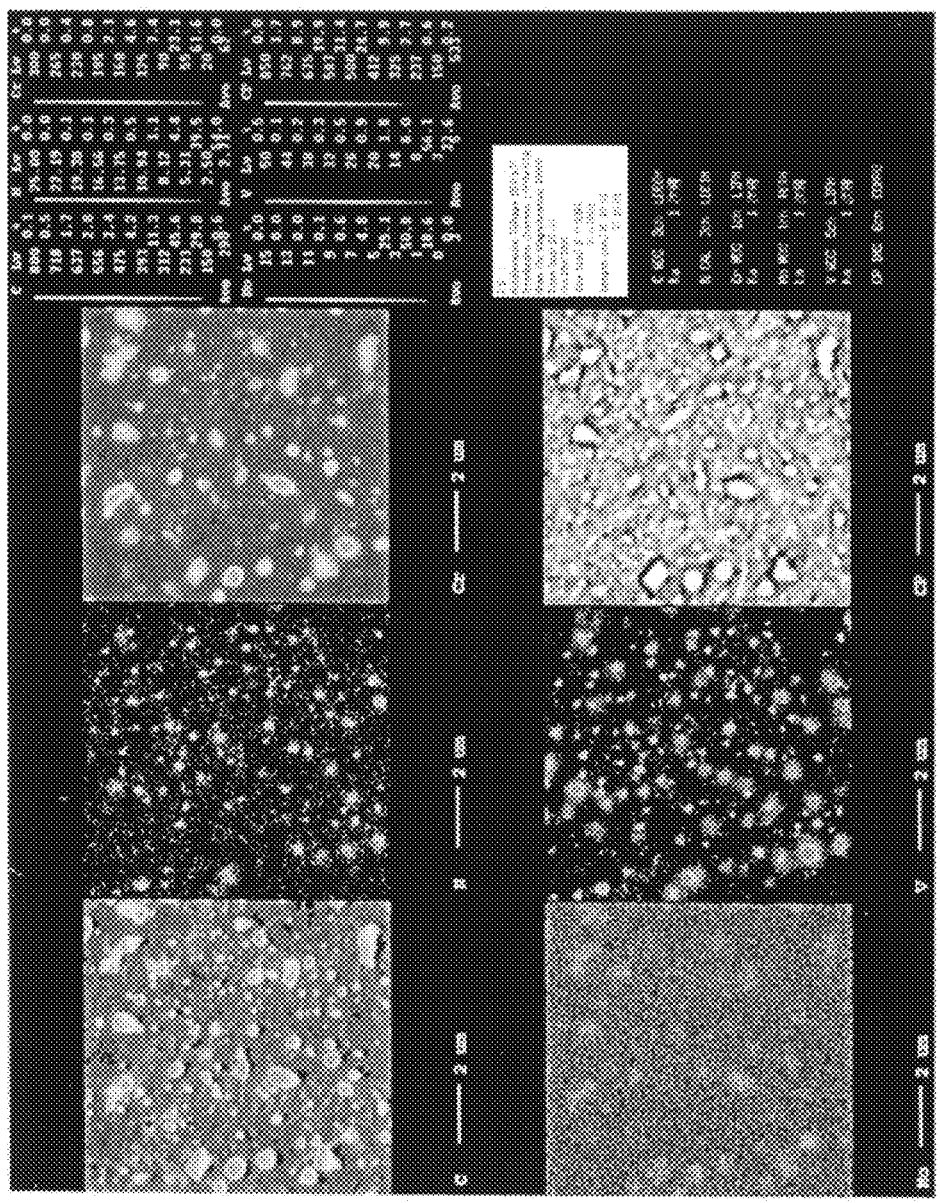
FIG. 24 is a substitute photograph for drawing illustrating the results of observing the surface (polished part) of the raceway part of the raceway member of Example 1-4 on an electron microscope.

| Sample name | Vickers hardness | Amount of residual austenite in surface layer part (% by volume) | Content of carbon (% by mass) | Content of nitrogen (% by mass) | Area ratio of precipitates containing nitrides (%) | Particles of nitrides having particle diameter of 500 nm or less | Amount of internal residual austenite (% by volume) | Form of precipitates | Area ratio of vanadium-based precipitates (%) |
|---|---|---|---|---|---|---|---|---|---|
| Example 1-4 | 810 | 43 | 1.4 | 0.4 | 13 | FIG. 24 | 15 | $M_7C_3$ type carbides, $M_{23}C_6$ type carbides, Cementite Vanadium nitrides Vanadium carbonitrides | 5 |
| Example 1-5 | 880 | 22 | 1.4 | 0.6 | 12 | the same as FIG. 24 | 5 | $M_7C_3$ type carbides, $M_{23}C_6$ type carbides, Cementite Vanadium nitrides Vanadium carbonitrides | 6 |
| Example 1-6 | 780 | 45 | 1.2 | 0.2 | 8 | ↑ | 10 | $M_7C_3$ type carbides, $M_{23}C_6$ type carbides, Cementite Vanadium nitrides Vanadium carbonitrides | 3 |
| Example 1-7 | 755 | 49 | 1.6 | 0.3 | 17 | ↑ | 14 | $M_7C_3$ type carbides, $M_{23}C_6$ type carbides, Cementite Vanadium nitrides Vanadium carbonitrides | 4 |

TABLE 10

| Sample name | Vickers hardness | Content of carbon (% by mass) | Content of nitrogen (% by mass) | Particles of coarse carbon compounds having particle diameter of 10 μm or more |
|---|---|---|---|---|
| Example 1-4 | 735 | 0.8 | 1.0 | none |
| Example 1-5 | 800 | 0.8 | 1.3 | none |
| Example 1-6 | 720 | 0.8 | 1.1 | none |
| Example 1-7 | 730 | 0.8 | 1.4 | none |

TABLE 11

| Sample name | Vickers hardness | Amount of residual austenite in surface layer part (% by volume) | Content of carbon (% by mass) | Content of nitrogen (% by mass) | Area ratio of precipitates containing nitrides (%) | Particles of nitrides having particle diameter of 500 nm or less | Amount of internal residual austenite (% by volume) | Form of precipitates | Area ratio of vanadium-based precipitates (%) |
|---|---|---|---|---|---|---|---|---|---|
| Comparative Example 1-8 | 785 | 28 | 1.3 | 0.2 | 11 | — | 16 | Cementite | 0 |
| Comparative Example 1-9 | 750 | 11 | 1.0 | none | 5.5 | — | 9 | Cementite | 0 |
| Comparative Example 1-10 | 785 | 28 | 1.3 | none | 9.5 | — | 17 | Cementite | 0 |
| Comparative Example 1-11 | 780 | 18 | 0.8 | none | 3.5 | — | 16 | $M_7C_3$ type carbides, $M_{23}C_6$ type carbides, Cementite | 0 |
| Comparative Example 1-12 | 825 | 45 | 1.4 | none | 13.5 | — | 13 | $M_7C_3$ type carbides, $M_{23}C_6$ type carbides, Cementite | 0 |

TABLE 12

| Sample name | Vickers hardness | Content of carbon (% by mass) | Content of nitrogen (% by mass) | Particles of coarse carbon compounds having particle diameter of 10 μm or more |
|---|---|---|---|---|
| Comparative Example 1-8 | 685 | 0.8 | 0.4 | none |
| Comparative Example 1-9 | 755 | 1.0 | none | none |
| Comparative Example 1-10 | 820 | 1.6 | none | present |
| Comparative Example 1-11 | 790 | 0.8 | none | none |
| Comparative Example 1-12 | 850 | 1.7 | none | present |

Figure 25:
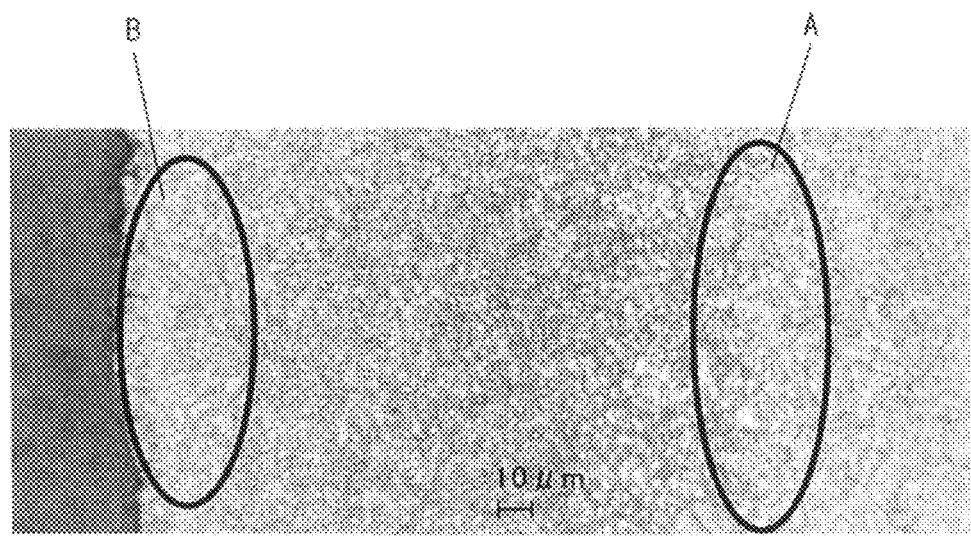
FIG. 25 is a substitute photograph for drawing illustrating the results of observing the surface [polished part (A in the figure)] and the non-polished part (B in the figure) of the raceway part of the raceway member of Example 1-4 on an electron microscope.
Figure 26:
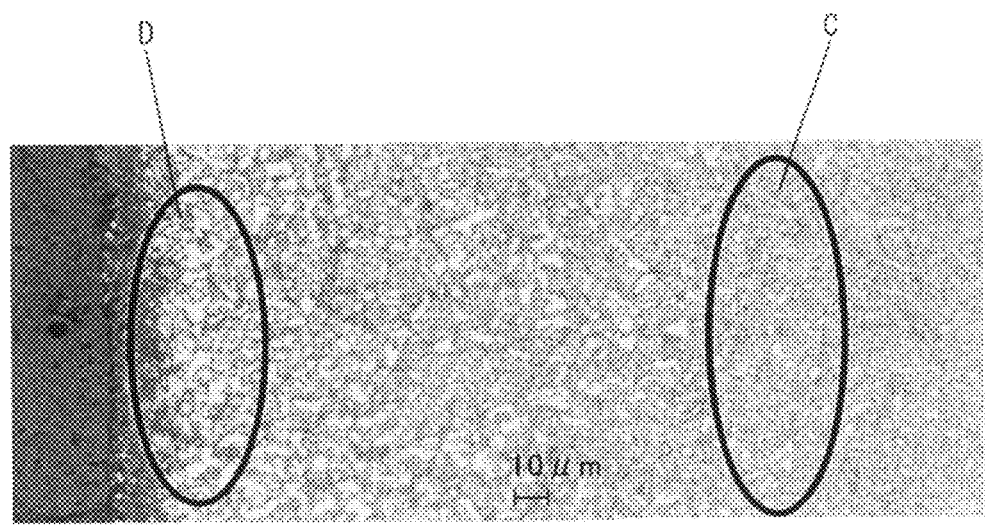
FIG. 26 is a substitute photograph for drawing illustrating the results of observing the surface [polished part (C in the figure)] and the non-polished part (D in the figure) of the raceway part of the raceway member of Comparative Example 1-12 on an electron microscope.

Further, FIG. 24 shows a substitute photograph for drawing illustrating the results of observing the surface (polished part) of the raceway part of the outer ring of Example 1-4 on an electron microscope. Furthermore, FIG. 25 shows a substitute photograph for drawing illustrating the results of observing the surface [polished part (A in the figure)] and the non-polished part (B in the figure) of the raceway part of the outer ring of Example 1-4 on an electron microscope. As a control, FIG. 26 shows a substitute photograph for drawing illustrating the results of observing the surface [polished part (C in the figure)] and the non-polished part (D in the figure) of the raceway part of the outer ring of Comparative Example 1-12 on an electron microscope.

From the results shown in Table 9 and Table 10, it is understood that the outer ring of Example 1-4 obtained by subjecting the workpiece obtained from the steel C to a carbonitriding treatment shows that the Vickers hardness at the position of a depth of 50 μm from the surface (polished part) of the raceway part is 810, the amount of residual austenite in the surface layer part at the position of a depth of 10 μm from the surface is 43% by volume, the content of carbon in the surface layer ranging from the surface to 10 μm is 1.4% by mass, the content of nitrogen in the surface layer ranging from the surface to 10 μm is 0.4% by mass, the area ratio of the precipitates containing nitrides in the surface layer ranging from the surface to 10 μm is 13%, the amount of internal residual austenite at the position of a depth of 2 mm from the surface is 15% by mass, and the area ratio of the vanadium-based precipitates in the surface layer ranging from the surface to 10 μm is 5%, at the polished part.

Moreover, at the non-polished part, it is understood that the Vickers hardness at the position of a depth of 50 μm from the surface of the non-polished part is 735, the content of carbon in the surface layer ranging from the surface to 10 μm is 0.8% by mass, and the content of nitrogen in the surface layer ranging from the surface to 10 μm is 1.0% by mass.

Further, from the results shown in FIG. 24, it is understood that particles of nitrides having a particle diameter of 500 nm or less are present in the surface (polished part) of the raceway part of the outer ring of Example 1-1. Furthermore, as shown in FIG. 25, the particles of coarse carbon compounds having a particle diameter of 10 μm or more are not present in the surface layer ranging from the surface to 10 μm (in the figure, see B).

Moreover, from the results shown in Table 9 and Table 10, it is understood that the outer ring of Example 1-5 obtained by subjecting the workpiece obtained from the steel C to a carbonitriding treatment and subsequently to a subzero treatment shows that the Vickers hardness at the position of a depth of 50 μm from the surface (polished part) of the raceway part is 880, the amount of residual austenite in the surface layer part at the position of a depth of 10 μm from the surface is 22% by volume, the amount of internal residual austenite at the position of a depth of 2 mm from the surface is 5% by volume, the content of carbon in the surface layer ranging from the surface to 10 μm is 1.4% by mass, the content of nitrogen in the surface layer ranging from the surface to 10 μm is 0.6% by mass, the area ratio of the vanadium-based precipitates in the surface layer ranging from the surface to 10 μm is 6%, and the area ratio of the precipitates containing nitrides in the surface layer ranging from the surface to 10 μm is 12%, at the polished part.

Moreover, at the non-polished part, it is understood that the Vickers hardness at the position of a depth of 50 μm from the surface of the non-polished part is 800, the content of carbon in the surface layer ranging from the surface to 10 μm is 0.8% by mass, the content of nitrogen in the surface layer ranging from the surface to 10 μm is 1.3% by mass, and the particles of coarse carbon compounds having a particle diameter of 10 μm or more is not present in the surface layer ranging from the surface to 10 μm.

It is understood that the outer ring of Example 1-6 obtained by the same operations as in Example 1-4 except that the ammonia gas concentration is changed to 2% by volume and heating is performed for 5.5 hours shows that the Vickers hardness at the position of a depth of 50 μm from the surface (polished part) of the raceway part is 780, the amount of residual austenite in the surface layer part at the position of a depth of 10 μm from the surface is 45% by volume, the amount of internal residual austenite at the position of a depth of 2 mm from the surface is 10% by volume, the content of carbon in the surface layer ranging from the surface to 10 μm is 1.2% by mass, the content of nitrogen in the surface layer ranging from the surface to 10 μm is 0.2% by mass, the area ratio of the vanadium-based precipitates in the surface layer ranging from the surface to 10 μm is 3%, and the area ratio of the precipitates containing nitrides in the surface layer ranging from the surface to 10 μm is 8%, at the polished part.

Moreover, at the non-polished part, it is understood that the Vickers hardness at the position of a depth of 50 μm from the surface of the non-polished part is 720, the content of carbon in the surface layer ranging from the surface to 10 μm is 0.8% by mass, the content of nitrogen in the surface layer ranging from the surface to 10 μm is 1.1% by mass, and the particles of coarse carbon compounds having a particle diameter of 10 μm or more is not present in the surface layer ranging from the surface to 10 μm.

Similarly, it is understood that the outer ring of Example 1-7 obtained by the same operations as in Example 1-4 except that the ammonia gas concentration is changed to 2% by volume and heating is performed for 9 hours shows that the Vickers hardness at the position of a depth of 50 μm from the surface (polished part) of the raceway part is 755, the amount of residual austenite in the surface layer part at the position of a depth of 10 μm from the surface is 49% by volume, the amount of internal residual austenite at the position of a depth of 2 mm from the surface is 14% by volume, the content of carbon in the surface layer ranging from the surface to 10 μm is 1.6% by mass, the content of nitrogen in the surface layer ranging from the surface to 10 μm is 0.3% by mass, the area ratio of the vanadium-based precipitates in the surface layer ranging from the surface to 10 μm is 4%, and the area ratio of the precipitates containing nitrides in the surface layer ranging from the surface to 10 μm is 17%, at the polished part.

Moreover, at the non-polished part, it is understood that the Vickers hardness at the position of a depth of 50 μm from the surface of the non-polished part is 730, the content of carbon in the surface layer ranging from the surface to 10 μm is 0.8% by mass, the content of nitrogen in the surface layer ranging from the surface to 10 μm is 1.4% by mass, and the particles of coarse carbon compounds having a particle diameter of 10 μm or more is not present in the surface layer ranging from the surface to 10 μm.

In the surface (polished part) of the raceway part of each outer ring of Examples 1-5 to 1-7, particles of nitrides having a particle diameter of 500 nm or less are present, as in the case the outer ring of Example 1-4 shown in FIG. 24.

Since the surface (polished part) of the polish-finished raceway part of each outer ring of Examples 1-5 to 1-7 has particles composed of nitrides having a particle diameter of 500 nm or less and the area ratio of the precipitates containing nitrides in the surface layer ranging from the surface to 10 μm is 5 to 20%, the hardness of the surface is improved and, even in the case of the use in a lubricating oil contaminated with foreign matter, the stress concentration in the vicinity of brinelling generated when the foreign matter is bitten can be relaxed.

From these results, as in the cases of the outer rings of Examples 1-5 to 1-7, it is suggested that the generation of the over carbonitriding tissue is suppressed in the non-polished part by forming a carbonitrided layer at the non-polished part. On the other hand, from the results shown in Table 11 and Table 12, it is understood that the outer ring of Comparative Example 1-12 obtained by subjecting the workpiece obtained from the steel C to a carbonitriding treatment does not contain nitrogen (N) in the surface of the non-polished part. Moreover, from the results shown in FIG. 26, since particles of coarse carbon compounds having a particle diameter of 10 μm or more are present at the non-polished part (in the figure, see C) of the outer ring of Comparative Example 1-12, it is understood that an over carburized tissue is generated.

For the outer rings and inner rings of Examples 1-4 to 1-7 and Comparative Examples 1-8 to 1-12, a test of the life in a foreign matter oil and a test of crushing strength were performed. At the test of the life in a foreign matter oil, one pair of the outer ring and the inner ring produced as the same Example or Comparative Example among Examples 1-4 to 1-7 and Comparative Examples 1-8 to 1-12 and a ball produced by subjecting high carbon chromium bearing steel (JIS SUJ2) to a carbonitriding treatment and subsequently performing hardening and tempering treatments were combined to assemble a ball bearing of Model No. 6206. The resultant ball bearing was subjected to the test of the life in a foreign matter oil. The test conditions for the test of the life in a foreign matter oil are the same as in Table 2. Moreover, the test conditions for the test of crushing strength are shown in Table 13. The test of crushing strength is a test where a first place of the 6206 outer ring in a circumferential direction and a second place that is a place moved by 180° in a circumferential direction from the first place of the circumferential direction are pinched by an Amsler testing machine in a diameter direction, the machine is moved so that the first place and the second place come close to each other at a rate of 0.5 mm/min along a vertical direction to an axis line of the 6206 outer ring connecting from the first place to the second place to thereby deform and destroy the 6206 outer ring, and radial load at the time of breakage is evaluated. The crushing strength ratio is a ratio of the load at the time when the 6206 outer ring of each Example or Comparative Example is destroyed relative to the load when the 6206 outer ring of Comparative Example 1-9 is destroyed. Table 14 shows the results thereof.

TABLE 13

| | Test of crushing strength |
|---|---|
| Sample bearing model No. | 6206 outer ring |
| Loading rate | 0.5 mm/min |
| N number | 5 |

TABLE 14

| | Life in foreign oil (L10) | Crushing strength ratio |
|---|---|---|
| Example 1-4 | 9.5 | 1.1 |
| Example 1-5 | 8 | 1.0 |
| Example 1-6 | 10 | 1.2 |
| Example 1-7 | 10 | 1.2 |
| Comparative Example 1-8 | 3.4 | 0.95 |
| Comparative Example 1-9 | 1 | 1 |
| Comparative Example 1-10 | 3.1 | 0.6 |
| Comparative Example 1-11 | 1.3 | 1.1 |
| Comparative Example 1-12 | 8.6 | 0.5 |

From the results shown in Table 14, it is understood that the ball bearing provided with the outer ring and the inner ring of each of Examples 1-4 to 1-7 using the steel C having the composition shown in Table 7 exhibits a long life in the foreign matter oil and also high crushing strength of the outer ring as compared with the ball bearings provided with the outer and inner rings of Comparative Examples 1-8 to 1-10 using the steel D.

On the other hand, from the results shown in Table 14, it is understood that the ball bearing provided with the outer ring of Comparative Examples 1-12, in which the workpiece obtained from the same steel C as the steel used in the outer rings of Examples 1-4 to 1-7 is subjected to a carburizing treatment, exhibits low crushing strength of the outer ring as compared with the ball bearing provided with the outer ring of each of Comparative Examples 1-8 to 1-10 in which the steel D is used. To the contrary, it is understood that the ball bearing provided with the outer ring and the inner ring of each of Examples 1-4 to 1-7, which are obtained by subjecting the workpiece obtained from the steel C to a carbonitriding treatment, exhibits an improvement in both of the life in the foreign matter oil and the crushing strength of the outer ring.

Thus, in Comparative Examples 1-10 and 1-12, it was found that the particles of coarse carbon compounds having a particle diameter of 10 μm or more were present, an over carburized tissue such as free carbides was generated at the non-polished part present at the part excluding the raceway part, and the over carburized tissue became a starting point of the stress concentration to thereby lower the crushing strength of the rolling bearing. In Examples 1-4 to 1-7, by subjecting the prescribed steel to a carbonitriding treatment under prescribed conditions, with forming a long-life tissue (carburized tissue) containing a small amount of precipitates in the raceway part of the rolling bearing, at the non-polished part, the particles of coarse carbon compounds having a particle diameter of 10 μm or more are not formed, the generation of the over carburized tissue such as free carbides is suppressed, the decrease in crushing strength was suppressed, and also a high rolling fatigue life could be attained.

Therefore, from these results, as in Examples 1-4 to 1-7, according to the raceway member obtained by subjecting the workpiece obtained from the steel C having the composition shown in Table 7 to the carbonitriding treatment, it is suggested that the over carburized tissue is not formed at the non-polished part and a rolling bearing excellent in both of the life in a foreign matter oil and the crushing strength is obtained.

Examples 2-1 to 2-2 and Comparative Examples 2-1 to 2-7, Reference Examples 2-1 to 2-3

Each of two kinds of steels A and B having the composition shown in Table 1 was processed into a prescribed shape to produce a workpiece of each of inner and outer rings for a ball bearing (Model No. 6206) having a machining allowance for polishing in a part for forming a raceway surface and a rolling element for a ball bearing (Model No. 6206) having a machining allowance for polishing in a part for forming a rolling surface. The steel B in Table 1 is JIS SUJ2 that is a bearing steel. Incidentally, the diameter of the rolling element is 9.525 mm.

Then, the resultant workpiece was subjected to a heat treatment under the heat treatment conditions shown in FIG. 3 to FIG. 12 and FIG. 27 to FIG. 29 and the part for forming the raceway surface of the resultant intermediate material for the inner and outer rings after the heat treatment and the part for forming the rolling surface of the resultant intermediate material for the rolling element after the heat treatment each were subjected to polish-processing to produce the ball bearings of Examples 2-1 and 2-2 and Comparative Examples 2-1 to 2-7 and the ball bearings of Reference Examples 2-1 to 2-3.

The heat treatment conditions shown in FIG. 3 are conditions that the workpiece is heated at 860° C. for 7 hours in a carbonitriding atmosphere of a carbon potential of 1.1 and an ammonia gas concentration of 2% by volume, subsequently cooled with an oil to 80° C., and then heated at 180° C. for 2 hours [tempering treatment] (Experimental No. 2-1).

The heat treatment conditions shown in FIG. 8 are conditions that the workpiece is heated at 850° C. for 4 hours in a carbonitriding atmosphere of a carbon potential of 1.2 and an ammonia gas concentration of 2% by volume, subsequently cooled with an oil to 80° C., and then heated at 160° C. for 2 hours [tempering treatment] (Experimental No. 2-2).

Figure 27:
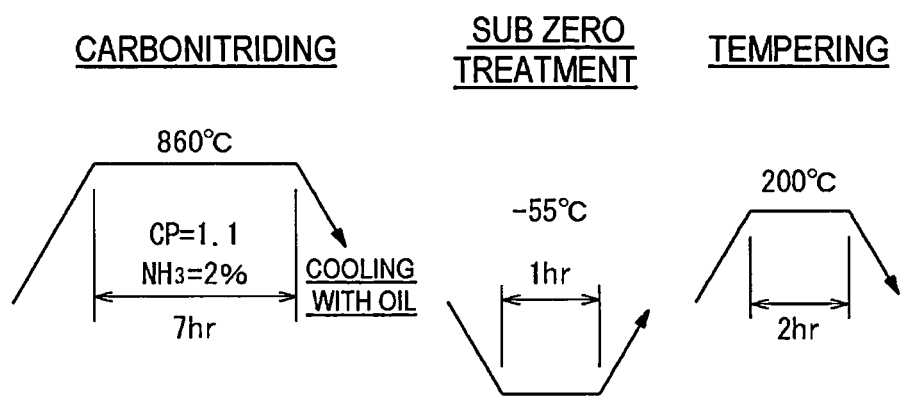
FIG. 27 is a diagram illustrating heat treatment conditions in Experimental No. 2-3.

The heat treatment conditions shown in FIG. 27 are conditions that the workpiece is heated at 860° C. for 7 hours in a carbonitriding atmosphere of a carbon potential of 1.1 and an ammonia gas concentration of 2% by volume, subsequently cooled with an oil to 80° C., and then heated at 200° C. for 2 hours [tempering treatment] (Experimental No. 2-3).

Figure 28:
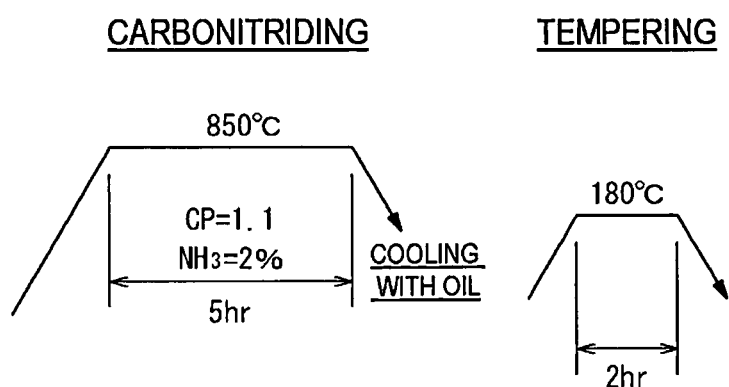
FIG. 28 is a diagram illustrating heat treatment conditions in Experimental No. 2-4.

The heat treatment conditions shown in FIG. 28 are conditions that the workpiece is heated at 850° C. for 5 hours in a carbonitriding atmosphere of a carbon potential of 1.1 and an ammonia gas concentration of 2% by volume, subsequently cooled with an oil to 80° C., and then heated at 180° C. for 2 hours [tempering treatment] (Experimental No. 2-4).

Figure 29:
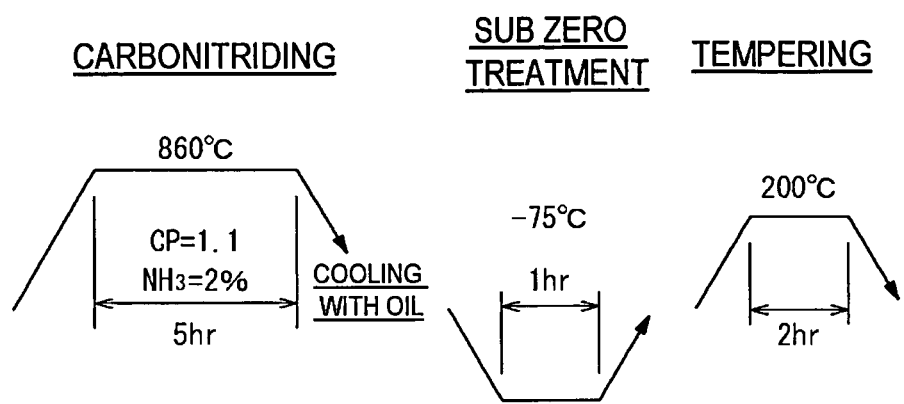
FIG. 29 is a diagram illustrating heat treatment conditions in Experimental No. 2-5.

The heat treatment conditions shown in FIG. 29 are conditions that the workpiece is heated at 860° C. for 5 hours in a carbonitriding atmosphere of a carbon potential of 1.1 and an ammonia gas concentration of 2% by volume, subsequently cooled with an oil to 80° C., then cooled at −75° C. for 1 hour [subzero treatment], and subsequently heated at 200° C. for 2 hours [tempering treatment] (Experimental No. 2-5).

The heat treatment conditions shown in FIG. 6 are conditions that the workpiece is zubu-hardened by heating at 830° C. for 0.5 hours in an atmosphere of a carbon potential of 0.8, subsequently cooled with an oil to 80° C., and then heated at 180° C. for 2 hours [tempering treatment] (Experimental No. 2-6).

The heat treatment conditions shown in FIG. 7 are conditions that the workpiece is heated at 850° C. for 5 hours in a carburizing atmosphere of a carbon potential of 1.2, subsequently cooled with an oil to 80° C., and then heated at 160° C. for 2 hours [tempering treatment] (Experimental No. 2-7).

The heat treatment conditions shown in FIG. 9 are conditions that the workpiece is zubu-hardened by heating at 900° C. for 0.5 hours in an atmosphere of a carbon potential of 0.8, subsequently cooled with an oil to 80° C., and then heated at 180° C. for 2 hours [tempering treatment] (Experimental No. 2-8).

The heat treatment conditions shown in FIG. 10 are conditions that the workpiece is heated at 900° C. for 7 hours in a carburizing atmosphere of a carbon potential of 1.2, subsequently cooled with an oil to 80° C., and then heated at 160° C. for 2 hours [tempering treatment] (Experimental No. 2-9).

The heat treatment conditions shown in FIG. 11 are conditions that the workpiece is heated at 860° C. for 7 hours in a carbonitriding atmosphere of a carbon potential of 1.2 and an ammonia gas concentration of 1% by volume, subsequently cooled with an oil to 80° C., and then heated at 180° C. for 2 hours [tempering treatment] (Experimental No. 2-10).

The heat treatment conditions shown in FIG. 12 are conditions that the workpiece is heated at 860° C. for 7 hours in a carbonitriding atmosphere of a carbon potential of 1.2 and an ammonia gas concentration of 15% by volume, subsequently cooled with an oil to 80° C., and then heated at 180° C. for 2 hours [tempering treatment] (Experimental No. 2-11).

The heat treatment conditions shown in FIG. 4 are conditions that the workpiece is heated at 860° C. for 7 hours in a carbonitriding atmosphere of a carbon potential of 1.2 and an ammonia gas concentration of 5% by volume, subsequently cooled with an oil to 80° C., and then heated at 180° C. for 2 hours [tempering treatment] (Experimental No. 2-12).

The heat treatment conditions shown in FIG. 5 are conditions that the workpiece is heated at 860° C. for 7 hours in a carbonitriding atmosphere of a carbon potential of 1.0 and an ammonia gas concentration of 2% by volume, subsequently cooled with an oil to 80° C., and then heated at 180° C. for 2 hours [tempering treatment] (Experimental No. 2-13).

In Example 2-1, the inner ring was produced under heat treatment conditions shown in FIG. 3 (Experiment No. 2-1), the rolling element was produced under heat treatment conditions shown in FIG. 8 (Experiment No. 2-2), and the outer ring was produced under heat treatment conditions shown in FIG. 27 (Experiment No. 2-3).

Moreover, in Example 2-2, the inner ring was produced under heat treatment conditions shown in FIG. 28 (Experiment No. 2-4), the rolling element was produced under heat treatment conditions shown in FIG. 8 (Experiment No. 2-2), and the outer ring was produced under heat treatment conditions shown in FIG. 29 (Experiment No. 2-5).

The outer ring, the inner ring, and the rolling element of the ball bearing of Comparative Example 2-1 each were produced under heat conditions shown in FIG. 6 (Experimental No. 2-6).

The outer ring and the inner ring of the ball bearings of Comparative Example 2-2 and Comparative Examples 2-4 to 2-7 each were produced under heat conditions shown in FIG. 7 (Experimental No. 2-7) and under heat conditions shown in FIG. 9 to FIG. 12 (Experimental Nos. 2-8, 2-9, 2-10, and 2-11). The outer ring and the inner ring of the ball bearing of Comparative Example 2-3 were produced under heat conditions shown in FIG. 8 (Experimental No. 2-2). The outer ring and the inner ring of the ball bearing of Reference Example 2-1 were produced under heat conditions shown in FIG. 3 (Experimental No. 2-1). Moreover, the outer ring and the inner ring of each ball bearing of Reference Examples 2-2 and 2-3 were produced under heat conditions shown in FIG. 4 (Experimental No. 2-12) and under heat conditions shown in FIG. 5 (Experimental No. 2-13), respectively. The rolling element of each ball bearing of Comparative Example 2-2 to Comparative Example 2-7 and Reference Examples 2-1 to 2-3 was produced under heat conditions shown in FIG. 8 (Experimental No. 2-2).

Test Example 2-1

For the outer rings of Examples 2-1 and 2-2, the inner rings used for the ball bearings of Examples 2-1 and 2-2, and the outer rings of Reference Examples 2-1 to 2-3, the Vickers hardness (Rockwell C hardness) at the position of a depth of 50 µm from the surface (polished part) of the raceway part, the amount of residual austenite in the surface layer part at the position of a depth of 10 µm from the surface, the content of carbon in the surface layer ranging from the surface to 10 µm, the content of nitrogen in the surface layer ranging from the surface to 10 µm, the form of precipitates, and the area ratio of the vanadium-based precipitates (particles composed of vanadium carbonitride having a particle diameter of 0.2 to 2 µm and particles composed of vanadium nitride having a particle diameter of 0.2 to 2 µm) were investigated. The Vickers hardness (Rockwell C hardness) at the position of a depth of 50 µm from the surface of the rolling element used in each ball bearing of Examples 2-1 and 2-2, the amount of residual austenite in the surface layer part at the position of a depth of 10 µm from the surface, the content of carbon in the surface layer ranging from the surface to 10 µm, the content of nitrogen in the surface layer ranging from the surface to 10 µm, the form of precipitates, and the area ratio of the vanadium-based precipitates (particles composed of vanadium carbonitride having a particle diameter of 0.2 to 2 µm and particles composed of vanadium nitride having a particle diameter of 0.2 to 2 µm) were investigated.

In order to measure substantial hardness of the surface layer, the Vickers hardness at the position of a depth of 50 µm from the surface was measured by cutting each of the inner and outer rings and the rolling element from the surface in a depth direction and then applying a Vickers indentation to the position of a depth of 50 µm from the surface. Also, Rockwell C hardness was determined by converting the measured value of the Vickers hardness. The amount of residual austenite in the surface layer part at the position of a depth of 10 µm from the surface was determined by electrolytically polishing the surface of the raceway part of the inner ring into a depth of 10 µm and measuring the amount of residual austenite on the electrolytically polished surface. Each of the content of carbon in the range of from the surface to 10 µm and the content of nitrogen in the range of from the surface to 10 µm was determined by cutting each of the inner and outer rings and the rolling element from the surface in a depth direction and then measuring each content in the range of from the surface to 10 µm.

The form of the precipitates was evaluated by cutting each of the inner and outer rings and the rolling element from the surface of the raceway part in a depth direction and then observing the range of from the surface to 10 µm. The area ratio of the vanadium-based precipitates (particles composed of vanadium carbonitride having a particle diameter of 0.2 to 2 µm and particles composed of vanadium nitride having a particle diameter of 0.2 to 2 µm) was determined by cutting each of the inner and outer rings and the rolling element from the surface in a depth direction and then measuring the ratio in the range of from the surface to 10 µm. Incidentally, with regard to the form of the precipitates and the area ratio of the vanadium-based precipitates (particles composed of vanadium carbonitride having a particle diameter of 0.2 to 2 µm and particles composed of vanadium nitride having a particle diameter of 0.2 to 2 µm), carbon, nitrogen, and vanadium were mapped in a measuring field of view of 800 µm$^2$ under conditions of an acceleration voltage of 15.0 kV, an irradiation current of $2.016 \times 10^{-7}$ A, and a scanning magnification of 3000 times using an electrolytic emission type electron probe micro-analyzer, and the area ratio was calculated on an image processing apparatus.

For each ball bearing of Examples 2-1 and 2-2, Comparative Examples 2-1 to 2-7, and Reference Examples 2-1 to 2-3, the life in a lubricating oil contaminated with foreign matter (life in a foreign matter oil) that is one index of the life and the raceway ring brinelling depth that is one index of the static loading capacity were investigated.

The life in a foreign matter oil was tested under the conditions shown in Table 2. The life in a foreign matter oil was evaluated according to the following judgment criteria.
[Judgment Criteria]
Good: 8 times or more the L10 life of the ball bearing of Comparative Example 2-1
Bad: less than 8 times the L10 of the ball bearing of Comparative Example 2-1

Moreover, the raceway ring brinelling depth was evaluated by disposing the ball in the each ball bearing of Examples 2-1 and 2-2, Comparative Examples 2-1 to 2-7, and Reference Examples 2-1 to 2-3 on a vertical line, imparting a load of 14.7 kN from the upward in a vertical direction, and measuring the depth of brinelling at the part where maximum load was induced in the raceway ring of the ball bearing by a three-dimensional shape meter. The raceway ring brinelling depth is a value of the sum of the brinelling depth generated in the inner ring and the brinelling depth generated in the outer ring. The raceway ring brinelling depth was evaluated according to the following judgment criteria.

[Judgment Criteria]
Good: brinelling depth is 0.635 μm or less
Bad: brinelling depth is more than 0.635 μm Incidentally, the above-described "0.635 μm" is a permanent deformation quantity that is a limit which does not inhibit smooth rotation in the ball bearing when the diameter of the rolling element is 9.525 mm. This value is a value determined by regarding two third of the tolerance limit of deformation by brinelling over the whole rolling bearing as a tolerance value since the sum of the brinelling depth of the inner ring and the brinelling depth of the outer ring is two third of the tolerance limit of deformation by brinelling over the whole rolling bearing assuming that the deformation by brinelling generates evenly on the inner ring, the outer ring, and the rolling element (one third each of the total), among the tolerance limit of deformation by brinelling over the whole rolling bearing which is judged by the diameter of the rolling element (9.525 mm)×1/10000.

Table 15 shows results of investigation on the kind of steel used for the outer rings of Examples 2-1 and 2-2 and the inner ring and rolling element of each ball bearing of Examples 2-1 and 2-2, the heat treatment conditions, the Vickers hardness (Rockwell C hardness) at the position of a depth of 50 μm from the surface, the amount of residual austenite at the position of a depth of 10 μm from the surface, the content of carbon in the surface layer ranging from the surface to 10 μm, the content of nitrogen in the surface layer ranging from the surface to 10 μm, the form of the precipitates, and the area ratio of the vanadium-based precipitates, as well as the life in a foreign matter oil and the raceway ring brinelling depth of each ball bearing of Examples 2-1 and 2-2.

Also, Table 16 shows results of investigation on the kind of the steel used for the outer and inner rings of Comparative Examples 2-1 to 2-7 and Reference Examples 2-1 to 2-3, the heat treatment conditions, the Vickers hardness (Rockwell C hardness) at the position of a depth of 50 μm from the surface, the amount of residual austenite at the position of a depth of 10 μm from the surface, the content of carbon in the surface layer ranging from the surface to 10 μm, the content of nitrogen in the surface layer ranging from the surface to 10 μm, the form of the precipitates, and the area ratio of the vanadium-based precipitates, as well as the life in a foreign matter oil and the raceway ring brinelling depth of each ball bearing of Comparative Examples 2-1 to 2-7 and Reference Examples 2-1 to 2-3.

In the Table 15 and Table 16, the "Vickers hardness (Rockwell C hardness)" indicates Vickers hardness (Rockwell C hardness) at the position of a depth of 50 μm from the surface, the "amount (% by volume) of residual austenite" indicates an amount of residual austenite at the position of a depth of 10 μm from the surface, the "content of carbon (% by mass)" and the "content of nitrogen (% by mass)" indicate the content of carbon and the content of nitrogen in the surface layer ranging from the surface of the raceway part to 10 μm, respectively, and the "area ratio of the vanadium-based precipitates" indicates an area ratio of the sum of the particles composed of vanadium nitride having a particle diameter of 0.2 to 2 μm and particles composed of vanadium carbonitride having a particle diameter of 0.2 to 2 μm in the surface layer ranging from the surface of the raceway part to 10 μm.

TABLE 15

| Sample name | | Production conditions | | Vickers hardness (Rockwell C hardness) | Amount of residual austenite in surface layer part (% by volume) | Content of carbon (% by mass) | Content of nitrogen (% by mass) | Form of precipitates |
|---|---|---|---|---|---|---|---|---|
| | | Steel | Heat treatment | | | | | |
| Example 2-1 | Inner ring | Steel A | Carbo-nitriding FIG. 3 | 800 (64) | 48 | 1.4 | 0.2 | $M_7C_3$ type carbides, $M_{23}C_6$ type carbides, Cementite Vanadium nitrides Vanadium carbonitrides |
| | Rolling element | Steel B | Carbo-nitriding FIG. 8 | 800 (64) | 30 | 1.3 | 0.1 | Cementite |
| | Outer ring | Steel A | Subzero treatment after carbo-nitriding FIG. 27 | 885 (66.5) | 17 | 1.4 | 0.2 | $M_7C_3$ type carbides, $M_{23}C_6$ type carbides, Cementite Vanadium nitrides Vanadium carbonitrides |
| Example 2-2 | Inner ring | Steel A | Carbo-nitriding FIG. 28 | 790 (63.5) | 32 | 1.3 | 0.15 | $M_7C_3$ type carbides, $M_{23}C_6$ type carbides, Cementite Vanadium nitrides Vanadium carbonitrides |
| | Rolling element | Steel B | Carbo-nitriding FIG. 8 | 800 (64) | 30 | 1.3 | 0.1 | Cementite |
| | Outer ring | Steel A | Subzero treatment after carbo-nitriding FIG. 29 | 830 (65.0) | 10 | 1.3 | 0.15 | $M_7C_3$ type carbides, $M_{23}C_6$ type carbides, Cementite Vanadium nitrides Vanadium carbonitrides |

TABLE 15-continued

| Sample name | | Area ratio of vanadium-based precipitates (%) | Life in foreign matter oil Evaluation | Life magnification | Raceway ring brinelling Evaluation | Raceway ring brinelling depth (μm) |
|---|---|---|---|---|---|---|
| Example 2-1 | Inner ring | 3 | good | 22 | good | 0.35 |
| | Rolling element | 0 | | | | |
| | Outer ring | 3 | | | | |
| Example 2-2 | Inner ring | 3 | good | 12 | good | 0.38 |
| | Rolling element | 0 | | | | |
| | Outer ring | 1 | | | | |

TABLE 16

| Sample name | Production conditions Steel | Heat treatment | Vickers hardness (Rockwell C hardness) | Amount of residual austenite in surface layer part (% by volume) | Content of carbon (% by mass) | Content of nitrogen (% by mass) | Form of precipitates |
|---|---|---|---|---|---|---|---|
| Comparative Example 2-1 | Steel B | Regular hardening FIG. 6 | 720(61) | 10 | 1 | 0 | Cementite |
| Comparative Example 2-2 | Steel B | Carburizing FIG. 7 | 830(65) | 31 | 1.3 | 0 | Cementite |
| Comparative Example 2-3 | Steel B | Carbo-nitriding FIG. 8 | 800(64) | 34 | 1.3 | 0.2 | Cementite |
| Comparative Example 2-4 | Steel A | Regular hardening FIG. 9 | 720(61) | 12 | 0.8 | 0 | $M_7C_3$ type carbides, $M_{23}C_6$ type carbides, Cementite |
| Comparative Example 2-5 | Steel A | Carburizing FIG. 10 | 800(64) | 45 | 1.3 | 0 | $M_7C_3$ type carbides, $M_{23}C_6$ type carbides, Cementite |
| Comparative Example 2-6 | Steel A | Carbo-nitriding FIG. 11 | 800(64) | 50 | 1.5 | 0.05 | $M_7C_3$ type carbides, $M_{23}C_6$ type carbides, Cementite Vanadium nitrides Vanadium carbonitrides |
| Comparative Example 2-7 | Steel A | Carbo-nitriding FIG. 12 | 730(61.5) | 60 | 1 | 1.5 | $M_7C_3$ type carbides, $M_{23}C_6$ type carbides, Cementite Vanadium nitrides Vanadium carbonitrides |
| Reference Example 2-1 | Steel A | Carbo-nitriding FIG. 3 | 800(64) | 43 | 1.4 | 0.2 | $M_7C_3$ type carbides, $M_{23}C_6$ type carbides, Cementite Vanadium nitrides Vanadium carbonitrides |
| Reference Example 2-2 | Steel A | Carbo-nitriding FIG. 4 | 770(63) | 50 | 1.3 | 1 | $M_7C_3$ type carbides, $M_{23}C_6$ type carbides, Cementite Vanadium nitrides Vanadium carbonitrides |
| Reference Example 2-3 | Steel A | Carbo-nitriding FIG. 5 | 870(66) | 22 | 1.2 | 0.1 | $M_7C_3$ type carbides, $M_{23}C_6$ type carbides, Cementite Vanadium nitrides Vanadium carbonitrides |

| Sample name | Area ratio of vanadium-based precipitates (%) | Life in foreign matter oil Evaluation | Life magnification | Raceway ring brinelling Evaluation | Raceway ring brinelling depth (μm) |
|---|---|---|---|---|---|
| Comparative Example 2-1 | 0 | bad | 1 | bad | 0.82 |

TABLE 16-continued

|  | | | | | |
|---|---|---|---|---|---|
| Comparative Example 2-2 | 0 | bad | 3 | bad | 1.0 |
| Comparative Example 2-3 | 0 | bad | 3 | bad | 1.0 |
| Comparative Example 2-4 | 0 | bad | 1 | bad | 0.85 |
| Comparative Example 2-5 | 0 | good | 10 | bad | 1.4 |
| Comparative Example 2-6 | Less than 1% | good | 12 | bad | 1.6 |
| Comparative Example 2-7 | 12 | bad | 3 | bad | 2.0 |
| Reference Example 2-1 | 3 | good | 17 | good | 0.58 |
| Reference Example 2-2 | 7 | good | 20 | good | 0.63 |
| Reference Example 2-3 | 4 | good | 8 | good | 0.50 |

From the results shown in Table 15, the life in the foreign matter oil of each ball bearing of Examples 2-1 and 2-2 is 12 times or more the L10 life of the ball bearing of Comparative Example 2-1. Moreover, the raceway ring brinelling depths of the ball bearings of Examples 2-1 and 2-2 are 0.35 μm and 0.38 μm, respectively, which are less than the permanent deformation quantity (0.635 μm) that is a limit which does not inhibit smooth rotation in the ball bearing.

Therefore, according to the combinations of the inner ring and the outer ring in Examples 2-1 and 2-2, it is understood that a long life of the rolling bearing can be achieved and sufficient static loading capacity can be secured.

To the contrary, from the results shown in Table 16, the life in the foreign matter oil of each ball bearing of Comparative Examples 2-2 to 2-4 is less than 8 times (1 to 3 times) the L10 life of the ball bearing of Comparative Example 2-1 and thus the life in the foreign matter oil is shorter than that of each ball bearing of Examples 2-1 and 2-2. Moreover, the raceway ring brinelling depth of each ball bearing of Comparative Examples 2-1 to 2-4 is larger than 0.635 μm (0.82 to 1.0 μm) and it is understood that the depth is more than the permanent deformation quantity that is a limit which does not inhibit smooth rotation in the ball bearing.

Furthermore, from the results shown in Table 16, the life in the foreign matter oil of each ball bearing of Comparative Examples 2-5 and 2-6 is 8 times or more [10 times (Comparative Example 2-5) and 12 times (comparative Example 2-6), respectively] the L10 life of the ball bearing of Comparative Example 2-1 but the raceway ring brinelling depth is larger than 0.635 μm [1.4 μm (Comparative Example 2-5) and 1.6 μm (comparative Example 2-6), respectively] and it is understood that the depth is more than the permanent deformation quantity that is a limit which does not inhibit smooth rotation in the ball bearing.

Moreover, from the results shown in Table 16, the life in the foreign matter oil and the raceway ring brinelling depth of each ball bearing of Reference Examples 2-1 to 2-3 are both usable levels but the raceway ring brinelling depth is longer than that of each ball bearing of Examples 2-1 and 2-2 and thus it is understood that the static loading capacity is low as compared with each ball bearing of Examples 2-1 and 2-2.

Therefore, from these results, by using the driving ring (inner ring) having the following prescribed values of properties obtained by subjecting the workpiece, which has been obtained by processing the steel A, to a carbonitriding treatment where the workpiece is heated at 850 to 900° C. in a carbonitriding atmosphere of a carbon potential of 0.9 to 1.3 and an ammonia gas concentration of 2 to 5% by volume and is then rapidly cooled and the fixed ring (outer ring) having the following prescribed values of properties obtained by subjecting the workpiece to the carbonitriding treatment and then subjecting the resultant intermediate material to a sub-zero treatment at −50 to −100° C., it is understood that a long life of the rolling bearing can be achieved and static loading capacity can be improved.

(1) Inner Ring:

The content of carbon in the surface layer ranging from the surface to 10 μm is 1.1 to 1.6% by mass, the Vickers hardness at the position of a depth of 50 μm from the surface is 740 to 900 (Rockwell C hardness is 62 to 67), the amount of residual austenite at the position of a depth of 10 μm from the surface is 20 to 55% by volume, the content of nitrogen in the surface layer ranging from the surface to 10 μm is 0.1 to 1.0% by mass, particles composed of vanadium nitride having a particle diameter of 0.2 to 2 μm and/or particles composed of vanadium carbonitride having a particle diameter of 0.2 to 2 μm are present in the surface layer ranging from the surface to 10 μm, and the area ratio of the particles composed of vanadium nitride having a particle diameter of 0.2 to 2 μm and/or the particles composed of vanadium carbonitride having a particle diameter of 0.2 to 2 μm in the surface layer ranging from the surface to 10 μm is 1 to 10%.

(2) Outer Ring:

The content of carbon in the surface layer ranging from the surface to 10 μm is 1.1 to 1.6% by mass, the Vickers hardness at the position of a depth of 50 μm from the surface is 800 to 940 (Rockwell C hardness is 64 to 68), the amount of residual austenite at the position of a depth of 10 μm from the surface is 5 to 30% by volume, the content of nitrogen in the surface layer ranging from the surface to 10 μm is 0.1 to 1.0% by mass, particles composed of vanadium nitride having a particle diameter of 0.2 to 2 μm and/or particles composed of vanadium carbonitride having a particle diameter of 0.2 to 2 μm are present in the surface layer ranging from the surface to 10 μm, and the area ratio of the particles composed of vanadium nitride having a particle diameter of 0.2 to 2 μm and/or the particles composed of vanadium carbonitride having a particle diameter of 0.2 to 2 μm in the surface layer ranging from the surface to 10 μm is 1 to 10%.

Example 2-3 and Comparative Examples 2-8 to 2-12

Each of the steels C and D having the composition shown in Table 7 was processed into a prescribed shape to obtain a workpiece of the inner ring for a ball bearing (Model No.

6206) having a machining allowance for polishing in a part for forming a raceway surface. The steel D in Table 5 is JIS SUJ2 that is a bearing steel.

Then, the resultant workpiece was subjected to a heat treatment under the heat treatment conditions shown in FIG. 17, FIG. 6, and FIG. 20 to FIG. 23 and further subjected to a finish-processing by polishing to produce each outer ring of Example 2-3 and Comparative Examples 2-8 to 2-12, which is a raceway surface.

The heat treatment conditions shown in FIG. 17 are conditions that the workpiece is heated at 860° C. for 7 hours in a carbonitriding atmosphere of a carbon potential of 1.2 and an ammonia gas concentration of 5% by volume, subsequently cooled with an oil to 80° C., then maintained at −75° C. for 1 hour [subzero treatment], and subsequently heated at 180° C. for 2 hours [tempering treatment].

The heat treatment conditions shown in FIG. 21 are conditions that the workpiece is heated at 850° C. for 5 hours in a carburizing atmosphere of a carbon potential of 1.2, subsequently cooled with an oil to 80° C., and subsequently heated at 180° C. for 2 hours [tempering treatment].

The heat treatment conditions shown in FIG. 20 are conditions that the workpiece is heated at 850° C. for 4 hours in a carbonitriding atmosphere of a carbon potential of 1.2 and an ammonia gas concentration of 5% by volume, subsequently cooled with an oil to 80° C., and then heated at 180° C. for 2 hours [tempering treatment].

The heat treatment conditions shown in FIG. 22 are conditions that the workpiece is zubu-hardened by heating at 900° C. for 0.5 hours in an atmosphere of a carbon potential of 1.0, subsequently cooled with an oil to 80° C., and then heated at 180° C. for 2 hours [tempering treatment].

The heat treatment conditions shown in FIG. 23 are conditions that the workpiece is heated at 930° C. for 7 hours in a carburizing atmosphere of a carbon potential of 1.2, subsequently heated at 900° C. for 0.5 hours following the heating, then cooled with an oil to 80° C., and subsequently heated at 180° C. for 2 hours [tempering treatment].

Test Example 2-2

The heat treatment qualities were investigated for the outer rings of Example 2-3 and Comparative Examples 2-8 to 2-12.

Table 17 shows the kind of the steel and heat treatment conditions used in the production of the outer rings of Example 2-3 and Comparative Examples 2-8 to 2-12.

TABLE 17

| | Production conditions | |
|---|---|---|
| Sample name | Steel | Heat treatment |
| Example 2-3 | Steel C | FIG. 17 |
| Comparative Example 2-8 | Steel D | FIG. 6 |
| Comparative Example 2-9 | Steel D | FIG. 21 |
| Comparative Example 2-10 | Steel D | FIG. 20 |
| Comparative Example 2-11 | Steel C | FIG. 22 |
| Comparative Example 2-12 | Steel C | FIG. 23 |

Moreover, Table 18 shows the heat treatment qualities of the surface (polished part) of the raceway part and Table 19 shows the heat treatment qualities of the non-polished part. As the heat treatment qualities of the surface (polished part) of the raceway part, the Vickers hardness at the position of a depth of 50 μm from the surface (polished part) of the raceway part (in the table, "Vickers hardness"), the amount of residual austenite in the surface layer part at the position of a depth of 10 μm from the surface (in the table, "amount of residual austenite in the surface layer part"), the amount of internal residual austenite at the position of a depth of 2 mm from the surface (in the table, "amount of internal residual austenite"), the content of carbon in the surface layer ranging from the surface to 10 μm (in the table, "content of carbon"), the content of nitrogen in the surface layer ranging from the surface to 10 μm (in the table, "content of nitrogen"), the form of the precipitates, the area ratio of the vanadium-based precipitates (particles composed of vanadium carbonitride having a particle diameter of 0.2 to 2 μm and particles composed of vanadium nitride having a particle diameter of 0.2 to 2 μm) in the surface layer ranging from the surface to 10 μm (in the table, "area ratio of vanadium-based precipitates"), and the area ratio of the precipitates containing nitrides in the surface layer ranging from the surface to 10 μm (in the table, "area ratio of precipitates containing nitrides") are shown.

Moreover, as the heat treatment qualities of the non-polished part, the Vickers hardness at the position of a depth of 50 μm from the surface of the non-polished part (in the table, "Vickers hardness"), the content of carbon in the surface layer ranging from the surface to 10 μm (in the table, "content of carbon"), the content of nitrogen in the surface layer ranging from the surface to 10 μm (in the table, "content of nitrogen"), and presence or absence of the particles of coarse carbon compounds having a particle diameter of 10 μm or more in the surface layer ranging from the surface to 10 μm (in the table, "particles of coarse carbon compounds having a particle diameter of 10 μm or more") are shown.

TABLE 18

| Sample name | Vickers hardness | Amount of residual austenite in surface layer part (% by volume) | Content of carbon (% by mass) | Content of nitrogen (% by mass) | Area ratio of precipitates containing nitrides (%) | Particles of nitrides having particle diameter of 500 nm or less | Amount of internal residual austenite (% by volume) | Form of precipitates | Area ratio of vanadium-based precipitates (%) |
|---|---|---|---|---|---|---|---|---|---|
| Example 2-3 | 880 | 22 | 1.4 | 0.6 | 12 | present | 5 | M₇C₃ type carbides, M₂₃C₆ type carbides, Cementite Vanadium nitrides Vanadium carbonitrides | 6 |
| Comparative Example 2-8 | 750 | 11 | 1.0 | none | 5.5 | — | 9 | Cementite | 0 |

TABLE 18-continued

| Sample name | Vickers hardness | Amount of residual austenite in surface layer part (% by volume) | Content of carbon (% by mass) | Content of nitrogen (% by mass) | Area ratio of precipitates containing nitrides (%) | Particles of nitrides having particle diameter of 500 nm or less | Amount of internal residual austenite (% by volume) | Form of precipitates | Area ratio of vanadium-based precipitates (%) |
|---|---|---|---|---|---|---|---|---|---|
| Comparative Example 2-9 | 785 | 28 | 1.3 | none | 9.5 | — | 17 | Cementite | 0 |
| Comparative Example 2-10 | 785 | 28 | 1.3 | 0.2 | 11 | — | 16 | Cementite | 0 |
| Comparative Example 2-11 | 780 | 18 | 0.8 | none | 3.5 | — | 16 | $M_7C_3$ type carbides, $M_{23}C_6$ type carbides, Cementite | 0 |
| Comparative Example 2-12 | 825 | 45 | 1.4 | none | 13.5 | — | 13 | $M_7C_3$ type carbides, $M_{23}C_6$ type carbides, Cementite | 0 |

TABLE 19

| Sample name | Vickers hardness | Content of carbon (% by mass) | Content of nitrogen (% by mass) | Particles of coarse carbon compounds having particle diameter of 10 μm or more |
|---|---|---|---|---|
| Example 2-3 | 800 | 0.8 | 1.3 | none |
| Comparative Example 2-8 | 755 | 1.0 | none | none |
| Comparative Example 2-9 | 820 | 1.6 | none | present |
| Comparative Example 2-10 | 685 | 0.8 | 0.4 | none |
| Comparative Example 2-11 | 790 | 0.8 | none | none |
| Comparative Example 2-12 | 850 | 1.7 | none | present |

From the results shown in Table 18 and Table 19, it is understood that the outer ring of Example 2-3 obtained by subjecting the workpiece obtained from the steel C to the carbonitriding treatment and subsequently subjecting the workpiece to the subzero treatment shows that the Vickers hardness at the position of a depth of 50 μm from the surface (polished part) of the raceway part is 880, the amount of residual austenite in the surface layer part at the position of a depth of 10 μm from the surface is 22% by volume, the amount of internal residual austenite at the position of a depth of 2 mm from the surface is 5% by volume, the content of carbon in the surface layer ranging from the surface to 10 μm is 1.4% by mass, the content of nitrogen in the surface layer ranging from the surface to 10 μm is 0.6% by mass, the area ratio of the vanadium-based precipitates in the surface layer ranging from the surface to 10 μm is 6%, and the area ratio of the precipitates containing nitrides in the surface layer ranging from the surface to 10 μm is 12% at the polished part.

Moreover, at the non-polished part, it is understood that the Vickers hardness at the position of a depth of 50 μm from the surface of the non-polished part is 800, the content of carbon in the surface layer ranging from the surface to 10 μm is 0.8% by mass, the content of nitrogen in the surface layer ranging from the surface to 10 μm is 1.3% by mass, and the particles of coarse carbon compounds in the surface layer ranging from the surface to 10 μm are absent.

Further, particles of nitrides having a particle diameter of 500 nm or less are present in the surface (polished part) of the raceway part of the outer ring of Example 2-3.

Since the surface (polished part) of the polish-finished raceway part of the outer ring of Example 2-3 has particles composed of nitrides having a particle diameter of 500 nm or less and the area ratio of the precipitates containing nitrides in the surface layer ranging from the surface to 10 μm is 5 to 20%, the hardness of the surface is improved and, even in the case of the use in a lubricating oil contaminated with foreign matter, the stress concentration in the vicinity of brinelling generated when the foreign matter is bitten can be relaxed.

From these results, as in the cases of the outer ring of Example 2-3, it is suggested that the generation of the over carburized tissue is suppressed at the non-polished part by forming a carbonitrided layer at the non-polished part.

On the other hand, from the results shown in Table 18 and Table 19, it is understood that the outer ring of Comparative Example 2-12 obtained by subjecting the workpiece obtained from the steel C to a carburizing treatment does not contain nitrogen (N) in the surface of the non-polished part. Moreover, since particles of coarse carbon compounds having a particle diameter of 10 μm or more are present at the non-polished part of the outer ring of Comparative Example 2-12, an over carburized tissue is generated.

Test Example 2-3

For each of the outer rings and inner rings of Example 2-3 and Comparative Examples 2-8 to 2-12, a test of the life in a foreign matter oil and a test of crushing strength were performed. At the test of the life in a foreign matter oil, the outer and inner rings of each of Example 2-3 and Comparative Examples 2-8 to 2-12 and a ball produced by subjecting high carbon chromium bearing steel (JIS SUJ2) to a carbonitriding treatment and subsequently performing hardening and tempering treatments were combined to assemble a ball bearing of Model No. 6206. The resultant ball bearing was subjected to the test of the life in a foreign matter oil. The test conditions for the test of the life in a foreign matter oil are the same as in Table 2. Moreover, the test conditions for the test of crushing strength are shown in Table 13. The test of crushing strength is a test where a first place of the 6206 outer ring in a circumferential direction and a second place that is a place moved by 180° in a circumferential direction from the first place of the circumferential direction are pinched by an Amsler testing machine in a diameter direction, the machine is moved so that the first place and the second place come close to each other at a rate of 0.5 mm/min along a vertical direction to an axis line of the 6206 outer ring connecting from the first place to the second place to thereby deform and destroy the 6206 outer ring, and radial load at the time of breakage is evaluated. The crushing strength ratio is a ratio of the load at the time when the 6206 outer ring of each Example or Comparative Example is destroyed relative to the load when the 6206 outer ring of Comparative Example 8 is destroyed. Table 20 shows the results thereof.

TABLE 20

|  | Life in foreign oil (L10) | Crushing strength ratio |
| --- | --- | --- |
| Example 2-3 | 8 | 1.0 |
| Comparative Example 2-8 | 1 | 1 |
| Comparative Example 2-9 | 3.1 | 0.6 |
| Comparative Example 2-10 | 3.4 | 0.95 |
| Comparative Example 2-11 | 1.3 | 1.1 |
| Comparative Example 2-12 | 8.6 | 0.5 |

From the results shown in Table 20, it is understood that the ball bearing provided with the outer ring of Example 2-3 using the steel C having the composition shown in Table 7 exhibits a long life in the foreign matter oil and also high crushing strength of the outer ring as compared with the ball bearings provided with the outer rings of Comparative Examples 2-8 to 2-12 using the steel D.

On the other hand, from the results shown in Table 20, it is understood that the ball bearing provided with the outer ring of Comparative Examples 2-12, in which the workpiece obtained from the steel C the same as the steel used in the outer ring of Example 2-3 is subjected to a carburizing treatment exhibits low crushing strength of the outer ring as compared with the ball bearing provided with the outer ring of each of Comparative Examples 2-8 to 2-10 in which the steel D is used. To the contrary, it is understood that the ball bearing provided with the outer ring of Example 2-3 obtained by subjecting the workpiece obtained from the steel C to a carbonitriding treatment exhibits an improvement in both of the life in a foreign matter oil and the crushing strength of the outer ring.

Thus, in Comparative Examples 2-9 and 2-12, it was found that the particles of coarse carbon compounds having a particle diameter of 10 μm or more were present, the over carburized tissue such as free carbides was generated at the non-polished part present at the part excluding the raceway part, and the over carburized tissue became a starting point of the stress concentration to thereby lower the crushing strength of the rolling bearing. In Example 2-3, by subjecting the prescribed steel to a carbonitriding treatment under prescribed conditions, with forming a long-life tissue (carburized tissue) containing a small amount of precipitates in the raceway part of the rolling bearing, at the non-polished part, the particles of coarse carbon compounds having a particle diameter of 10 μm or more were not formed, the generation of the over carburized tissue such as free carbides was suppressed, the decrease in crushing strength was suppressed, and also high rolling fatigue life could be attained.

Therefore, from these results, as in Example 2-3, according to the raceway member obtained by subjecting the workpiece obtained from the steel C having the composition shown in Table 7, it is suggested that the over carburized tissue is not formed at the non-polished part and a rolling bearing excellent in both of the life in a foreign matter oil and the crushing strength is obtained.

DESCRIPTION OF REFERENCE NUMERALS AND SIGNS 1, 11 inner ring, 1a, 11a raceway part, 2, 21, 61 outer ring, 2a, 21a, 61a raceway part, 10 ball bearing

The invention claimed is:

1. A bearing constituent member obtained from a steel comprising 3.2 to 5.0% by mass of chromium and 0.05% by mass or more to less than 0.5% by mass of vanadium and having a polish-finished surface, the bearing constituent member comprising:
a surface layer,
wherein the content of carbon in the surface layer ranging from a surface of the surface layer to a depth of 10 μm is 1.1 to 1.6% by mass,
wherein Vickers hardness at a position of a depth of 50 μm from the surface is 740 to 900,
wherein the amount of residual austenite at a position of a depth of 10 μm from the surface is 20 to 55% by volume,
wherein the content of nitrogen in the surface layer ranging from the surface to a depth of 10 μm is 0.1 to 1.0% by mass, and
wherein at least one of particles composed of vanadium nitride having a particle diameter of 0.2 to 2 μm and particles composed of vanadium carbonitride having a particle diameter of 0.2 to 2 μm are present in the surface layer ranging from the surface to a depth of 10 μm and at least one of the area ratio of the particles composed of vanadium nitride having a particle diameter of 0.2 to 2 μm and the particles composed of vanadium carbonitride having a particle diameter of 0.2 to 2 μm in the surface layer ranging from the surface to a depth of 10 μm is 1 to 10%.

2. The bearing constituent member according to claim 1, wherein the steel comprises 0.7 to 0.9% by mass of carbon, 0.05 to 0.70% by mass of silicon, 0.05 to 0.7% by mass of manganese, 3.2 to 5.0% by mass of chromium, 0.1 to 1.0% by mass of molybdenum, and 0.05% by mass or more to less than 0.5% by mass of vanadium and the remainder is iron and unavoidable impurities.

3. The bearing constituent member according to claim 1, wherein the bearing constituent member comprises a raceway member having a polish-finished raceway part, the steel contains 0.7 to 0.9% by mass of carbon, the content of carbon in the surface layer ranging from the surface of a non-polished part present in the part other than the raceway part to 10 μm is 0.7 to 1.0% by mass, Vickers hardness at the position of a depth of 50 μm from the surface is 700 to 800.

4. A rolling bearing comprising an outer ring having an raceway part on an inner peripheral surface, an inner ring having an raceway part on an outer peripheral surface, and a plurality of rolling elements disposed between both raceway parts of the inner and outer rings, wherein at least one of the outer ring and the inner ring is composed of the bearing constituent member according to claim 1.

5. A process for producing the bearing constituent member according to claim 1, comprising:
a pre-processing step of processing a steel containing 3.2 to 5.0% by mass of chromium and 0.05% by mass or more to less than 0.5% by mass of vanadium into a prescribed shape to obtain a workpiece,
a carbonitriding treatment step of subjecting the workpiece to a carbonitriding treatment where the workpiece is heated at 850 to 900° C. in a carbonitriding atmosphere of a carbon potential of 0.9 to 1.3 and an ammonia gas concentration of 2 to 5% by volume and is then rapidly cooled, to obtain an intermediate material,
a tempering treatment step of subjecting the intermediate material after the carbonitriding treatment to a tempering treatment where the intermediate material is heated at 160° C. or higher, and a finish-processing step of subjecting the intermediate material after the tempering treatment to a finish-processing to thereby obtain a bearing constituent member wherein the content of carbon in the surface layer ranging from the surface to 10 μm is 1.1 to 1.6% by mass, Vickers hardness at the position of a depth of 50 μm from the surface is 740 to 900, the amount of residual austenite at the position of a depth of 10 μm from the surface is 20 to 55% by volume, the content of nitrogen in the surface layer ranging from the surface to 10 μm is 0.1 to 1.0% by mass, at least one of particles composed of vanadium nitride having a particle diameter of 0.2 to 2 μm and particles composed of vanadium carbonitride having a particle diameter of 0.2 to 2 μm are present in the surface layer ranging from the surface to 10 μm, and the area ratio of at least one of the particles composed of vanadium nitride having a particle diameter of 0.2 to 2 μm and the particles composed of vanadium carbonitride having a particle diameter of 0.2 to 2 μm in the surface layer ranging from the surface to 10 μm is 1 to 10%.

6. A process for producing the bearing constituent member according to claim 3, comprising:

a processing step of processing a steel containing 0.7 to 0.9% by mass of carbon, 3.2 to 5.0% by mass of chromium and 0.05% by mass or more to less than 0.5% by mass of vanadium into a prescribed shape to obtain a workpiece of the raceway member having a machining allowance for polishing in at least a part for forming a raceway surface, a heat treatment step of subjecting the workpiece to a heat treatment including a carbonitriding treatment where the workpiece is heated at 850 to 900° C. for 4 hours or longer in a carbonitriding atmosphere of a carbon potential of 0.9 to 1.3 and an ammonia gas concentration of 2 to 5% by volume, to obtain an intermediate material, and a finish-processing step of subjecting the part for forming a raceway surface of the intermediate material after the heat treatment to a polish-finishing to form the raceway part, thereby obtaining a raceway member wherein the content of carbon in the surface layer ranging from the surface to 10 μm is 1.1% by mass or more to less than 1.6% by mass, Vickers hardness at the position of a depth of 50 μm from the surface is 740 to 900, the amount of residual austenite at the position of a depth of 10 μm from the surface is 20 to 55% by volume, the content of nitrogen in the surface layer ranging from the surface to 10 μm is 0.1 to 1.0% by mass, at least one of particles composed of vanadium nitride having a particle diameter of 0.2 to 2 μm and particles composed of vanadium carbonitride having a particle diameter of 0.2 to 2 μm are present in the surface layer ranging from the surface to 10 μm, the area ratio of at least one of the particles composed of vanadium nitride having a particle diameter of 0.2 to 2 μm and the particles composed of vanadium carbonitride having a particle diameter of 0.2 to 2 μm in the surface layer ranging from the surface to 10 μm is 1 to 10%, the content of carbon in the surface layer ranging from the surface of a non-polished part present in the part other than the raceway part to 10 μm is 0.7 to 1.0% by mass, and Vickers hardness at the position of a depth of 50 μm from the surface is 700 to 800.

7. A bearing constituent member obtained by subjecting a workpiece, which has been obtained by processing a steel containing 3.2 to 5.0% by mass of chromium and 0.05% by mass or more to less than 0.5% by mass of vanadium, to a carbonitriding treatment where the workpiece is heated at 850 to 900° C. in a carbonitriding atmosphere of a carbon potential of 0.9 to 1.3 and an ammonia gas concentration of 2 to 5% by volume and is then rapidly cooled and subsequently by subjecting the resultant intermediate material to a subzero treatment at −50 to −100° C. and to a finish-processing, and having a polish-finished surface, the bearing constituent member comprising:

a surface layer, wherein the content of carbon in the surface layer ranging from the polish-finished surface to a depth of 10 μm is 1.1 to 1.6% by mass, Vickers hardness at the position of a depth of 50 μm from the surface being 800 to 940, the amount of residual austenite at the position of a depth of 10 μm from the surface is 5 to 30% by volume, the content of nitrogen in the surface layer ranging from the surface to a depth of 10 μm is 0.1 to 1.0% by mass, at least one of particles composed of vanadium nitride having a particle diameter of 0.2 to 2 μm and particles composed of vanadium carbonitride having a particle diameter of 0.2 to 2 μm are present in the surface layer ranging from the surface to a depth of 10 μm, and the area ratio of at least one of the particles composed of vanadium nitride having a particle diameter of 0.2 to 2 μm and the particles composed of vanadium carbonitride having a particle diameter of 0.2 to 2 μm in the surface layer ranging from the surface to a depth of 10 μm is 1 to 10%.

8. The bearing constituent member according to claim 7, wherein the bearing constituent member comprises a raceway member having a polish-finished raceway part and the steel contains 0.7 to 0.9% by mass of carbon and wherein the content of carbon in the surface layer ranging from the surface of a non-polished part present in the part other than the raceway part to 10 μm is 0.7 to 1.0% by mass and Vickers hardness at the position of a depth of 50 μm from the surface is 700 to 800.

9. A process for producing a raceway member as the bearing constituent member according to claim 8, comprising:

a processing step of processing a steel containing 0.7 to 0.9% by mass of carbon, 3.2 to 5.0% by mass of chromium and 0.05% by mass or more to less than 0.5% by mass of vanadium into a prescribed shape to obtain a workpiece of the raceway member having a machining allowance for polishing in at least a part for forming a raceway surface, a carbonitriding treatment step of subjecting the workpiece to a carbonitriding treatment where the workpiece is heated at 850 to 900° C. for 4 hours or longer in a carbonitriding atmosphere of a carbon potential of 0.9 to 1.3 and an ammonia gas concentration of 2 to 5% by volume and is then rapidly cooled, to obtain an intermediate material, a subzero treatment step of subjecting the intermediate material after the carbonitriding treatment to a subzero treatment where the intermediate material is cooled at −50 to −100° C., and a finish-processing step of subjecting the part for forming a raceway surface of the intermediate material after the subzero treatment to a polish-finishing to form the raceway part, thereby obtaining a raceway member wherein the content of carbon in the surface layer ranging from the surface to 10 μm is 1.1% by mass or more to less than 1.6% by mass, Vickers hardness at the position of a depth of 50 μm from the surface being 800 to 940, the amount of residual austenite at the position of a depth of 10 μm from the surface is 5 to 30% by volume, the content of nitrogen in the surface layer ranging from the surface to 10 μm is 0.1 to 1.0% by mass, at least one of particles composed of vanadium nitride having a particle diameter of 0.2 to 2 μm and particles composed of vanadium carbonitride having a particle diameter of 0.2 to 2 μm are present in the surface layer ranging from the surface to 10 μm, the area ratio of at least one of the particles composed of vanadium nitride having a particle diameter of 0.2 to 2 μm and the particles composed of vanadium carbonitride having a particle diameter of 0.2 to 2 μm in the surface layer ranging from the surface to 10 μm is 1 to 10%, the content of carbon in the surface layer ranging from the surface of a non-polished part present in the part other than the raceway part to 10 μm is 0.7 to 1.0% by mass, and Vickers hardness at the position of a depth of 50 μm from the surface being 700 to 800.

10. A rolling bearing comprising:
an outer ring having an raceway part on an inner peripheral surface, an inner ring having an raceway part on an outer peripheral surface, and a plurality of rolling elements disposed between both raceway parts of the inner and outer rings, wherein the outer ring is a fixed ring and is composed of the bearing constituent member according to claim 7.

11. The rolling bearing according to claim 10, wherein the inner ring comprises a driving ring and comprises a member which is obtained from a steel containing 3.2 to 5.0% by mass of chromium and 0.05% by mass or more to less than 0.5% by mass of vanadium and where the content of carbon in the surface layer ranging from the surface to 10 μm is 1.1 to 1.6% by mass, Vickers hardness at the position of a depth of 50 μm from the surface is 740 to 900, the amount of residual austenite at the position of a depth of 10 μm from the surface is 20 to 55% by volume, the content of nitrogen in the surface layer ranging from the surface to 10 μm is 0.1 to 1.0% by mass, at least one of particles composed of vanadium nitride having a particle diameter of 0.2 to 2 μm and particles composed of vanadium carbonitride having a particle diameter of 0.2 to 2 μm are present in the surface layer ranging from the surface to 10 μm, and the area ratio of at least one of the particles composed of vanadium nitride having a particle diameter of 0.2 to 2 μm and the particles composed of vanadium carbonitride having a particle diameter of 0.2 to 2 μm in the surface layer ranging from the surface to 10 μm is 1 to 10%.

12. A process for producing a bearing constituent member, comprising:
a pre-processing step of processing a steel containing 3.2 to 5.0% by mass of chromium and 0.05% by mass or more to less than 0.5% by mass of vanadium into a prescribed shape to obtain a workpiece,
a carbonitriding treatment step of subjecting the workpiece to a carbonitriding treatment wherein the workpiece is heated at 850 to 900° C. in a carbonitriding atmosphere of a carbon potential of 0.9 to 1.3 and an ammonia gas concentration of 2 to 5% by volume and is then rapidly cooled to obtain an intermediate material,
a subzero treatment step of subjecting the intermediate material after the carbonitriding treatment to a subzero treatment where the intermediate material is cooled at −50 to −100° C., and
a finish-processing step of subjecting the intermediate material after the subzero treatment to a finish-processing to thereby obtain a bearing constituent member where Vickers hardness at the position of a depth of 50 μm from the surface is 800 to 940, the amount of residual austenite at the position of a depth of 10 μm from the surface is 5 to 30% by volume, the content of nitrogen in the surface layer ranging from the surface to 10 μm is 0.1 to 1.0% by mass, at least one of particles composed of vanadium nitride having a particle diameter of 0.2 to 2 μm and particles composed of vanadium carbonitride having a particle diameter of 0.2 to 2 μm are present in the surface layer ranging from the surface to 10 μm, and the area ratio of at least one of the particles composed of vanadium nitride having a particle diameter of 0.2 to 2 μm and the particles composed of vanadium carbonitride having a particle diameter of 0.2 to 2 μm in the surface layer ranging from the surface to 10 μm is 1 to 10%.

* * * * *